(12) United States Patent
Gotoh et al.

(10) Patent No.: US 8,682,084 B2
(45) Date of Patent: Mar. 25, 2014

(54) INFORMATION PROCESSING DEVICE, METHOD, AND PROGRAM

(75) Inventors: Tomohiko Gotoh, Kanagawa (JP); Shunsuke Mochizuki, Tokyo (JP); Yun Sun, Tokyo (JP); Tatsuhito Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 493 days.

(21) Appl. No.: 12/908,273

(22) Filed: Oct. 20, 2010

(65) Prior Publication Data

US 2011/0150340 A1 Jun. 23, 2011

(30) Foreign Application Priority Data

Dec. 22, 2009 (JP) ................................. 2009-291129

(51) Int. Cl.
*G06K 9/62* (2006.01)
*G06K 9/00* (2006.01)
*G06K 9/54* (2006.01)

(52) U.S. Cl.
USPC ............ 382/224; 382/225; 382/118; 382/305

(58) Field of Classification Search
USPC ................... 382/224, 225, 118, 305
See application file for complete search history.

(56) References Cited

U.S. PATENT DOCUMENTS

2003/0002715 A1* 1/2003 Kowald ........................ 382/118
2006/0195475 A1* 8/2006 Logan et al. ............... 707/104.1

FOREIGN PATENT DOCUMENTS

JP 2005-157679 6/2005
JP 2005-284487 10/2005

OTHER PUBLICATIONS

Gallagher, Andrew C., et al, Using Context to Recognize People in Consumer Images, Mar. 2009, IPSJ Transactions on Computer Vision and Applications, vol. 1, pp. 1-12.*
Gallagher, Andrew C., A Framework for Using Context to Understand Images of People, May 2009, Dissertation: Department of Electrical and Computer Engineering—Carnegie Mellon University, pp. 1-150.*
Lecture Notes: Math 250 Polar Coordinates—Topic 7, Feb. 2003 (see p. 9), Departments of Mathematics—Southern Illinois University (http://www.math.siu.edu/previews/250/250_Topic7.pdf), pp. 1-9.*
Peng Wu; Weimin Ding; Zhidong Mao; Tretter, D., "Close & Closer: Discover social relationship from photo collections," Multimedia and Expo, 2009. ICME 2009. IEEE International Conference on , vol., No., pp. 1652,1655, Jun. 28, 2009-Jul. 3, 2009.*
U.S. Appl. No. 13/038,745, filed Mar. 2, 2011, Mochizuki, et al.

* cited by examiner

*Primary Examiner* — Utpal Shah
(74) *Attorney, Agent, or Firm* — Oblon, Spivak, McClelland, Maier & Neustadt, L.L.P.

(57) ABSTRACT

An information processing device includes: an extracting unit configured to extract a face from an image; a grouping unit configured to classify the image extracted by the extracting unit into a group; an adding unit configured to add to a group generated by the grouping unit a tag indicating relationship between persons within the group; a closeness calculating unit configured to calculate the closeness of the person of the face from distance between groups generated by the grouping unit; and a person correlation data generating unit configured to generate person correlation data including at least the tag and the closeness.

14 Claims, 42 Drawing Sheets

FIG. 23

| TAG NAME | REMARKS |
|---|---|
| ATR_NONE | NO LABEL INFORMATION |
| ATR_SOLO | WITH GROUPING ONE-PERSON PARTY |
| ATR_FAMILY | WITH GROUPING NUMBER OF PEOPLE > 2 && (ATR_MAN + ATR_WOMAN) > 0 && ATR_CHILD > 0 && RATIO OF NUMBER OF ATR_MAN AS TO ATR_CHILD ≤ Th1 |
| ATR_PARENT_CHILD | WITH GROUPING (ATR_MAN = 1 OR ATR_WOMAN = 1) && ATR_CHILD = 1 |
| ATR_COUPLE | WITH GROUPING ATR_MAN = 1 && ATR_WOMAN = 1 && (FACE DISTANCE ≤ 1.5 OR (FACE DISTANCE > 1.5 && FACE DISTANCE FACE DISTANCE ≤ 2 && ONE SMILING)) |
| ATR_FRIENDS_ADULT | WITH GROUPING (ATR_MAN + ATR_WOMAN) = 2 && (FACE DISTANCE ≤ 2 OR (FACE DISTANCE > 2 && FACE DISTANCE FACE DISTANCE < 4 && ONE SMILING)) |
| ATR_FRIENDS_CHILD | WITH GROUPING ATR_CHILD = 2 && (FACE DISTANCE < 2 OR (FACE DISTANCE > 2 && FACE DISTANCE FACE DISTANCE < 4 && ONE SMILING)) |
| ATR_FRIENDS_GROUP_ADULT | WITH GROUPING NUMBER OF PEOPLE > 2 && (ATR_MAN + ATR_WOMAN) > Th2 * ATR_CHILD |
| ATR_FRIENDS_GROUP_CHILD | WITH GROUPING NUMBER OF PEOPLE > 2 && ATR_CHILD > Th3 * (ATR_MAN + ATR_WOMAN) |
| ATR_MAN | WHEN ADDING INDIVIDUAL adult − baby > Th4 adult > Th 5 gender ≥ Th6 |
| ATR_WOMAN | WHEN ADDING INDIVIDUAL adult − baby > Th7 adult > Th8 gender < Th9 |
| ATR_CHILD | WHEN ADDING INDIVIDUAL ≠adult, unclear |
| ATR_UNCLEAR | WHEN ADDING INDIVIDUAL adult − baby > Th10 adult ≤ Th11 |

FIG. 24

| TAG NAME | ID | MEANING | REMARKS |
|---|---|---|---|
| ATR_NONE | 0 | NO TAG INFORMATION | |
| ATR_SOLO | 1 | SINGLE | |
| ATR_FAMILY | 2 | FAMILY | |
| ATR_PARENT_CHILD | 20 | PARENT AND CHILD (EITHER FATHER OR MOTHER) | |
| ATR_COUPLE | 21 | COUPLE | |
| ATR_FRIENDS_ADULT | 22 | TWO FRIENDS (ADULTS) | |
| ATR_FRIENDS_CHILD | 23 | TWO FRIENDS (CHILDREN) | |
| ATR_FRIENDS_GROUP_ADULT | 30 | THREE OR MORE FRIENDS (ADULTS) | |
| ATR_FRIENDS_GROUP_CHILD | 31 | THREE OR MORE FRIENDS (CHILDREN) | |
| ATR_MAN | 51 | MAN | USED ONLY WHEN ADDING INDIVIDUAL |
| ATR_WOMAN | 52 | WOMAN | USED ONLY WHEN ADDING INDIVIDUAL |
| ATR_CHILD | 53 | CHILD | USED ONLY WHEN ADDING INDIVIDUAL |
| ATR_UNCLEAR | 99 | IDENTITY UNCLEAR | USED ONLY WHEN ADDING INDIVIDUAL |

FIG. 26A
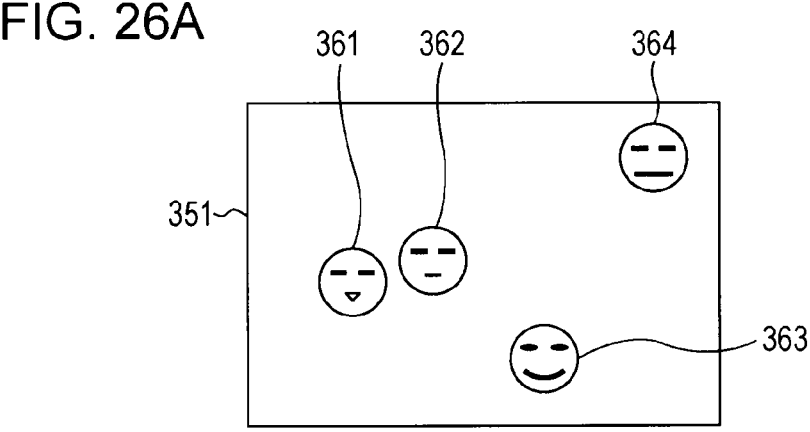
FIG. 26B
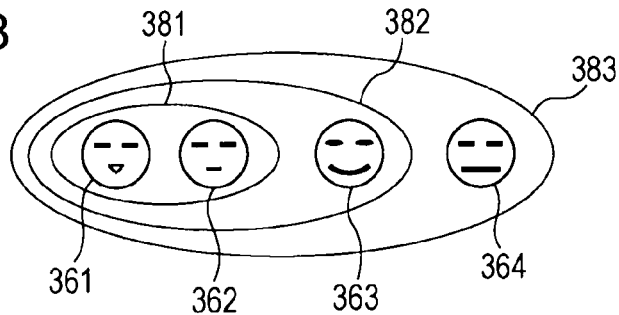
FIG. 26C
| FACE ID | | FACE ID | | | |
|---|---|---|---|---|---|
| | | 361 | 362 | 363 | 364 |
| | 361 | | 2 Couple | 1 Friend | 0.5 Friend |
| | 362 | | | 1 Friend | 0.5 Friend |
| | 363 | | | | 1 Friend |
| | 364 | | | | |
391

| 411 | FACE ID | FACE ID | | | |
|---|---|---|---|---|---|
| | | | 361 | 362 | 363 | 364 |
| | | 361 | | 1 Friend | 2 Couple | 0.5 Friend |
| | | 362 | | | 1 Friend | 1 Friend |
| | | 363 | | | | 0.5 Friend |
| | | 364 | | | | |

| 421 | FACE ID | FACE ID | | | |
|---|---|---|---|---|---|
| | | | 361 | 362 | 363 | 364 |
| | | 361 | | 3 Couple Friend | 3 Couple Friend | 1 Friend |
| | | 362 | | | 2 Friend | 1.5 Friend |
| | | 363 | | | | 1.5 Friend |
| | | 364 | | | | |

FIG. 28

| TAG NAME | COEFFICIENT |
|---|---|
| Couple | 1.5 |
| Parent Child | 1.5 |
| Family | 1.2 |
| Friend | 1.0 |

| PERSON ID | SCORE OF APPEARANCES | FACE ICON IMAGE | ATTRIBUTE |
|---|---|---|---|
| 001 | 34 | User001.jpg | MAN/Age: 24 |
| 002 | 13 | User002.jpg | WOMAN/Age: 23 |
| 003 | 21 | User003.jpg | MAN/Age: 65 |

| PERSON ID1 | PERSON ID2 | CLOSENESS SCORE | TAG | PHOTOGRAPH IMAGE |
|---|---|---|---|---|
| 001 | 002 | 5.5 | Couple | DSC00001.jpg |
| 002 | 003 | 2.25 | Family | DSC00002.jpg |
| 003 | 001 | 0.25 | Friend | DSC00003.jpg |

| PERSON ID | SCORE OF APPEARANCES | FACE ICON IMAGE | ATTRIBUTE |
|---|---|---|---|
| 001 | 34 | User001.jpg | MAN/Age: 24 |
| 002 | 13 | User002.jpg | WOMAN/Age: 23 |
| 003 | 21 | User003.jpg | MAN/Age: 65 |

503'

| EVENT ID | PERSON ID1 | PERSON ID2 | CLOSENESS SCORE | TAG | PHOTOGRAPH IMAGE |
|---|---|---|---|---|---|
| 01 | 001 | 002 | 5.5 | Couple | DSC00001.jpg |
| | 002 | 003 | 2.25 | Family | DSC00002.jpg |
| | 003 | 001 | 0.25 | Friend | DSC00003.jpg |

INFORMATION PROCESSING DEVICE, METHOD, AND PROGRAM

BACKGROUND OF THE INVENTION

1. Field of the Invention

The present invention relates to an information processing device, method, and program, and more particularly relates to an information processing device, method, and program, suitably used for organizing and searching of image data.

2. Description of the Related Art

As digital cameras have become more commonplace, and the capacity of the storage media for digital cameras has increased while becoming more compact, the number of images which users take with digital cameras and save has been increasing. The more images are saved, the more the user has to work to manage the images. For example, if the user desires to search for an image taken of a desired person, the user has to search through a great number of images.

Accordingly, an arrangement has been proposed wherein sorting and searching of images is facilitated by using image analysis technology, particularly technology for detecting human faces from images. For example, arrangements have been proposed in which images are classified according to whether or not there are people in the images, or classified according to the number of people in the images, or further classified according to people discriminated from the images (e.g., see Japanese Unexamined Patent Application Publication Nos. 2005-284487 and 2005-157679).

Further, an arrangement has been proposed wherein more detailed attribute information of the detected faces is detected, such as the orientation of faces, gender and age of persons, and the degree of smiling, for example, and the detected faces are classified based on such attribute information.

However, while simply detecting people in images and adding attribute information allows for general-purpose photograph sorting, this has not been able to provide sorting or searching according to the environment or tendencies of the user in a more personal manner. Accordingly, there has been demand for a technique enabling sorting or searching according to the environment and tendencies of the user in a more personal manner. Providing information in such a way that matches the environment of the user or the situation of the user himself/herself has been difficult.

It has been found desirable to enable sorting and searching of images according to the environment and tendencies of the user in a more personal manner.

SUMMARY OF THE INVENTION

An information processing device according to an embodiment of the present invention includes: an extracting unit configured to extract a face from an image; a grouping unit configured to classify the face extracted by the extracting unit into a group; an adding unit configured to add to a group generated by the grouping unit a tag indicating relationship between persons within the group; an closeness calculating unit configured to calculate the closeness of the person of the face from distance between groups generated by the grouping unit; and a person correlation data generating unit configured to generate person correlation data including at least the tag and the closeness.

The grouping unit may include: a first generating unit configured to generate a group by the position of each face from the center of gravity of the positions of all faces to be extracted and processed; a second generating unit configured to generate an approximation line from the position of each face to be processed to generate a group by distance from the approximation line thereof; an adding unit configured to add to a group generated by the second generating unit a face not belonging to the group; a third generating unit configured to generate a group by obtaining distance from a coordinate average of a face to be processed with a face not included in a group as to be processed; and a fourth generating unit configured to take faces remaining alone as a group with a face not included in a group as to be processed.

The grouping unit may further include a filtering unit configured to perform filtering to compare the average value of the size of an extracted face and to set neither a face having a size equal to or greater than a first threshold nor a face having a size equal to or smaller than a second threshold, to be processed.

The second generating unit may select a first face serving as a reference from the face to be processed, to generate an approximation line from the first face and a second face, select a face with a distance from the approximation line thereof, and a ratio as to the average value of the size of the face to be processed being a certain value or less, thereby generating a group.

The adding unit may add a face to the group, which has a certain size as to the average value of the size of a face included in a group generated by the second generating unit, with distance as to the approximation line used at the time of a group generated by the second generating unit being generated being in a certain range.

The third generating unit may select a first face from faces not included in a group to extract a combination of faces with distance as to the coordinate average as to the other faces including the first face thereof being equal to or less than a certain value, and of extracted combinations, generate a combination with distance between the average coordinates within the group and each face of the group being the least as a group.

The fourth generating unit may take, of faces not being grouped, faces having a size equal to or greater than the average value of face sizes as one group.

The information processing device may further include: a date-and-time extracting unit configured to extract date and time when the image was imaged; and an event clustering unit configured to generate an event using information relating to the date and time extracted by the date-and-time extracting unit to classify the image for each event; with the correlation data, which includes information relating to the event, being data whereby at least the tag and the closeness are managed for each event.

An image based on the person correlation data may be an image including at least the tag representing relationship between the face image of the person and persons in a face image.

In the event that the tag is changed, deleted, or added, the correlation data corresponding thereto may be updated.

An image based on the person correlation data may be generated for each event.

An information processing method according to an embodiment of the present invention includes the steps of: extracting a face from an image; classifying the extracted face into a group; adding a tag indicating relationship between persons within a group; calculating the closeness of the person of the face from distance between groups; and generating person correlation data including at least the tag and the closeness.

A program according to an embodiment of the present invention causing a computer to execute processing including the steps of: extracting a face from an image; classifying the extracted face into a group; adding a tag indicating relationship between persons within a group; calculating the closeness of the person of the face from distance between groups; and generating person correlation data including at least the tag and the closeness.

With an information processing device and method, and a program according to an embodiment of the present invention, a face from an image is extracted, the extracted face is classified into a group, a tag indicating relationship between persons within a group is added, the closeness of the person of the face is calculated from distance between groups, and data including at least the tag and the closeness is generated.

According to the above configurations, searching of images according to the environment and tendencies of the user himself/herself is facilitated.

BRIEF DESCRIPTION OF THE DRAWINGS

FIG. 23 is an example of a table referred to at the time of adding tags;
FIG. 24 is an example of a table referred to at the time of adding tags;
FIGS. 26A through 26C are diagrams for describing calculation of a distance score;
FIG. 28 is a diagram illustrating an example of a table of coefficients multiplied when multiple tags are applied;
FIG. 29 is a diagram illustrating an example of person correlation data;
FIG. 42 is a diagram illustrating an example of person correlation data.

DESCRIPTION OF THE PREFERRED EMBODIMENTS

Figure 1:
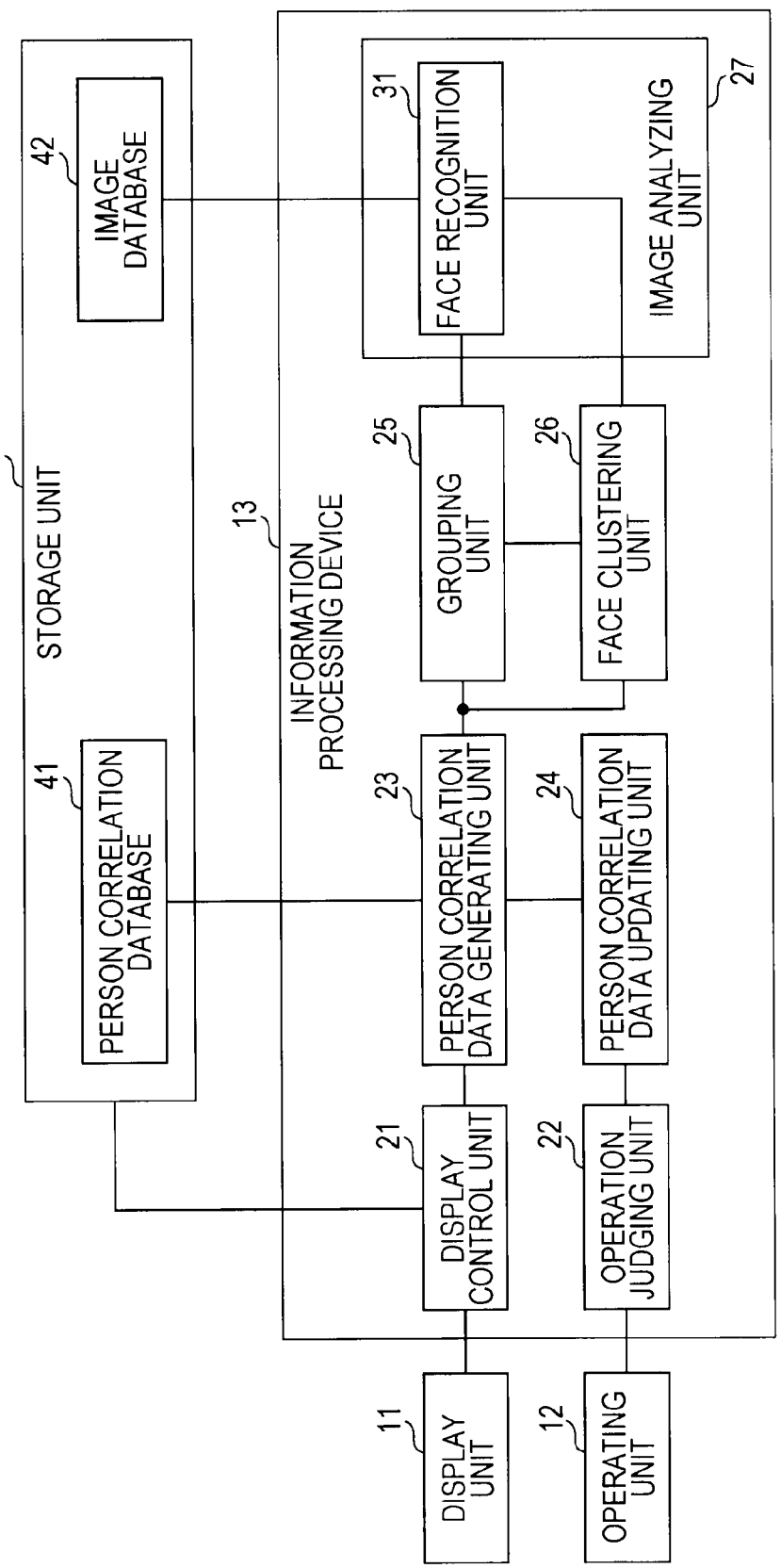
FIG. 1 is a diagram illustrating the configuration of an information processing device to which an embodiment of the present invention has been applied.

Embodiments of the present invention will be described below with reference to the drawings.
About Configuration of Information Processing Device
FIG. 1 is a diagram illustrating the configuration of an information processing device to which an embodiment of the present invention has been applied. A system including the information processing device 13 shown in FIG. 1 is configured of a display unit 11, an operating unit 12, the information processing device 13, and a storage unit 14. The information processing device 13 is configured of a display control unit 21, an operation judging unit 22, a person correlation data generating unit 23, a person correlation data updating unit 24, a grouping unit 25, a face clustering unit 26, and an image analyzing unit 27. The image analyzing unit 27 includes a face recognition unit 31. The storage unit 14 is of a configuration including the two databases of a person correlation database 41 and an image database 42.

The display unit 11 displays a later-described screen. This screen is a screen based on data illustrating correlation between people stored in the person correlation database 41 of the storage unit 14. The operating unit 12 is confirmed of members operated by the user.

The display control unit 21 controls display of the display unit 11 based on the data stored in the person correlation database 41 of the storage unit 14. Data stored in the person correlation database 41 is generated by the person correlation data generating unit 23. The person correlation data generating unit 23 generates data relating to correlation of people based on the results of grouping by the grouping unit 25 and the results of clustering by the face clustering unit 26. The grouping unit 25 creates groups of people based on recognition results of people (faces) in images, obtained by the face recognition unit 31 of the image analyzing unit 27.

The face recognition unit 31 has a function of extracting (recognizing) people (faces) from images, based on image data stored in the image database 42 of the storage unit 14. The face clustering unit 26 performs clustering processing from the results from the grouping unit 25.

Upon the operating unit 12 having been operated, the operation determining unit 22 judges what sort of operation the operation was. Based on the determination results by the operation determining unit 22, the person correlation data updating unit 24 updates the data stored in the person correlation database 41.

The information processing device 13 having such a configuration is built into, for example digital cameras, video cameras, cellular phones, smart phones, PDAs (Personal Digital Assistant), home servers, television receivers, and so forth. Alternatively, the information processing device 13 is provided as an application for a personal computer or the like realizing the functions of the information processing device 13.

The information processing device 13 to which an embodiment of the present invention has been applied can classify multiple images based on correlation between people in the images, which will be described below in detail. Accordingly, the information processing device 13 can be realized as a device or application described above, having functions of recording images and processing images.

About Grouping

Figure 2:
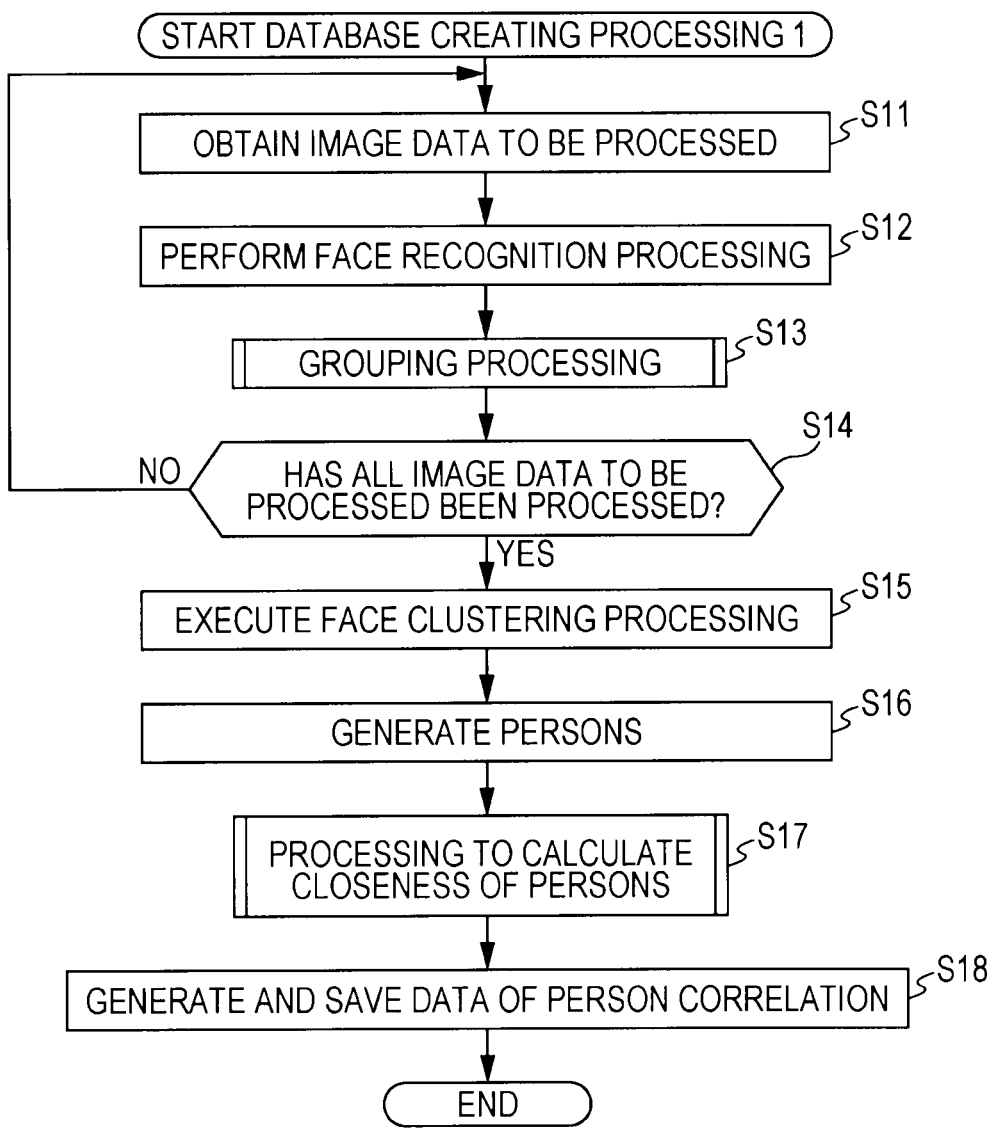
FIG. 2 is a flowchart for describing creating of a database.

Next, the processing which the information processing device 13 performs will be described. The processing relating to creation of the person correlation database 41 will be described with reference to the flowchart shown in FIG. 2. Note that the flowchart in FIG. 2 is a simplified description of the overall flow, and detailed description will be given later as appropriate.

In step S11, image data to be processed is obtained. The processing in step S11 is performed by the face recognition unit 31 obtaining image data from the image database 42. Accordingly, such processing assumes that image data relating to multiple images is stored in the image database 42.

In step S12, face recognition processing is performed. The face recognition unit 31 performs recognition by extracting faces from the image with regard to persons in images based on the obtained image data. When obtaining image data from the image database 42, the face recognition unit 31 also obtains an image ID which allows the image data to be uniquely discerned. As a result of the face recognition unit 31 performing face recognition processing, positions of faces in the image, sizes of faces, orientations of faces, attributes of faces (e.g., gender, age, etc.), feature amounts of faces, and so forth, are extracted. Also, each face is allocated a unique ID (hereinafter referred to as "face ID") for uniquely identifying that face.

Note that a face recognition technique, which the present Assignee has proposed earlier, may be applied for an algorithm relating to the face recognition performed by the face recognition unit 31. This face recognition technique is described in Japanese Unexamined Patent Application Publication Nos. 2005-284487 and 2005-157679, and accordingly description will be omitted here.

In step S13, grouping processing is performed. The grouping processing is performed by the grouping unit 25 using the recognition results from the face recognition unit 31. A group is a collection of one or more recognized faces. This grouping processing will be described later with reference to FIG. 3 and subsequent drawings.

Upon grouping processing being executed and a group being created in step S13, in step S14 judgment is made regarding whether or not all image data to be processed has been processed. In the event that the face recognition unit 31 judges that there is still image data which has not been subjected to face recognition in the image database 42, the flow returns to step S11, and image data to be newly subjected to processing is obtained. The processing following step S11 is then repeated on the new image data.

On the other hand, in the event that judgment is made in step S14 that all image data to be processed has been processed, the flow advances to step S15. The processing of steps S11 through S14 is performed on one set of image data (on one image) stored in the image database 42 at a time, and the processing of step S15 and the subsequent steps is performed on multiple sets of image data (multiple images).

Performing the processing of steps S11 through S14 results in a state wherein there are multiple images with one or more groups detected, from one image. Images regarding which no groups have been detected are not subjected to the processing of step S15 and the subsequent steps. Multiple groups detected from multiple images are subjected to the processing of step S15 and the subsequent steps. A group includes at least one person (face). In other words, that which includes one or more recognized faces is a "group" as used here.

In step S15, face clustering processing is executed. The face clustering unit 26 performs face clustering on multiple groups, which is processing for handling the same face as the same person. As a result, one or more persons, in most cases multiple persons, are detected. The face clustering unit 26 uses the face recognition feature amounts and face IDs supplied from the face recognition unit 31, and image IDs, to perform grouping for each individual judged to be the same person using similarity in face recognition feature amounts.

In step S16, faces judged to be the same person are subjected to processing wherein face IDs are correlated, for example, so as to be handled as the same person. Thus, multiple persons are generated. In step S17, the closeness of the multiple persons that have been generated is calculated. Calculation of closeness will be described later, following description of grouping processing and so forth.

Upon closeness being calculated in step S17, the results thereof are used to further decide tags between persons. Tags between persons are tags indicating the relationship between the persons, such as a person A and a person B being "husband and wife", "parent and child", "friends", or the like. Detailed description relating to deciding tags will be described later.

Upon a tag being decided in step S17, person correlation data is generated from the information thereof, and stored in the person correlation database 41 (step S18), which is how data records are generated in the person correlation database 41. The person correlation database 41 holds data relating to what sort of relationship that persons extracted from images are in.

About Grouping Processing

Next, the grouping processing executed in step S13 will be described with reference to the flowchart shown in FIG. 3. This grouping processing is performed at the grouping unit 25.

In step S31, face information is obtained. As described above, the grouping unit 25 is supplied from the face recognition unit 31 with positions of faces in the image, sizes of faces, orientations of faces, attributes of faces (e.g., gender, age, etc.), feature amounts of faces, and so forth, as recognition results of faces in the image, and step S31 is processing for obtaining this information.

In step S32, filtering processing is executed. Filtering processing is performed to reduce the number of faces to be processed, since attempting to process all faces recognized in the face recognition processing would lead to issues of increased processing and longer time. Still, this has to be performed such that no faces which should be processed are excluded, and this processing is performed based on the processing in the flowchart shown in FIG. 4.

Figure 4:
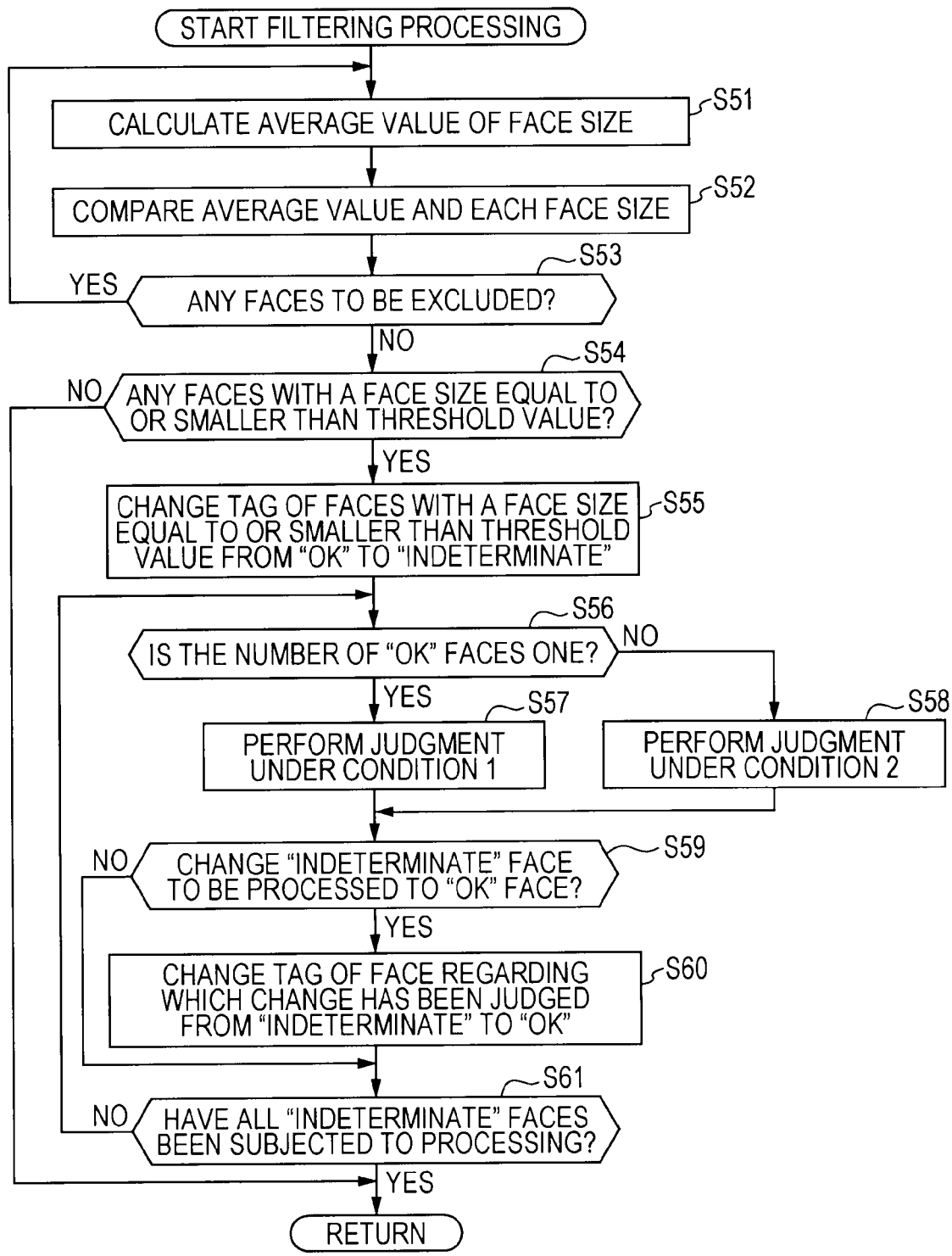
FIG. 4 is a flowchart for describing filtering processing.
Figure 5A:
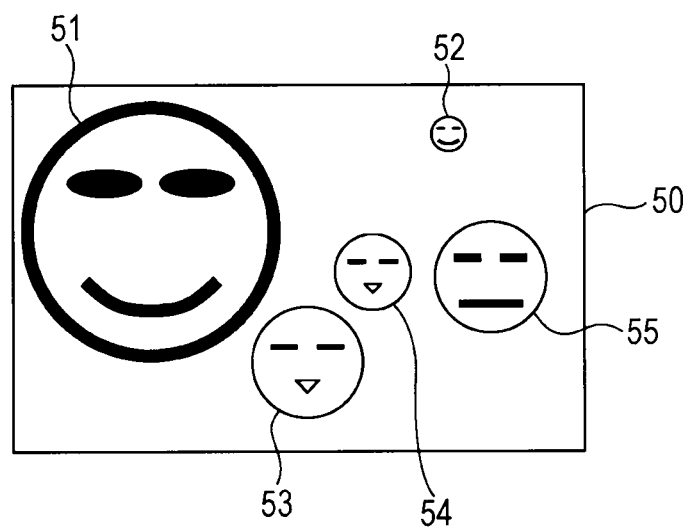
FIGS. 5A and 5B are diagrams for describing filtering processing.

FIG. 4 is a flowchart for describing filtering processing executed in step S32. In step S51, the average value of the face size is calculated. FIG. 5A illustrates a case wherein five faces of face 51 through face 55 have been detected in an image 50, which will be described exemplarily. In step S51, the average value of the face sizes of the five faces 51 through 55 is calculated.

The average value of the face size is calculated based on the following Expression (1)

$$faceSize_{ave} = \frac{1}{N} \sum_N \max(width_i, height_i) \quad (1)$$

where faceSize_ave represents the average face size (in pixels), N represents the number of tagged faces, width_i represents the width of a face i (in pixels), and height_i represents the height of a face i (in pixels).

In step S52, comparison is performed between the calculated face size average value and the size of each of the faces. For example, the face size average value and the size of the face 51 is compared. This comparison is performed for each face.

In step S3, judgment is made regarding whether or not there are faces to be excluded. This judgment uses the comparison results from step S52, with faces of a size greater than or smaller than a predetermined range for the average value being excluded. A size greater than a predetermined range for the average value is, for example, one greater than a value obtained by adding a certain percentage of the average value to the average value (i.e., greater than 1.5 times the average value). In the same way, a size smaller than a predetermined range for the average value is, for example, one smaller than a value obtained by subtracting a certain percentage of the average value from the average value (i.e., smaller than 0.5 times the average value).

The reason for excluding faces of a size greater than a predetermined range for the average value is as follows. An image including a face having a size greater than a predetermined range for the average value is most likely an image obtained as the result of, for example, the user attempting to take a picture of a person A whereupon a person B which the user did not intend on being in the picture happened to cut in front of the camera, resulting in the person B being of a much larger size in the image. Accordingly, the person B which the user did not intend to shoot is excluded from subsequent processing. For example, in the event that the image 50 shown in FIG. 5A is being processed, the face 51 is judged to be a face greater than the predetermined range for the average value, and is excluded.

Also, the reason for excluding faces of a size smaller than a predetermined range for the average value is as follows. An image including a face having a size smaller than a predetermined range for the average value is most likely an image obtained as the result of, for example, the user attempting to take a picture of a person A, but a person B which the user did not intend on being in the picture happened to be in the background, resulting in the person B being of a much smaller size in the image. Accordingly, the person B which the user did not intend to shoot is excluded from subsequent processing. For example, in the event that the image 50 shown in FIG. 5A is being processed, the face 52 is judged to be a face smaller than the predetermined range for the average value, and is excluded.

A face which has been excluded is tagged with a tag "unacceptable". Tagging a face with the tag "unacceptable" means that the face is not to be processed. Other tags are "OK" and "indeterminate". Tagging a face with the tag "OK" means that the face is to be processed. A face that is tagged with the tag "indeterminate" is processed in certain later-described processing, but is not processed in other processing.

Returning to description of the flowchart in FIG. 4, upon the filtering processing hereof being executed, all recognized faces have been provided with "OK" tags. The steps S51 and S52 are executed as described above, and in the event that judgment is made in step S53 that there is a face to be excluded, the processing is returned to step S51, and the subsequent processing is repeated. At the time of the flow returning from step S53 to step S51, the image to be processed is an image from which faces to be excluded have been excluded.

Figure 5B:
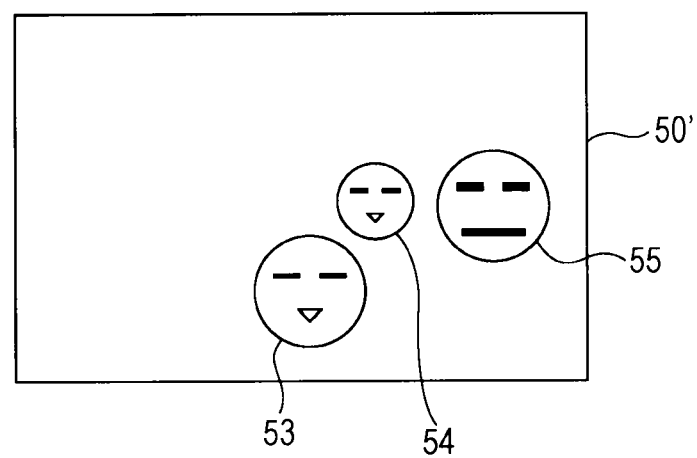

That is to say, if we way that the image 50 shown in FIG. 5A is to be processed, the faces 51 and 52 are excluded, so an image 50' such as shown in FIG. 5B, where there are the three faces of faces 53 through 55, is to be processed. In other words, the faces 51 and 52 have been tagged with "unacceptable" tags, and accordingly the processing step S51 is performed again with the faces 53, 54, and 55, which have been tagged with the "OK" tags, as the faces to be processed.

At this time, in step S51, the image 50' shown in FIG. 5B is to be processed, so the average value of the face size of the three faces 53 through 55 is calculated anew. In step S52, the newly calculated average value is compared with the face size of each of the faces 53, 54, and 55. Judgment of whether or not there is a face to be excluded is performed in step S53 in the same way as described above.

By repeating such processing, faces of around the same size, or in other words, faces which the photographer may have intended to shoot, will remain to be processed, out of the faces within the predetermined image. That is, faces which are excessively large or excessively small in comparison with other faces are detected from the faces in the image to be processed, and are set as faces which will not be processed in subsequent processing.

In the event that judgment is made in step S53 that there are not faces to be excluded, the flow advances to step S54, where judgment is made regarding whether or not there is a face having a face size equal or below a threshold value. For example, in a case wherein the image 50' shown in FIG. 5B is to be processed, judgment is made regarding whether the ratio of the face size of the faces 53, 54, and 55, as to the average value of the face size is equal or below a threshold value. If we way that the threshold value is 0.7 for example, and the ratio of the size of the face 53 as to the average value is equal to or below 0.7, judgment is made in step S54 that the size of the face is equal or below the threshold value.

The reason that judgment is made in step S54 regarding whether or not there is a face having a face size equal or below the threshold value is as follows. That is, there are cases where a face which has an "OK" tag that is smaller than other faces is a face which the photographer intended to shoot, and the face is smaller than the others (the faces of the parents) due to being the face of a child, for example, or being situated behind the others and accordingly being smaller in the image than the others, and so forth (hereinafter referred to as "first case").

There are also cases wherein the person was not intended to be in the picture, and accordingly the size of the face is smaller than the others (hereinafter referred to as "second case"). Whether or not a face has a face size equal or below the threshold value is judged in step S54 to judge whether the first case or the second case is true.

In the event that judgment is made in step S54 that there is a face having a face size equal or below the threshold value, the flow advances to step S55. In step S55, the tag of the face regarding which judgment has been made that the face size is equal or below the threshold value is changed from the "OK" tag to an "indeterminate" tag. At this point, the face which has been tagged with the "indeterminate" tag is a face regarding which judgment is not readily made regarding whether the photographer intended to shoot this face or not. Accordingly, whether or not this face should be processed in subsequent processing excluding a portion thereof is indeterminate, so the "indeterminate" tag is applied.

For example, the face 54 in image 50' shown in FIG. 5B is smaller than the faces 53 and 55, and accordingly the size may be smaller in ratio than the threshold value for the face size average value. In this case, the tag for the face 54 is changed to an "indeterminate" tag. Description will proceed here assuming that the face 54 has been changed to an "indeterminate" tag.

In step S56, judgment is made regarding whether or not the number of faces with an "OK" tag (hereinafter, simply "OK" face) is one. In the case of the image 50' such as shown in FIG. 5B, the faces 53 and 55 are "OK" faces, so in step S56 judgment of "No" is made, and the flow advances to step S58. If only the face 53 had been an "OK" face, judgment of "Yes" would have been made in step S56, and processing would have proceeded to step S57.

In step S57 or step S58, judgment is made regarding whether to revert the "indeterminate" tag to an "OK" tag. As described above, an "indeterminate" face to which an "indeterminate" tag has been applied is a face regarding which the intent of the photographer is not readily judged, and the processing of step S57 or step S58 is processing for judging whether or not the photograph has intentionally shot that face.

In step S57, judgment is performed on an image with only one "OK" face within the image under Condition 1. With Condition 1 judgment is made regarding whether the conditions of the following Expression (2) are satisfied, and a value calculated based on Expression (3) is used to perform the judgment in Expression (2)

$$\text{flag}_i = \text{true: if} \exists (\text{faceDist}_{i,j} < \text{faceSize}_{ave} \times \text{threshold}_{facedist}) \quad (2)$$

$$\text{faceDist}_{i,j} = \sqrt{(x_i - x_j)^2 + (y_i - y_j)^2} \quad (3)$$

where flag_i represents whether an "indeterminate" face i satisfies the conditions, and faceDist_(i, j) represents the distance between an "indeterminate" face i and an "OK" face j.

Expression (3) is an expression for calculating the distance between an "indeterminate" face and an "OK" face to be processed. In Expression (3), (xi, yi) are coordinates of the "indeterminate" face, and (xj, yj) are coordinates of the "OK" face. In the event that the distance of the two faces faceDist_(i, j) is smaller than a value obtained by multiplying the face size average value faceSize_ave by a predetermined threshold value threshold_facedist, determination is made that the result is "true" (a "true" flag is set). A judgment result of "true" means that the "indeterminate" flag is to be changed to an "OK" flag.

As can be seen here, Condition 1 is a condition for determining whether or not the distance between an "OK" face and an "indeterminate" face is within a predetermined range, and if within a predetermined range, a judgment result is made to change the tag to "OK". In the event that the "OK" face and "indeterminate" face are within a predetermined distance range, this can be judged as being an image such as, for example, parents and a child being in the image together, so the distance therebetween is close but the child is smaller in the image. Persons in such an image are judged to be persons which the photographer has intentionally shot, and accordingly are to be processed in subsequent and are provided with the "OK" tag.

On the other hand, in step S58, judgment is performed based on Condition 2. In Condition 2, first, an approximation line l represented in Expression (4) is obtained. Coefficient a and coefficient b of the approximation line l represented with Expression (4) are each calculated based on Expression (5) and Expression (6). The distance lineDist$_{(i,l)}$ between the approximation line l and the "indeterminate" face to be processed is calculated based on Expression (7). In the event that a value obtained by multiplying the calculated distance lineDist_(i, l) by a predetermined threshold value threshold$_{facedist}$ satisfies Expression (8) which is a judgment expression, a judgment of "true" is made.

Approximation line (approxLine)l: $y = ax + b$ $$a = \frac{n\sum_{k=1}^{n} x_k y_k - \sum_{k=1}^{n} x_k \sum_{k=1}^{n} y_k}{n\sum_{k=1}^{n} x_k^2 - \left(\sum_{k=1}^{n} x_k\right)^2} \quad (5)$$

$$b = \frac{\sum_{k=1}^{n} x_k^2 \sum_{k=1}^{n} y_k - \sum_{k=1}^{n} x_k y_k \sum_{k=1}^{n} x_k}{n\sum_{k=1}^{n} x_k^2 - \left(\sum_{k=1}^{n} x_k\right)^2} \quad (6)$$

$$lineDist_{i,1} = \frac{|y_i - ax_i - b|}{\sqrt{1 + a^2}} \quad (7)$$

$$\text{flag}_i = \text{true: if} = \exists (lineDist_{i,1} < faceSize_{ave} \times \text{threshold}_{inedist}) \quad (8)$$

With Condition 2, judgment is made regarding an image wherein two or more "OK" faces exist, regarding whether or not an approximation line l passing through the two or more "OK" faces, and the "indeterminate" face, are within a predetermined range, thereby judging whether or not the photographer intended to shoot that person.

In step S59, judgment is made regarding whether or not judgment has been made to change the tag of the face to be processed which has been provided with the "indeterminate" tag, to an "OK" tag. This judgment is made according to whether a "true" judgment result is obtained for that face in step S57 or step S58.

In the event that judgment is made in step S59 that the tag of the face is to be changed, the flow advances to step S60, where the tag of the face regarding which judgment has been made to be changed is changed from "indeterminate" to "OK".

In the event that judgment is made in step S59 that the tag of the face is not to be changed, or following the tag being changed in step S60, the flow advances to step S61, where judgment is made regarding whether or not all faces with "indeterminate" tags have been subjected to processing.

In the event that judgment is made in step S61 that not all faces with "indeterminate" tags have been subjected to processing, the flow returns to step S56, and the processing of step S56 and subsequent steps are repeated on faces with "indeterminate" tags that have not been processed yet. When the processing of step S56 and subsequent steps is repeated, the face changed to the "OK" tag in step S60 is handled and processed as an "OK" face.

Figure 3:
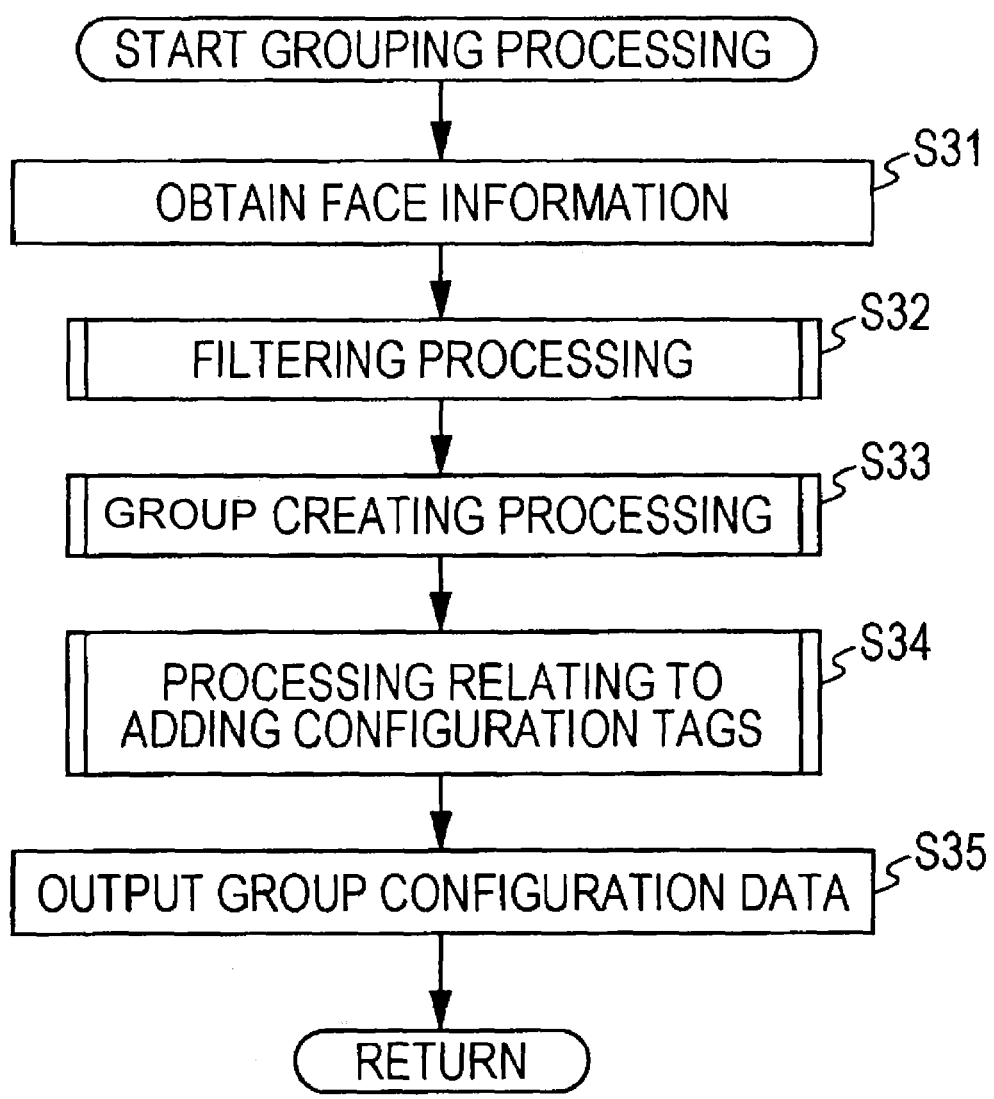
FIG. 3 is a flowchart for describing grouping processing.

In the event that judgment is made in step S54 that there are not faces equal to or smaller than the face size average value, or in the event that judgment is made in step S61 that all faces with "indeterminate" tags have been processed, the filtering processing shown in FIG. 4 ends, and the flow advances to step S33 (FIG. 3). Upon the filtering processing ending, from step S33 on the faces to be processed, i.e., "OK" faces, have thus been decided.

About Group Creating Processing

In step S33 (FIG. 3), group creating processing is executed. This processing is processing for classifying multiple persons within the image into one or multiple groups. The grouping processing executed in this step S33 will be described with reference to the flowchart shown in FIG. 6.

In step S81, group creating pre-processing is executed. This processing is processing that does not have to be provided (i.e., is omissible), but performing this pre-processing can alleviate the processing load later on. The group creating pre-processing executed in step S81 will be described with reference to the flowchart in FIG. 7.

About Group Creating Pre-Processing in Group Creating Processing

In step S101, judgment is made regarding whether or not the number of "OK" faces in the image is three or more. In the event that the number of "OK" faces is one or two, and accordingly, judgment is made in step S101 that the number of "OK" faces in the image is not three or more, the group creating pre-processing ends. That is to say, in the event that the number of "OK" faces in the image to be processed is one or two, no group creating pre-processing is performed.

On the other hand, in the event that the number of "OK" faces in the image is judged to be three or more in step S101, the flow advances to step S102. In step S102, an approximation line is created for all "OK" faces in the image. This approximation line will be referred to as a "tentative approximation line".

The tentative approximation line is calculated based on the following Expression (9)

$$\text{Tentative approximation line(tentative-approxLine)} \quad l\_tentative:y=ax+b \quad (9)$$

where coefficient a and coefficient b are calculated based on Expression (5) and Expression (6).

Note that the approximation line generated in the filtering processing described with reference to the flowchart in FIG. 4 regarding which processing has already ended may be used for the tentative approximation line generated in step S102. In step S58 in the filtering processing, an approximation line is generated using "OK" faces when performing judgment under Condition 2. The approximation line generated in step S58 may be used as the tentative approximation line to be generated in step S102.

Note that the approximation line generated in step S58 may be used as the tentative approximation line to be generated in step S102 in the event that biasing in the distribution of "OK" faces is small, but in the event that the distribution of "OK" faces is biased as to the approximation line generated in step S58, a tentative approximation line is generated again in step S103.

In step S103, the distance between each "OK" face in the image and the tentative approximation line is obtained. This distance is calculated based on Expression (7). In step S104, on which side of the tentative approximation line more "OK" faces are distributed is checked. The image can be divided into two regions by the tentative approximation line. Which of these regions includes more "OK" faces is judged. In step S105, whether or not the distribution state is biased is determined. An example of a case wherein judgment is made that this is biased is a case wherein "OK" faces are distributed above and below the approximation line.

In step S105, in the event that judgment is made that the distribution is biased, the flow advances to step S106. In step S106, "OK" faces at the side where there is a greater distribution are extracted. That is to say, "OK" faces in the region where there are more "OK" faces are extracted. Description will be made with reference to FIG. 8 regarding an exemplary case wherein an image 101 is to be processed, to describe processing in the above-described steps S102 through S106 and the processing after step S106.

Five faces 111 through 115 have been detected in the image 101 as "OK" faces. In step S102, a tentative approximation line is created using the five faces 111 through 115. The generated tentative approximation line is shown in the image 101 in FIG. 8 as tentative approximation line 110. Faces 111 and 112 are above the tentative approximation line 110, and faces 113 through 115 are below the tentative approximation line 110. Accordingly, a greater number of faces are distributed below the tentative approximation line 110 as compared to above in this drawing.

In the case of the image 101, the "OK" faces extracted in step S106 are faces 113, 114, and 115. These faces 113, 114, and 115 are taken to be "approximation line candidate" faces in step S107. In the event that the faces 111 and 112 are situated on the tentative approximation line 110, these faces 111 and 112 will be taken as "approximation line candidate" faces even if they are not situated in a region as to the tentative approximation line 110 where a greater number of faces are.

In step S108, an approximation line is created with the "OK" faces taken as "approximation line candidate" faces, based on the following Expression 10

$$\text{Approximation line(approxLine)} l:y=ax+b \quad (10)$$

where coefficient a and coefficient b are calculated based on Expression (5) and Expression (6).

In the event that an approximation line is created in step S108, or in the event that judgment is made in step S105 that the distribution is not biased, the flow advances to step S109. In step S109, the "OK" faces are sorted in order from the closest to the generated approximation line. Note that all "OK" faces detected within the image are "OK" faces to be sorted at this time, not just the "approximation line candidate" faces. For example, in the case of the image 101 shown in FIG. 8, the faces 111 through 115 are to be sorted.

Also, in the event that the flow has advanced to step S109 from step S108, the approximation line created in step S108 is used as the approximation line, while in the event that the flow has advanced to step S109 from step S105, the tentative approximation line calculated in step S102 is used as the approximation line.

Upon an approximation line being generated and "OK" faces being sorted in order of closeness to the approximation line, processing relating to group creating pre-processing ends. Having performed this pre-processing enables grouping to be performed using the approximation line in later-described subsequent processing, so group candidates can be formed with a relatively high level of precision at an early stage. This enables processing such as quitting processing based on precision comparison in an early stage in the subsequent processing for creating other candidates and so forth, thereby enabling overall improvement in the processing speed.

About Grouping by Distance from Center of Gravity in Group Creating Processing

Upon the group creating pre-processing (FIG. 7) in step S81 (FIG. 6) ending, the flow advances to step S82. In step S82, grouping processing by distance from the center of gravity is executed. This "grouping processing by distance from the center of gravity" is processing wherein the center of gravity is calculated for all faces to be processed (i.e., "OK" faces), and groups are generated based on the distance of the faces from the center of gravity. The grouping processing by distance from the center of gravity executed in step S82 will be described with reference to the flowchart in FIG. 9.

In step S131, the average size of "OK" faces is calculated for the "OK" faces in the image, which are the faces in the image to be processed with "OK" tags. The average face size is calculated based on the following Expression (11)

$$faceSize_{ave} = \frac{1}{N} \sum_N \max(width_i, height_i) \qquad (11)$$

where faceSize_ave represents the average face size (in pixies), N represents the number of faces with the "OK" tag, width_i represents the width of a face i (in pixels), and height_i represents the height of a face i (in pixels).

In step S132, center of gravity coordinates for all "OK" faces within the image are calculated based on the following Expression (12)

$$x_g = \frac{1}{n} \sum_{k=1}^{n} x_k$$

$$y_g = \frac{1}{n} \sum_{k=1}^{n} y_k \qquad (12)$$

where x_g represents the x-coordinate of the center of gravity, y_g represents the y-coordinate of the center of gravity, and n represents the sum of "OK" faces.

In step S133, the distance between each "OK" face within the image and the center of gravity is calculated. Of the calculated distances, the greatest value and smallest value are extracted, and the difference thereof is calculated. In step S134, judgment is made regarding whether or not the difference value calculated in step S133 is smaller than the average face size calculated in step S131.

Figure 9:
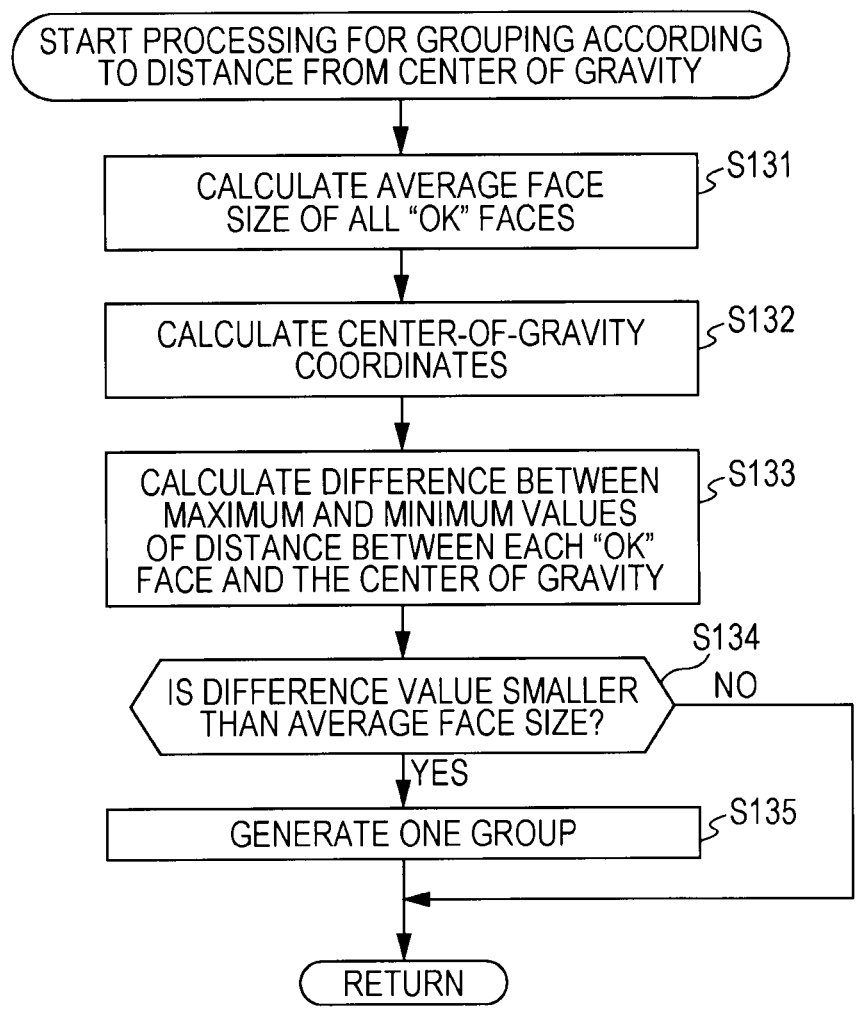
FIG. 9 is a flowchart for describing grouping processing according to distance from the center of gravity.

In the event that determination is made in step S134 that the difference value is smaller than the average face size, the flow advances to step S135, where one group including all of the "OK" faces within the image is generated, and the grouping by distance from the center of gravity shown in FIG. 9 ends. On the other hand, in the event that determination is not made in step S134 that the difference value is smaller than the average face size, the grouping by distance from the center of gravity shown in FIG. 9 ends.

Figure 10A:
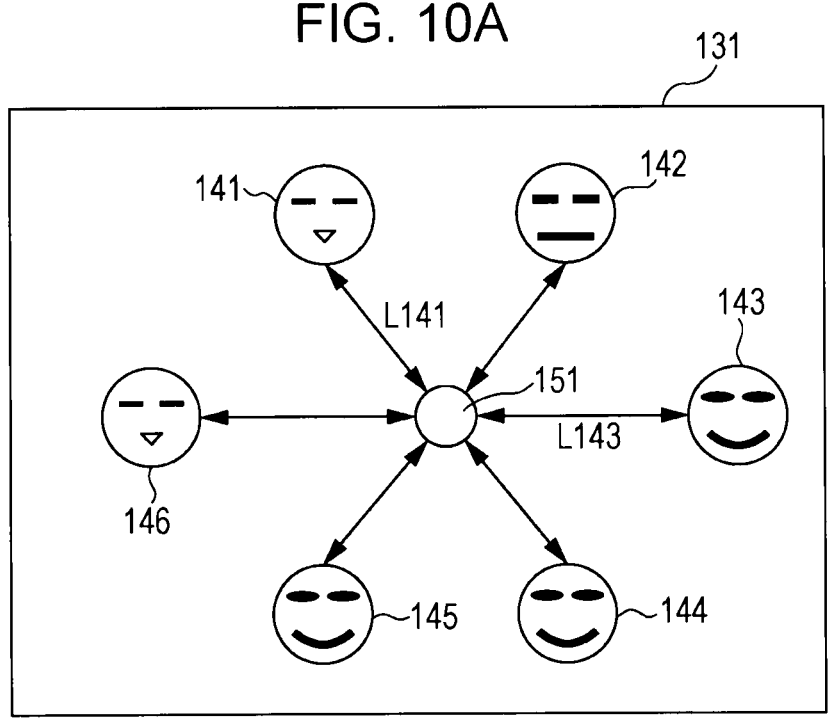
FIGS. 10A and 10B are diagrams for describing grouping according to distance from the center of gravity.

Now, additional description will be made again regarding grouping by distance from the center of gravity, with reference to FIGS. 10A and 10B. FIG. 10A is a diagram illustrating an example of a case of grouping by distance from the center of gravity. "OK" faces 141 through 146 are in an image 131 shown in FIG. 10A. A center of gravity 151 is calculated in step S132 from the position relation of the "OK" faces 141 through 146. Note that in FIG. 10A, the center of gravity 151 and arrows have been drawn in for explanatory purposes, and are not actually imaged in the image 131. This holds true for other images as well.

In the image 131, the center of gravity 151 is the center portion of the image 131, with the "OK" faces 141 through 146 surrounding the center of gravity 151. Now, we will say that of the distances between the "OK" faces 141 through 146 and the center of gravity 151, the distance between the "OK" face 141 and the center of gravity 151 is the shortest, and we will refer to this as distance L141. Also, we will say that the distance between the "OK" face 143 and the center of gravity 151 is the longest, and we will refer to this as distance L143. We will further say that there is little difference between the distance L141 and the distance L143, as can be seen from FIG. 10A.

In such a case, in step S133 the difference value between the distance L141 and the distance L143 is calculated. This difference value is either zero or close to zero. Accordingly, in step S134, judgment is made that the difference value is smaller than the average face size. In such a case, the "OK" faces 141 through 146 are formed into one group.

Figure 10B:
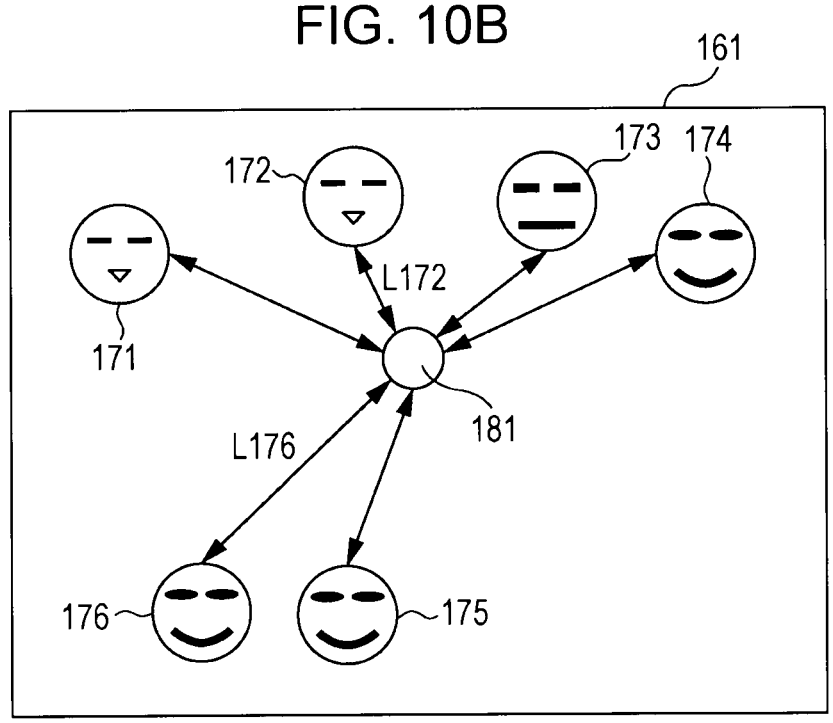

In the event of an image 161 such as shown in FIG. 10B, a group is not generated by grouping processing by distance from the center of gravity. With the image 161, "OK" faces 171 through 176 have been shot situated throughout the image such as shown in FIG. 10B. In the case of the image 161, the distances from the center of gravity 181 vary. Here, we will say that of the distances between the "OK" faces 171 through 176 and the center of gravity 181, the distance between the "OK" face 172 and the center of gravity 181 is the shortest, and we will refer to this as distance L172. Also, we will say that the distance between the "OK" face 176 and the center of gravity 181 is the longest, and we will refer to this as distance L176.

In a case of placement of "OK" faces such as in the image 161, the difference between the distance 173 and the distance 176 is considerable. Accordingly, in the judgment in step S134, judgment is made that the difference value between the distance 173 and the distance 176 is not smaller than the average face size. In the case of image 161, the grouping processing by distance from the center of gravity does not generate a group.

Thus, groups are generated by grouping processing by distance from the center of gravity in cases wherein the faces are situated in a circular form as shown in FIG. 10A, such as when the subjects are standing or sitting in a circle, for example. People forming such a circle can be thought to be people with some sort of relation to each other. The grouping processing by distance from the center of gravity is performed to generate a group for such people.

Figure 6:
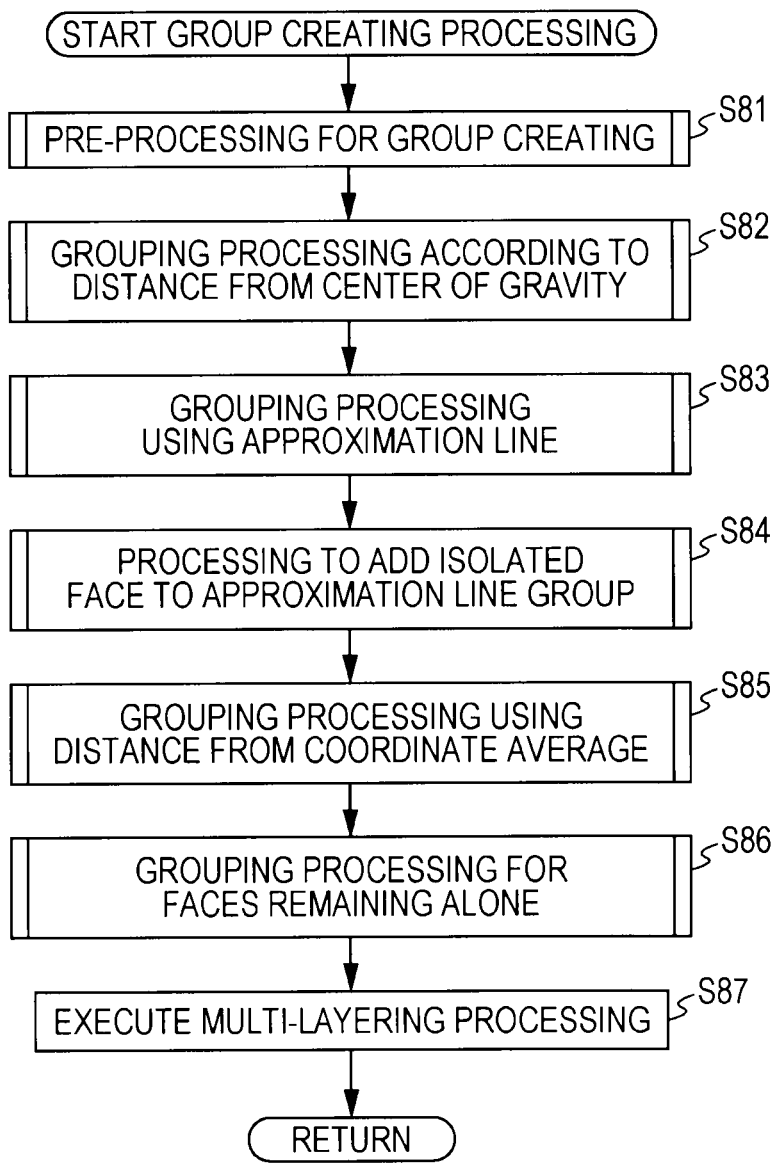
FIG. 6 is a flowchart for describing group creating processing.

In the event of a group being generated as the result of such processing having been performed, the processing from step S83 and on in the flowchart in FIG. 6 is omitted, and processing is performed as to the generated group. On the other hand, in the event that no group is generated as the result of such processing having been performed, the flow advances to the processing in step S83 (FIG. 6), and grouping processing using an approximation line is executed.

About Grouping Processing Using Approximation Line in Group Creating Processing

In step S83, grouping processing using an approximation line is performed. This is processing wherein a first face to serve as a reference is selected from the faces to be processed, an approximation line is generated from the positions of the first face and a second face, and faces are selected with a distance from the approximation line, and a ratio as to the average value of the size of faces to be processed, being equal to or below a certain value. The grouping processing using an approximation line which is executed in step S83 will be described below with reference to the flowchart shown in FIG. 11.

Figure 7:
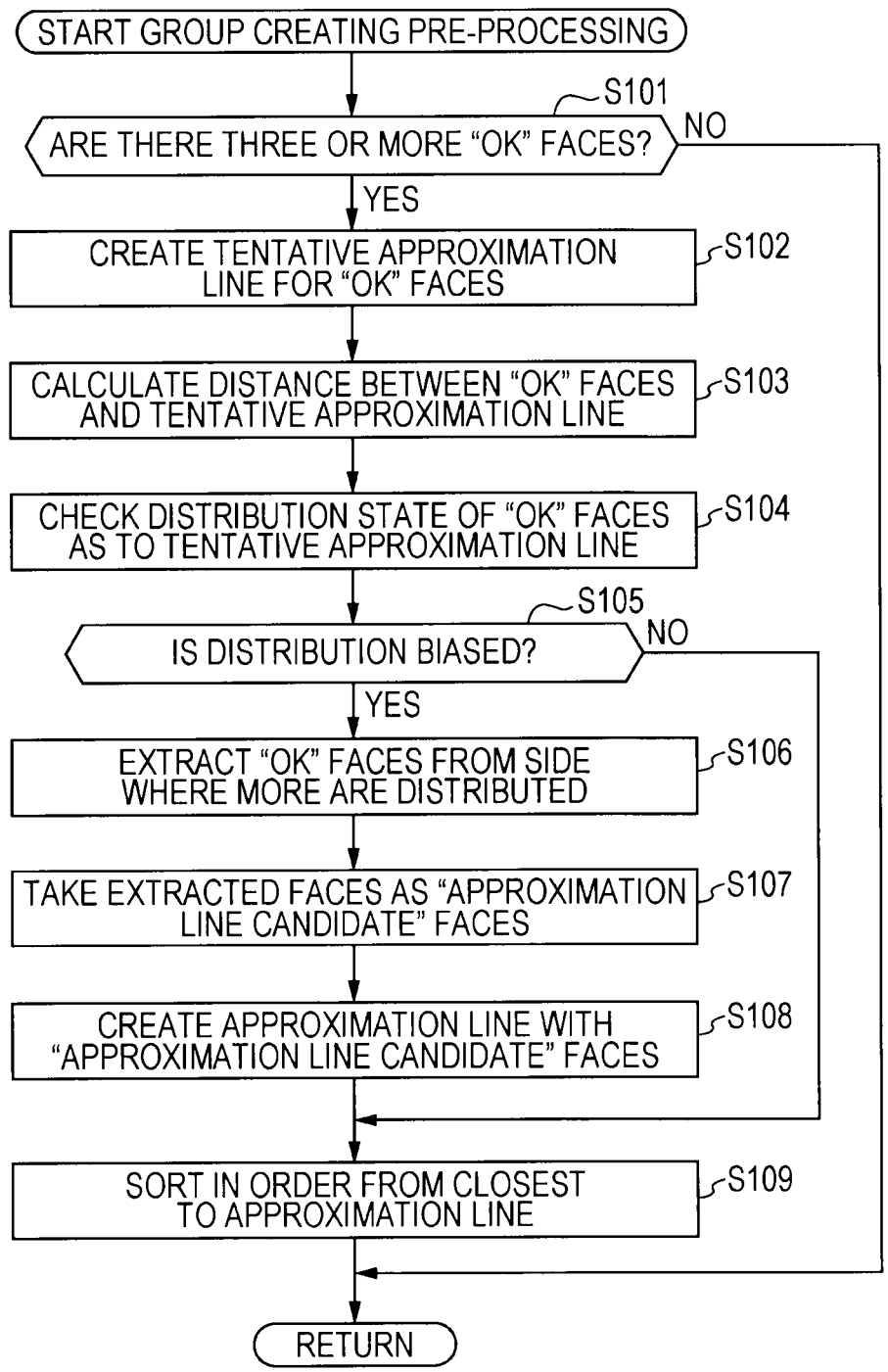
FIG. 7 is a flowchart for describing group creating pre-processing.

In step S161, one face is selected from all the "OK" faces within the image as the first face to serve as a reference. This selection is performed using the processing results of step S81 (FIGS. 6 and 7). That is to say, the sorted results are used to select in order of closest distance to the approximation line. Other faces are subsequently taken as the first face in order, so in step S163, there is processing for judging whether or not all faces have been taken as the first face.

In step S162, extracting processing of group faces including the first face is executed. Due to this processing of step S162 being performed, a group is generated with the "OK" face serving as the first face at that point in time as a reference. In other words, whether or not there are faces which will be grouped with the first face is executed in the processing in step S162. Detailed description of the processing in step S162 will be described later with reference to the flowchart in FIG. 12.

Upon the extracting processing of group faces including the first face in step S162 ending, the flow advances to step S163, where judgment is made regarding whether or not all faces have been processed as the first face. In the event that judgment is made in step S163 that not all faces have been processed as the first face, the flow returns to step S161, and the subsequent processing is repeated.

On the other hand, in the event that judgment is made in step S163 that all faces have been processed as the first face, the flow advances to step S164. In the event that a group has been generated in the processing up to step S163, the approximation line used for grouping is registered in step S164.

Extracting processing of group faces including the first face, which is executed in step S162, will be described with reference to the flowchart shown in FIG. 12.

In step S191, a second face i is selected. This second face i is selected from the "OK" faces within the image to be processed other than the "OK" face taken as the first face. In step S192, the distance between the selected second face i and the first face is calculated, and judgment is made regarding whether or not the distance that has been calculated is equal to or below a certain value (threshold value). The processing in step S192 is processing for searching for a first face and a nearby-situated face.

In step S192, in the event that judgment is made that the distance between the first face and the second face is not equal to or less than a predetermined value, the flow returns to step S191, where a second face is selected anew, and the same processing is repeated.

On the other hand, in the event that judgment is made that the distance between the first face and the second face is equal to or less than a predetermined value, the flow advances to step S193, and the value of a counter is set to 2. This counter indicates the number of faces which have a possibility of being grouped with the first face serving as a reference, plus the first face. The initial value of the counter is 1, since the first face has already been selected. Accordingly, in the event that judgment is made that the distance between the first face and the second face is equal to or less than a predetermined value, this means that the second face has been added, and thus the value of the counter goes to 2.

In step S194, processing for searching for other faces is performed. This processing for searching for other faces is processing for making a search regarding whether or not there are faces to be further added to the group made up of the first face and the second face, in addition to the first face and the second face. The processing for searching for other faces in step S194 will be described with reference to the flowchart shown in FIG. 13.

In step S231, all "OK" faces other than the first face and the second face are placed in a set O. In step S232, the first face and the second face are placed in a set G. At this point, a set G and a set O are generated, with the set G including the first face and the second face, and all other faces being included in the set O.

Figure 14:
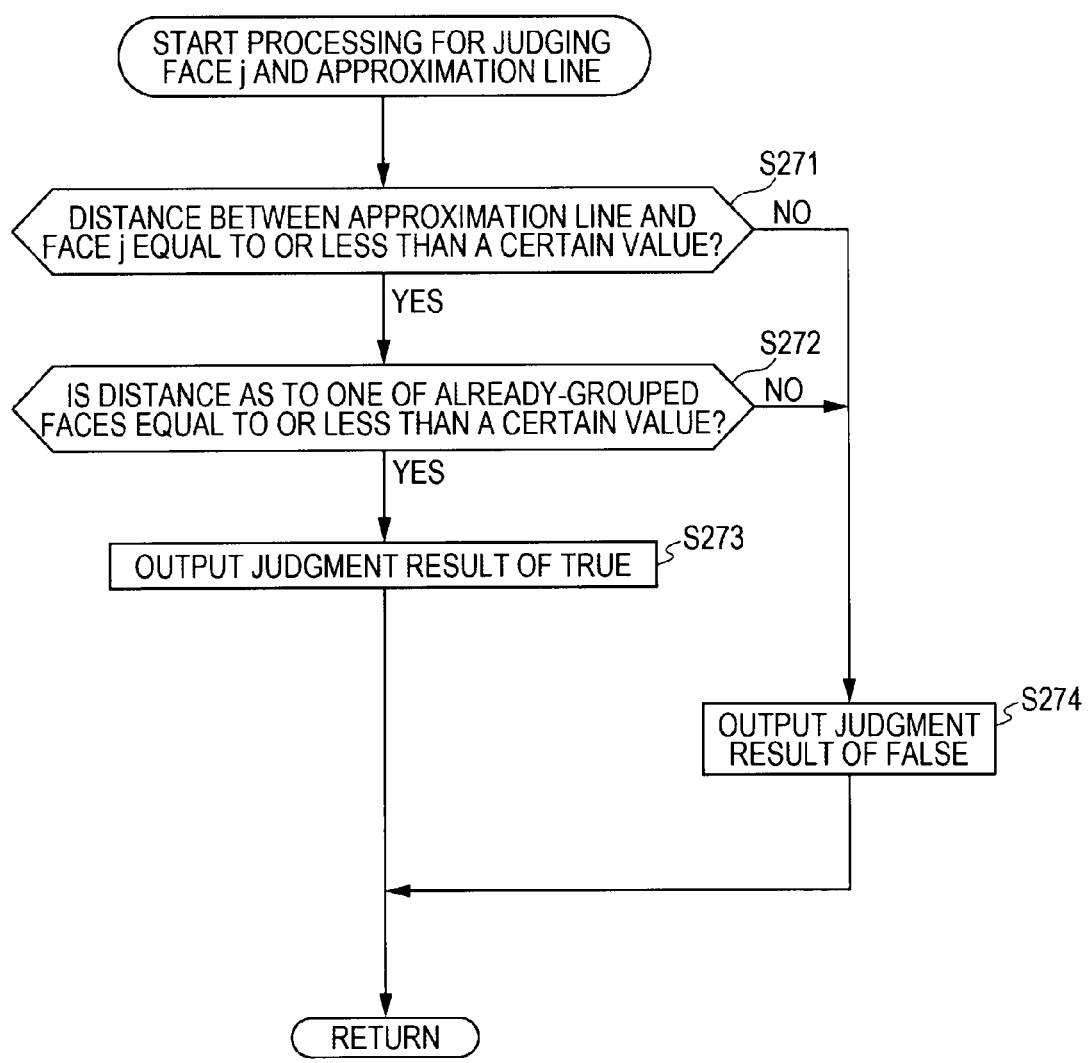
FIG. 14 is a flowchart for describing judging processing regarding a face j and an approximation line.

In step S233, a face j is selected from the set O. In step S234, an approximation line including the face j in the faces in the set G is created. That is to say, in this case, an approximation line is generated from the first face, the second face, and the face j. In step S235, processing for judging the face j and approximation line is executed. The judging processing of the face j and approximation line executed in step S235 will be described with reference to the flowchart in FIG. 14.

In step S271, judgment is made regarding whether or not the distance between the approximation line and the face j is equal to or less than a predetermined value (threshold value). In the event that judgment is made in step S271 that the distance between the approximation line and the face j is equal to or less than a predetermined value, the flow advances to step S272. In step S272, judgment is made regarding whether or not the distance between the face j and one of the faces that have already been grouped is equal to or less than a predetermined value. In the event that judgment is made in step S272 that the distance between the face j and one of the faces that have already been grouped is equal to or less than a predetermined value the flow advances to step S273.

That is to say, in the event that judgment is made that the face j is close to the approximation line, and is also close to a face used to generate the approximation line other than the face j itself (i.e., in this case, the first face or the second face), in step S273 a judgment result of "true" is output. The processing then advances to step S236 (FIG. 13).

On the other hand, in the event that judgment is made in step S271 that the face j is not close to the approximation line, or judgment is made in step S272 that the face j is not close to one of the faces used to generate the approximation line, the flow advances to step S274, where a judgment result of "false" is output.

That is to say, in the event that judgment is made that the face j is not close to the approximation line, or is close to the approximation line but not close to one of the faces used to generate the approximation line (in this case, the first face or the second face), a judgment result of "false" is output in step S274. The flow then advances to step S236 (FIG. 13).

Figure 13:
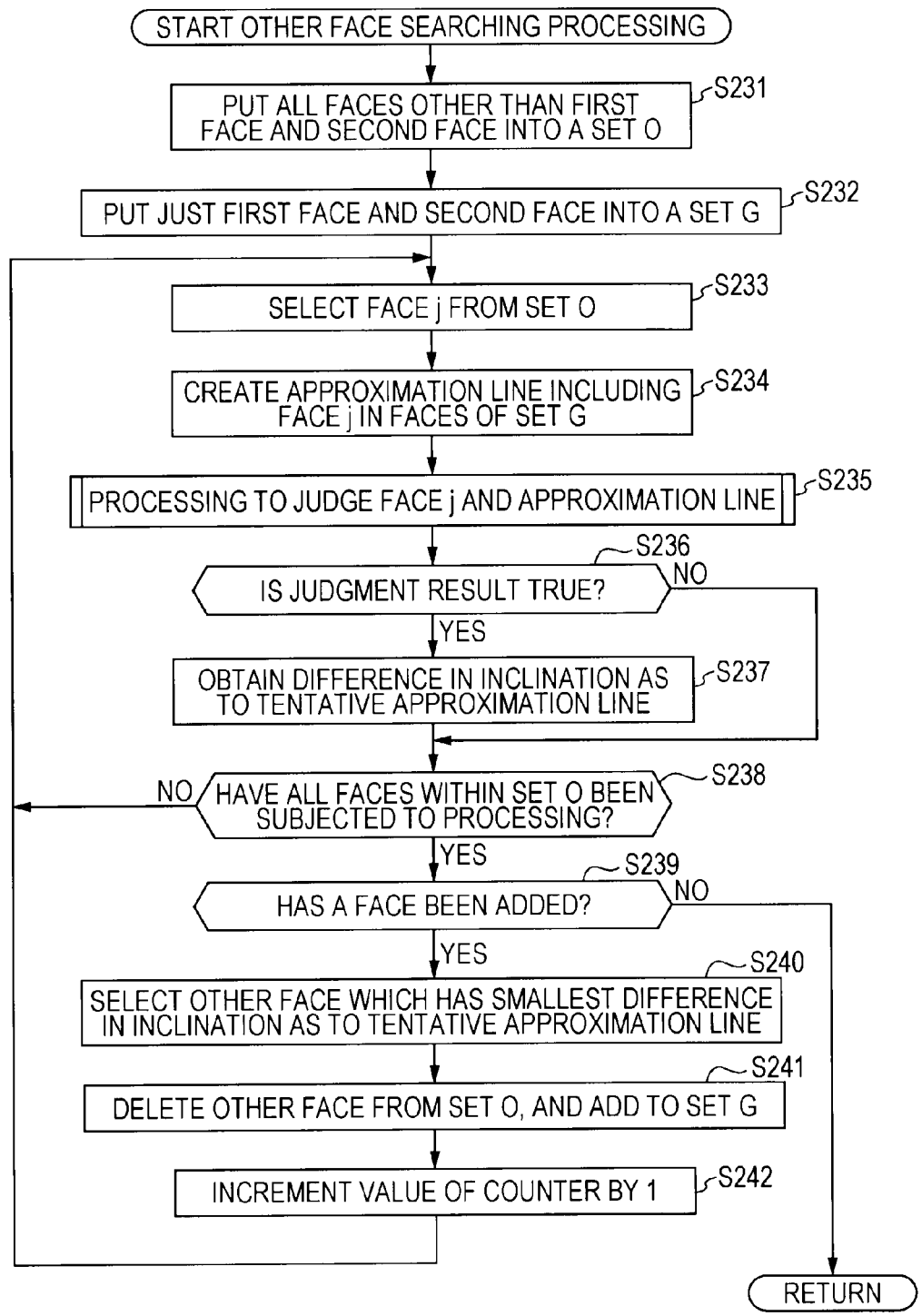
FIG. 13 is a flowchart for describing other face searching processing.

Returning to description of the flowchart in FIG. 13, in step S235 processing for judging the face j and the approximation line ends, and upon the judgment result being output, judgment is made in step S236 regarding whether the judgment result is true or false. In the event that judgment is made that the judgment result is true, the flow advances to step S237, while in the event that judgment is made that the judgment result is false, the flow skips the processing in step S237 advances to step S238.

In step S237, the difference in inclination between the approximation line created in step S234 including the face j regarding which judgment of "true" has been made, and the tentative approximation line, is obtained. For this tentative approximation line, the approximation line created in the group creating pre-processing (step S81 in FIG. 6 and the flowchart in FIG. 7) is used (i.e., the tentative approximation line created in the processing in step S102 or the approximation line created in the processing in step S108 is used). The difference value in inclination calculated between the approximation line created in step S234 and the tentative approximation line is temporarily stored, and the flow advances to step S238. The face j regarding which the difference value has thus been calculated is taken as a candidate for addition to the group which is being processed at that time.

In step S238, judgment is made regarding whether or not all faces within the set O have been subjected to processing. In the event that judgment is made in step S238 that not all faces within the set O have been subjected to processing, the flow returns to step S233, a face which has not yet been subjected to processing is selected, and the processing from step S233 and on is repeated. Thus, the processing of steps S233 through S238 is repeated so as to extract faces j to serve as candidates for addition to the group which is being processed at that time. In the event that judgment is made in step S238 that all faces within the set O have been subjected to processing the flow advances to step S239.

In step S239, judgment is made regarding whether or not a face has been added. In other words, judgment is made regarding whether or not there is a face j taken as a candidate for addition to the group which is being processed at that time. In the event that judgment is made in step S239 a face has been added, the flow advances to step S240. In step S237, the difference value in inclination between the approximation line created in step S234 and the tentative approximation line has been calculated for each face j taken as a candidate for addition and stored, so this is used in step S240, and the other face regarding which the smallest difference in inclination has been calculated is selected.

The other face selected in step S240 is deleted from set O in step S241, and added to the set G. Due to a new face being added to the set G, in step S242 the value of the counter indicating the number of faces included in the set G at that time is incremented by 1. The processing is then returned to step S233, and subsequent processing is repeated.

Figure 12:
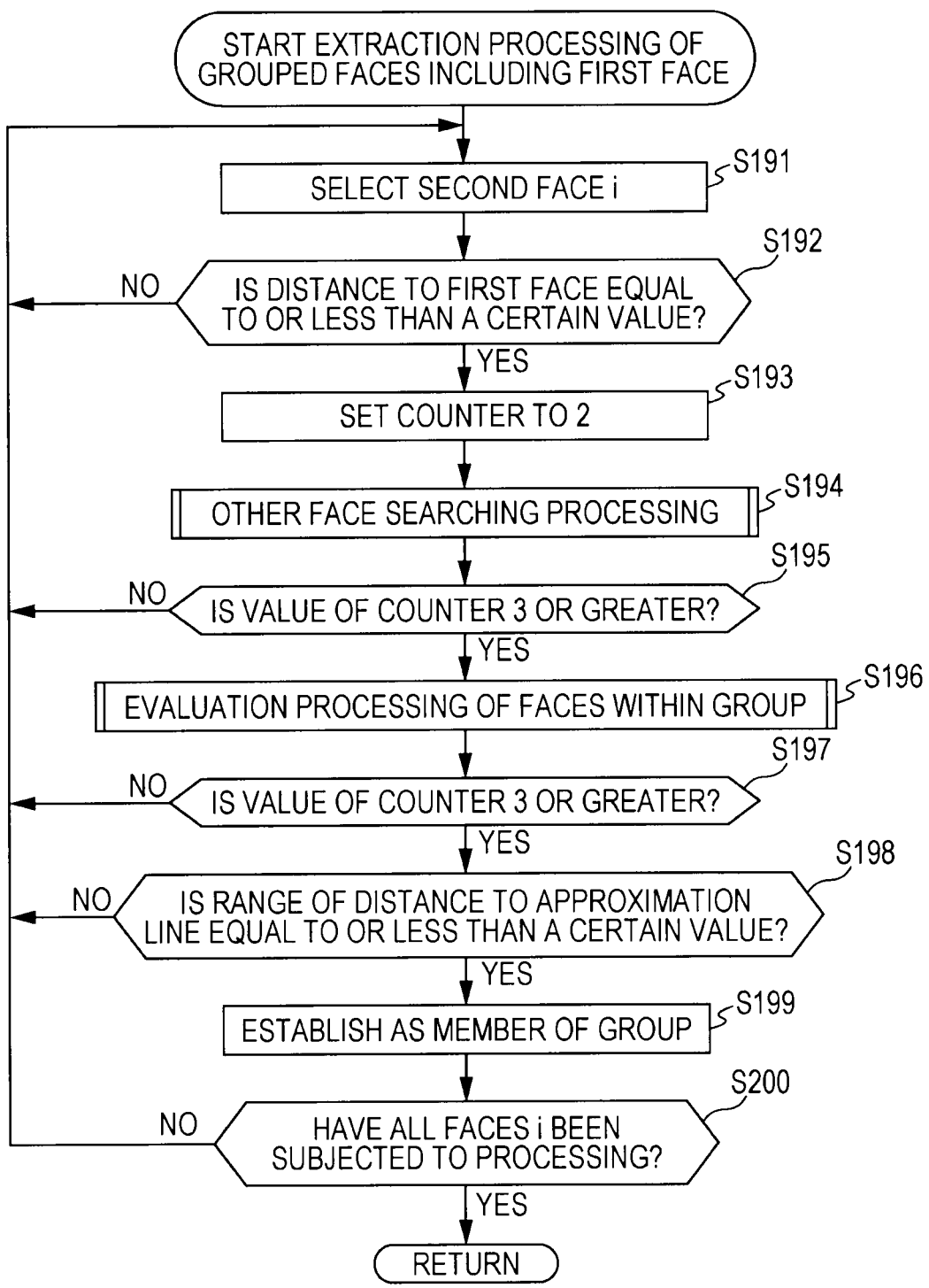
FIG. 12 is a flowchart for describing group face extraction processing including a first face.

On the other hand, in the event that judgment is made in step S239 that no face has been added, in other words that judgment is made that there is no face j to serve as a candidate for addition to the group which is being processed at that time, the other face searching processing based on the flowchart shown in FIG. 13 ends, and the flow advances to step S195 (FIG. 12).

Returning to description of the flowchart in FIG. 12, upon the other face searching processing of step S194 having been performed and the results thereof being output, judgment is made in step S195 regarding whether or not the value of the counter is 3 or greater. In the event that judgment is made in step S195 that the value of the counter is not 3 or greater, the flow returns to step S191, and subsequent processing is repeated. This state represents that no faces other than the first face and the second face were grouped. Note that at this point, the faces have not been finalized as a group, but rather are just candidates for a group.

On the other hand, in the event that judgment is made in step S195 that the value of the counter is 3 or greater, the flow advances to step S196. In step S196, evaluation processing of faces within the group is performed. This evaluation processing of faces within the group is processing for evaluating whether or not the faces listed as candidates for a group should be registered as a group, whether or not the faces are suitable for being included in the group, and so forth. The average face size of faces 113 through 115 is also calculated.

Figure 8:
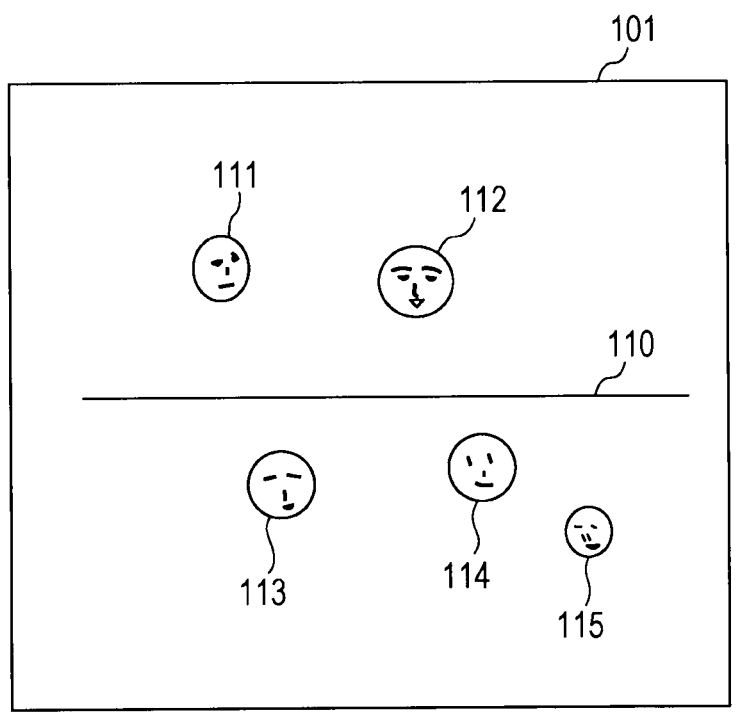
FIG. 8 is a diagram for describing a tentative approximation line.
Figure 15:
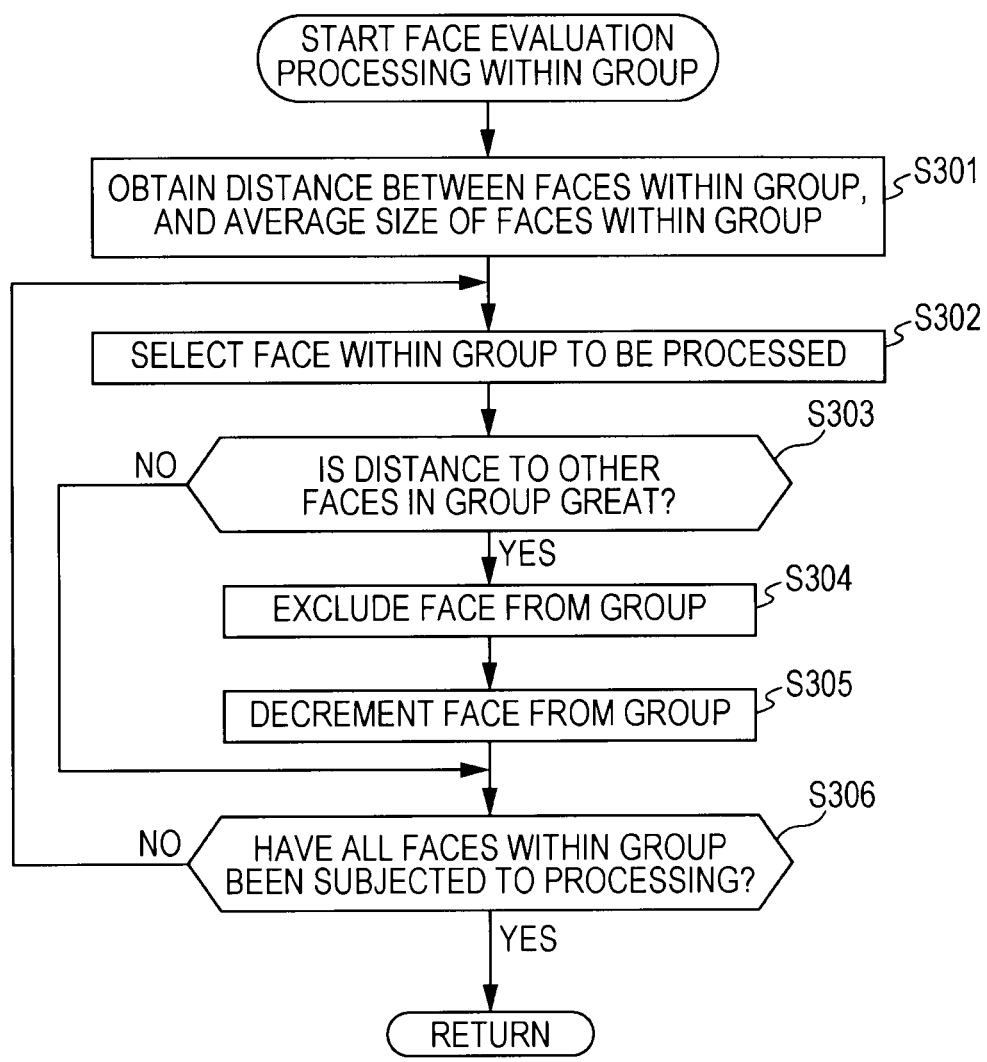
FIG. 15 is a flowchart for describing face evaluation processing within a group.

The evaluation processing of faces within the group executed in step S196 will be described with reference to the flowchart shown in FIG. 15. In step S301, the distance between faces within the group, and the average value of face size (average face size) within the group are calculated. For example, in the event that the image 101 such as shown in FIG. 8 is the image to be processed, and faces 113 through 115 are set as faces within the group, the distance between face 113 and face 114, the distance between face 113 and face 115, and the distance between face 114 and face 115 are each calculated, and temporarily stored.

The calculation results in step S301 are used in the processing in step S302 and subsequent steps. In step S302, a face within the group to be processed is selected. For example, in the above-described case, the face 113 is selected as a face without the group to be processed. In step S303, the face to be processed (e.g., face 113) is subjected to judgment regarding whether the distance to other faces in the group (e.g., face 114 or face 115) is great. This judgment is performed by setting a predetermined threshold value for example, and judging that the distance is great of equal to or greater than the threshold value. Alternatively, the average face size is used, and if the distance is within twice the average face size, processing is performed to judge the distance is not great.

In step S303, in the event that judgment is made that the distance from a face to be processed to other faces in the group is great, the flow advances to step S304. In this case, the face has been selected as a candidate for making up the group, but the distance to other faces is great, so there can be thought to be a possibility that the face is not suitable to be included in that group. Accordingly, in step S304, the face to be processed is excluded from the group. Excluding this face from the group changes the number of faces in included in the group, so the value of the counter is decremented by 1.

In the event that the value of the counter is decremented by 1 in step S305, or judgment is made in step S303 that a face to be processed is not distant from other faces within the group, the flow advances to step S306. In step S306, judgment is made regarding whether or not all faces within the group have been subjected to processing.

In the event that judgment is made in step S306 that not all faces within the group have been processed, the flow returns to step S302, and the subsequent processing is repeated. On the other hand, in the event that judgment is made in step S306 that all faces within the group have been processed, the processing for evaluating faces within the group ends, and the flow advances to step S197 (FIG. 12).

Returning to description of the flowchart in FIG. 12, upon the processing for evaluating faces within the group ends in step S196 ending, judgment is made based on the evaluation result thereof regarding whether or not the number of faces within the group has increased. That is to say, in step S197, judgment is made regarding whether or not the value of the counter is 3 or greater. In the event that judgment is made in step S197 that the value of the counter is not 3 or greater, the flow returns to step S191 and the subsequent processing is repeated. That is to say, the group face extraction processing including the first face (grouping processing using the approximation line including this processing (step S83 in FIG. 6)) is processing wherein a group is not formed unless at least three faces are included in one group.

On the other hand, in the event that judgment is made in step S197 that the value of the counter is 3 or greater, the flow advances to step S198. In step S198, judgment is made regarding whether or not the range of distance between the approximation line and the faces in the group is within a predetermined range. In the event that judgment is made in step S198 that the range of distance as to the approximation line is not equal to or smaller than a certain value, the flow returns to step S191, and the subsequent processing is repeated. In this case, the group that had been subjected to processing is not set as a group.

On the other hand, in the event that judgment is made that the range of distance as to the approximation line is equal to or smaller than a certain value, the flow advances to step S199. In step S199, the faces are established as members of the group. That is to say, at that point the group being processed is not a group candidate any more but is established, so faces included in that group are established as members making up that group.

Figure 11:
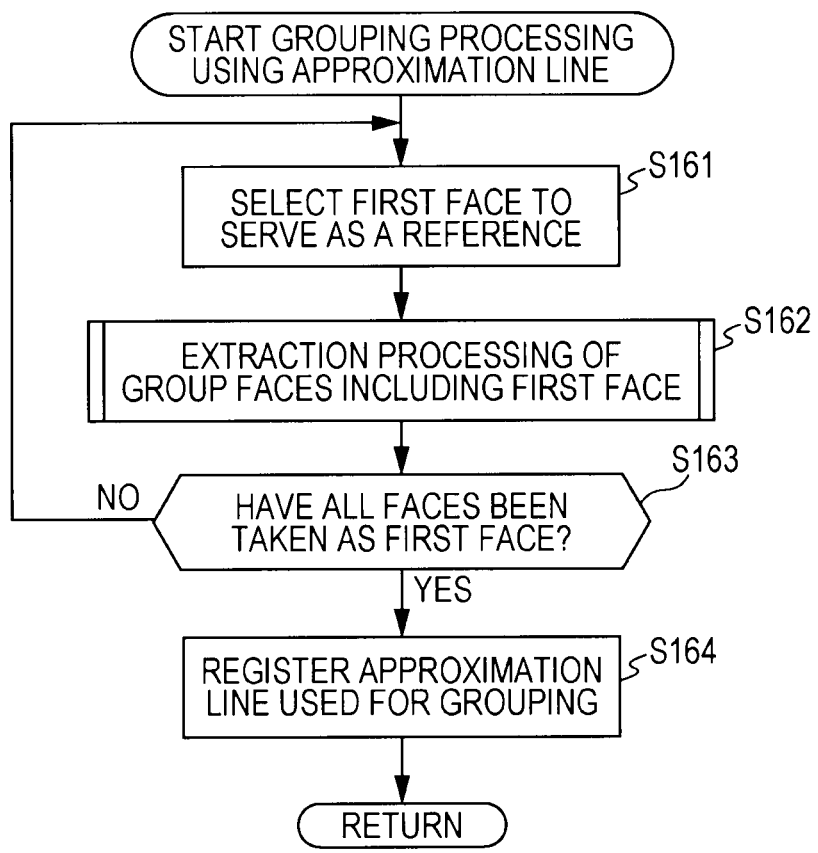
FIG. 11 is a flowchart for describing grouping processing using an approximation line.

Upon the group being established in step S199, the flow advances to step S200. In step S200, judgment is made regarding whether or not all faces i have been subjected to processing. In the event that judgment is made in step S200 that all faces i have not been subjected to processing, the flow returns to step S191, and subsequent processing is repeated. On the other hand, in the event that judgment is made in step S200 that all faces i have been subjected to processing, the processing for extracting group faces including the first face, shown in FIG. 12, is ended, and the flow advances to step S163 (FIG. 11).

In step S163, judgment is made regarding whether or not all faces have been taken as the first face. The processing of step S163 and on has already been described, so description here will be omitted. Upon the approximation line used for grouping being registered in step S164, the flow advances to step S84 (FIG. 6).

Returning now to description of the flowchart shown in FIG. 6, in step S84, isolated faces are added to an approximation line group. The processing in step S84 is processing for judging whether or not there are any faces to add to the group according to the approximation line generated in step S83. Specifically, this is processing for adding a face, which has a certain size as to the average value of face size of the faces included in the group according to the approximation line, and is within a certain range in distance from the approximation line, to that group. The processing to add an isolated face to the approximation line group which is executed in this step S84 will be described with reference to the flowchart in FIG. 16.

About Processing to Add an Isolated Face to Approximation Line Group

In step S331, judgment is made regarding whether or not there are ungrouped "OK" faces or "indeterminate" faces. Only in this "processing to add an isolated face to the approximation line group" is an "indeterminate" face also subjected to processing. In the event that judgment is made that there are no ungrouped "OK" faces or "indeterminate" faces in step S331, the processing to add an isolated face to the approximation line group shown in FIG. 16 ends. That is to say, in this case, there are not faces to process, so processing ends. Accordingly, in the event that judgment is made in step S331 that there are no ungrouped "OK" faces or "indeterminate" faces, the processing for grouping that is to be executed in steps S85 and S86 in FIG. 6 may be omitted and the flow advanced to step S87.

Figure 16:
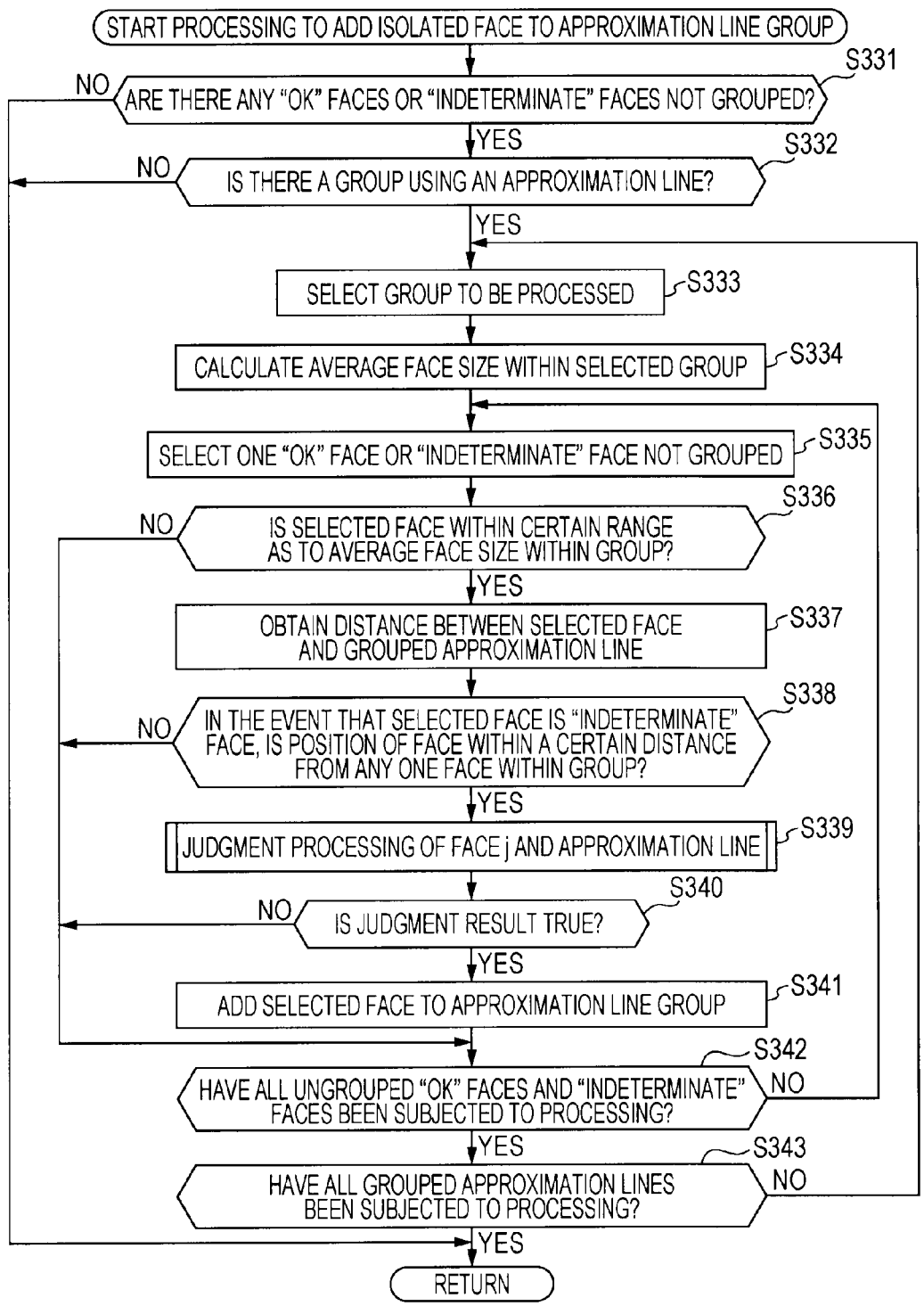
FIG. 16 is a flowchart for describing processing for adding an isolated face to an approximation line group.

On the other hand, in the event that judgment is made in step S331 that there is an ungrouped "OK" or "indeterminate" face, the flow advances to step S332. In step S332, judgment is made regarding whether or not there is a group using an approximation line. A group using an approximation line means a group generated as a result of the "grouping processing using an approximation line" that has been executed earlier in step S83. The "processing to add an isolated face to the approximation line group" shown in FIG. 16 is processing for newly adding a face to a group generated using an approximation line which has already been generated, so in the event that judgment is made in step S332 that there is no such group using an approximation line, the processing of the flowchart shown in FIG. 16 ends.

On the other hand, in the event that judgment is made in step S332 that there is a group using an approximation line, in step S333 the group to be processed is selected. In step S334, the average face size of faces included in the selected group is calculated, and in step S335, one of the ungrouped "OK" or indeterminate" faces is selected, and set to be processed.

In step S336, judgment is made regarding whether or not the face selected to be processed is of a size within a certain range as to the average face size of faces calculated in step S334, i.e., regarding whether or not the selected size is smaller or greater than the average face size. The reason that such judgment is performed is the same as with the case of the processing in steps S51 through S53 described above. To put it simply, the processing of steps S334 through S336 is performed to judge that faces which are drastically larger or smaller as faces already in the group are faces not included in that group, and to exclude such faces from the group (i.e., to prevent such faces from being added).

In step S336, in the event that judgment is made that the selected face is not of a size within the certain range as to the average face size of faces in the group, this means that the selected face is judged not to be added to the group, so the steps S337 through S341 which are processing to add the face are skipped, and the flow advances to step S342.

In the event that judgment is made in step S336 that the selected face is of a size within the certain range as to the average face size of faces in the group, this means that the selected face is a candidate to be added to the group, so the steps S337 through S341 which are processing to add the face are executed. In step S337, the distance between the selected face and the approximation line used for grouping is obtained. The approximation line has been registered in the processing of step S164 (FIG. 11), so this registered approximation line that has been correlated with the group being processed is read out and used.

In step S337, upon the distance between the selected face and the approximation line being obtained, the flow advances to step S338. In step S338, judgment is made regarding whether or not the face selected to be processed is an "indeterminate" face and the position of the face is situated within a certain distance from one of the faces in the group. In the event that the face to be processed is an "indeterminate" face in the judgment in step S338, this evokes a "Yes" judgment in step S338, and the flow advances to step S339.

In the event that the face to be processed is an "indeterminate" face, the distance between the "indeterminate" face and the faces ("OK" faces) within the group is calculated, and judgment is made regarding whether or not the distance is within a certain distance. In the event that judgment is made in step S338 that the distance between the "indeterminate" face being processed and the faces ("OK" faces) within the group is not within a certain distance, the flow advances to step S342. That is to say, in such a case, the "indeterminate" face is judged to not be added to the group being processing, so the processing in steps S339 through S341 is skipped and the flow advances to step S341.

On the other hand, in the event that judgment is made in step S338 that the distance between the "indeterminate" face and the faces ("OK" faces) within the group is within the certain distance, the flow advances to step S339. In step 339, judgment is made regarding the face j (in this case, the "OK" face or "indeterminate" face being processed) and the approximation line. The judgment made regarding the face j and the approximation line is performed based on the flowchart shown in FIG. 14. The flowchart shown in FIG. 14 has already been described, so description here will be omitted.

Executing the processing of step S339 yields a judgment result of "true" or "false". A judgment result of "true" indicates that the face is to be added to the group, while a judgment result of "false" indicates that the face is not to be added to the group. In the event that judgment is made in step S340 that the judgment result is "true", the flow advances to step S341, while in the event that judgment is made in step S340 that the judgment result is "false", the flow skips step S341 and advances to step S342.

In step S341, the face being processed ("OK" face or "indeterminate" face) is added to the group being processed at that point, and is registered. Thus, a face is added and registered to a group which has already been generated.

In step S342, judgment is made regarding whether all ungrouped "OK" faces or "indeterminate" faces have been subjected to processing. In the event that judgment is made in step S342 that not all ungrouped "OK" faces or "indeterminate" faces have been subjected to processing, the flow returns to step S335, an unprocessed "OK" face or "indeterminate" face is selected, and the processing of step S336 and on is repeated on the selected face.

On the other hand, in the event that judgment is made in step S342 that all ungrouped "OK" faces or "indeterminate" faces have been subjected to processing, the flow advances to step S343. In step S343, judgment is made regarding whether all approximation lines used for grouping have been subjected to processing. In the event that judgment is made in step S343 that not all approximation lines used for grouping (i.e., all groups) have been subjected to processing, the flow returns to step S343, a group which has not yet been subjected to processing is selected, and the processing of step S334 and on is repeated.

On the other hand, in the event that judgment is made in step S343 that all approximation lines used for grouping have been subjected to processing, the processing to add an isolated face to the approximation line group shown in FIG. 16 ends, and the flow advances to step S85 in FIG. 6.

Returning to description of the flowchart in FIG. 6, in step S84, isolated faces satisfying conditions are added to a group by the processing for adding isolated faces to approximation line groups. However, there is a possibility that there may be an "OK" face that is not yet added to a group, i.e., not yet grouped. Accordingly, in step S85, grouping processing using distance from coordinate average is executed. This "grouping processing using distance from coordinate average" is processing for selecting a first face from the faces to be processed, obtaining the distance of each face from a coordinate average of other faces including that first face, and based on the distance, creating a group where the distance is the smallest.

Grouping Processing Using Distance from Coordinate Average in Grouping Processing The grouping processing using the distance from the coordinate average executed in step S85 will be described with reference to the flowchart in FIG. 17. In step S361, the set G is made empty. This set G is the set G used in the processing in FIG. 13 for "other face searching processing", and the set G is for placing the first face and the second face. In step S361, the reason that the set G is made empty is that there may be a first face or the like placed therein at the time of performing the "other face searching processing" in FIG. 13, so the set G is made empty to avoid such a situation.

In step S362, judgment is made regarding whether or not the number of "OK" faces not grouped is two or more. Unlike the case of the "processing to add an isolated face to an approximation line group" (step S84 of FIG. 6), with this "grouping processing using the distance from the coordinate average" only "OK" faces are subjected to processing, and "indeterminate" faces with the "indeterminate" tag are not subjected to processing.

Figure 17:
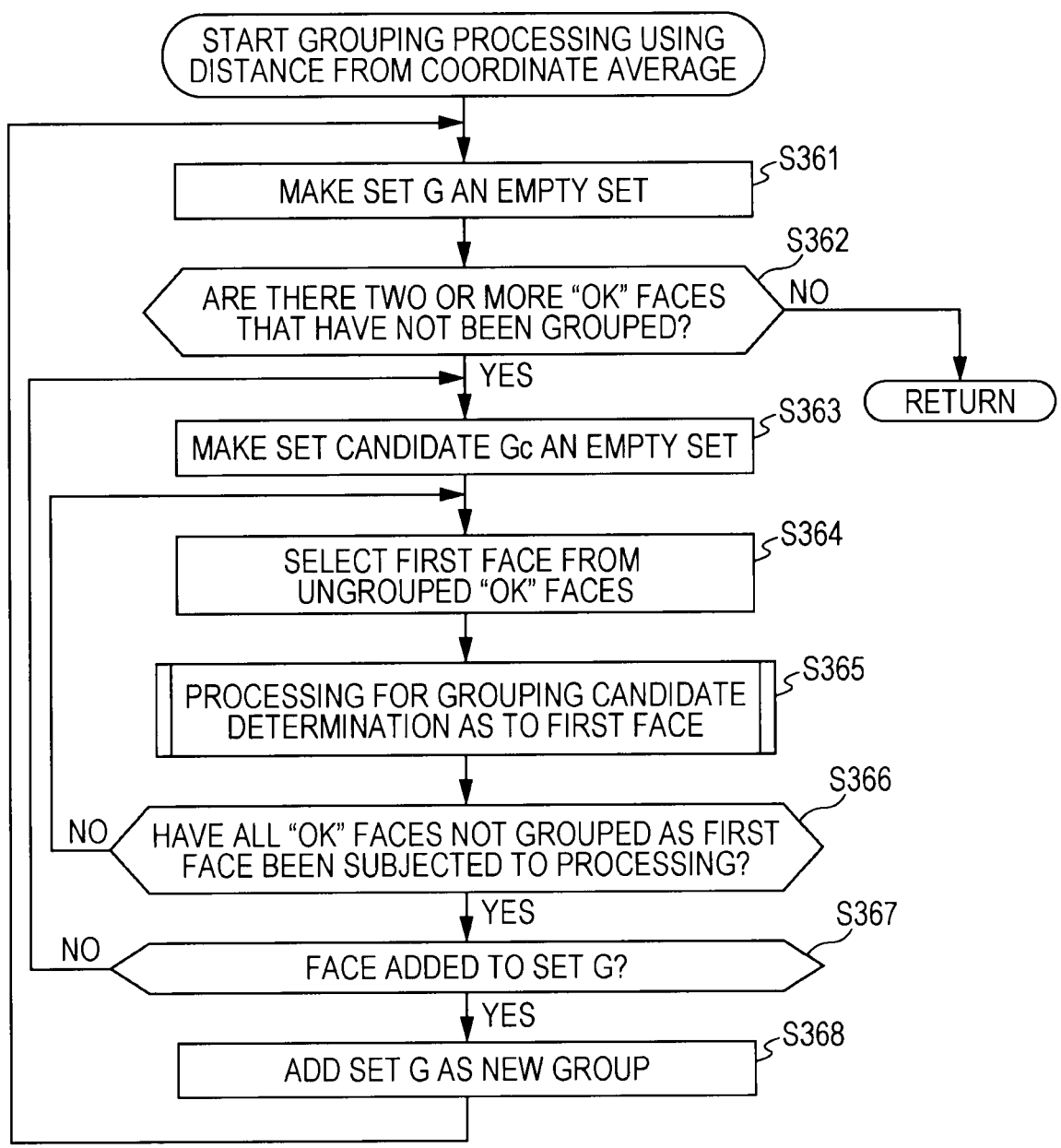
FIG. 17 is a flowchart for describing grouping processing using the distance from a coordinate average.

In the event that judgment is made in step S362 that the number of "OK" faces not grouped is not two or more, the grouping processing using the distance from the coordinate average shown in FIG. 17 ends. That is, at least two faces have to be in the group, so in the event that there are not two or more "OK" faces, the processing ends.

On the other hand, in the event that judgment is made in step S362 that the number of "OK" faces not grouped is two or more, the flow advances to step S363. In step S363, the set candidate Gc is made to be an empty set. This set candidate Gc is a set where candidates for "OK" faces to be added to the set G are placed.

In step S364, the first face is selected from the ungrouped "OK" faces and placed in the set candidate Gc. In step S364, group candidate determining processing as to the first face is executed.

Figure 18:
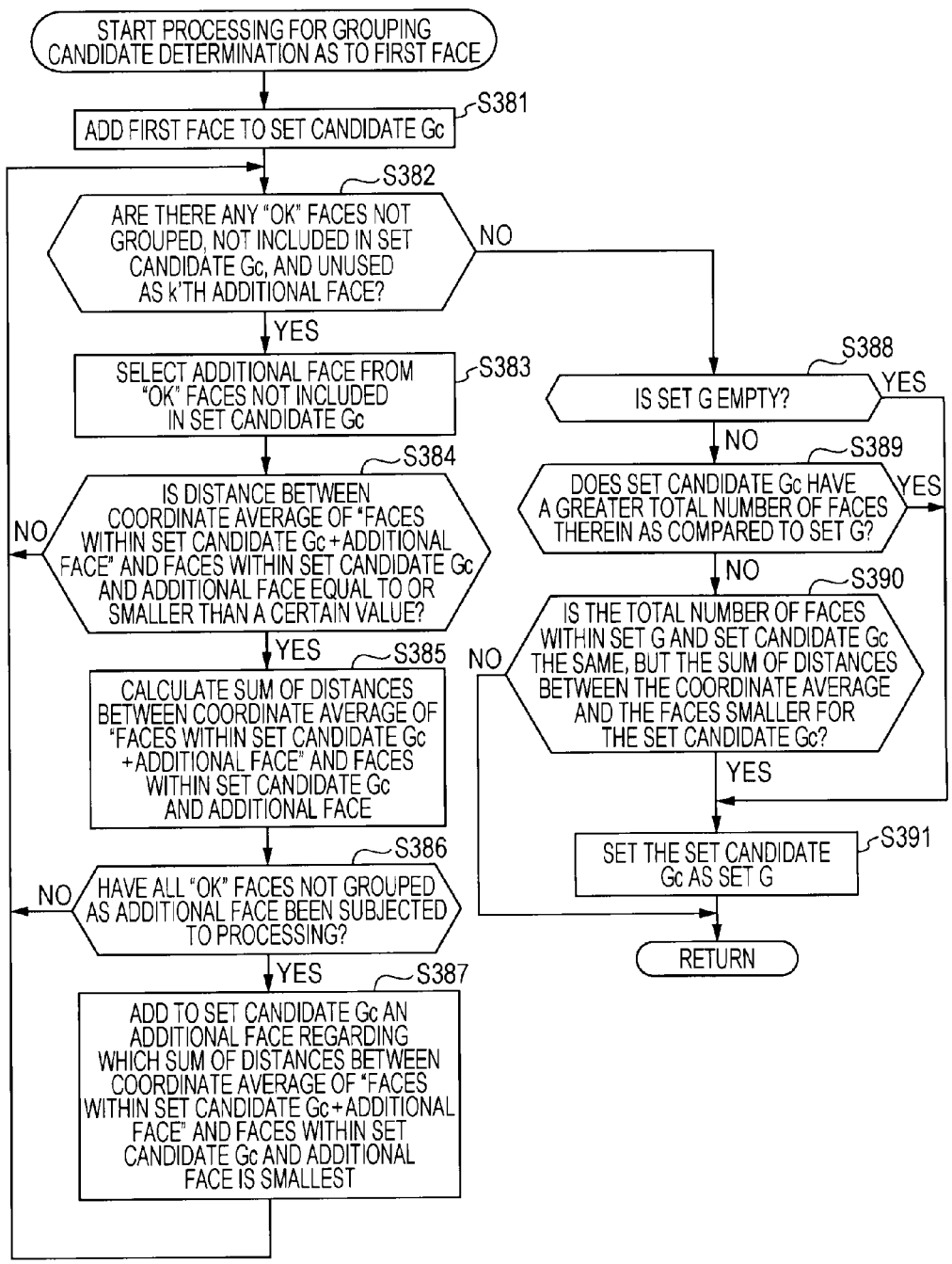
FIG. 18 is a flowchart for describing grouping candidate determination processing regarding a first face.

The "processing for grouping candidate determination as to first face" executed in step S365 will be described with reference to the flowchart shown in FIG. 18.

In step S381, the first face selected in step S364 (FIG. 17) is added to the set candidate Gc. In step S382, judgment is made regarding whether or not there is an "OK" face satisfying the following three conditions within the image to be processed, i.e., whether or not an "OK" face which is Condition 1: not grouped,
Condition 2: not included in set candidate Gc, and
Condition 3: unused as a k'th additional face, is within the image to be processed. Being an "OK" face unused as a k'th additional face, which is Condition 3, means an "OK" face regarding which judgment has not been made regarding whether or not to place in the set candidate Gc as to the first face being processed at that time.

In step S382, in the event that judgment is made that there is an "OK" face satisfying the Conditions 1 through 3, the flow advances to step S383. In step S383, an additional face to be added to the set candidate Gc is selected from the "OK" faces not existing in the set candidate Gc.

In step S384, first, the coordinate average between the faces in the set candidate Gc and the additional faces is calculated. The set candidate Gc includes at least the first face added in step S381, and the distance between the coordinates of the first face, and the coordinates of the "OK" face added in step S383 (added face) is calculated. In the event that only the first face had been added to the set candidate Gc, this calculated distance is the coordinate average between the faces of the set candidate Gc and the added face.

In the event that a face other than the first face is also included in the set candidate Gc, the coordinates of the face other than the first face and the coordinates of the added face are used to calculate the distance. Thus, the distances between all of the faces within the set candidate Gc and the added face are obtained, the sum of the obtained distances is obtained, and the sum is divided by the number of faces within the set candidate Gc, thereby calculating the coordinate average of the faces in the set candidate Gc and the added face.

Further, in step S384, judgment is made regarding whether or not the calculated coordinate average, the distance to each face within the set candidate Gc, and the distance between the calculated coordinate average and the added face, are each equal to or below a certain value (threshold value). For example, the coordinate serving as the coordinate average, and the coordinate of the first face within the set candidate Gc are used, and the distance therebetween (which we will call distance A) is obtained, and the coordinate serving as the coordinate average, and the coordinate of the added face are used, and the distance therebetween (which we will call distance B) is obtained. Judgment is made regarding whether or not these distances A and B are equal to or below the threshold value.

In the event that judgment is made in step S384 that the distances are not equal to or below the threshold value, the flow returns to step S382, and the subsequent processing is repeated. That is to say, an additional face is newly selected, and the processing of step S383 and on is repeated as to the selected additional face.

On the other hand, in the event that judgment is made in step S384 that the distances are equal to or below the threshold value, the flow advances to step S385. In step S385, the average of coordinates of the faces within the set candidate Gc and the additional face, and the sum of distances as to the faces within the set candidate Gc, are obtained. The coordinate average calculated in step S384 can be used for the average of coordinates of the faces within the set candidate Gc and the additional face.

For example, in the event that only the first face has been registered, the average value of coordinates between the first face and the additional face is calculated (or an already-calculated coordinate average is used). Only the first face is registered within the set candidate Gc, so the distance between the first face and the coordinate average is obtained, and this distance is taken as the sum of distances.

For example, in the event that a face other than the first face (which we will call a second face) is included in the set candidate Gc, the distance as to the coordinate average from the second face is also obtained, and the distance obtained by adding that distance with the distance as to the coordinate average from the first face is taken as the sum of distances.

Upon the coordinate average and the distances to each of the faces within the set candidate Gc being obtained, the sum of distances is calculated. Upon the sum of distances being calculated, the flow advances to step S386. In step S386, judgment is made regarding whether or not all ungrouped "OK" faces have been processed as additional faces.

In step S386, in the event that not all ungrouped "OK" faces have been processed as additional faces, the flow returns to step S382, and the subsequent processing is repeated.

On the other hand, in the event that all ungrouped "OK" faces have been processed as additional faces, the flow advances to step S387. As a result of repeating the processing of steps S382 through S386, there is the possibility that there are multiple candidates for faces to be added to the set candidate Gc. In the event that there are multiple such faces, judgment has to be made regarding which additional face is suitable for being added to the set candidate GC being processed at that point, and adding thereto. To this end, the processing in step S387 is performed.

In step S387, an additional face wherein the sum of distances between the coordinate average between the faces within the set candidate Gc and the additional face, and the faces within the set candidate Gc, is the smallest, is added to the set candidate Gc.

For example, let us consider a case wherein a first face, and second face, and a third face exist within the set candidate Gc, and an additional face A and an additional face B are being processed as candidates for faces to be added to the set candidate Gc. In this case, first, a distance 1 between the additional face A and the coordinate average, a distance 2 between the additional face A and the first face, a distance 3 between the additional face A and the second face, and a distance 4 between the additional face A and the third face, are each calculated. The value obtained by adding the distance 1, the distance 2, the distance 3, and the distance 4, is a sum 5.

In the same way, a distance 6 between the additional face B and the coordinate average, a distance 7 between the additional face B and the first face, a distance 8 between the additional face B and the second face, and a distance 9 between the additional face B and the third face, are each calculated. The value obtained by adding the distance 6, the distance 7, the distance 8, and the distance 9, is a sum 10.

In this case, the sum 5 and the sum 10 are compared, and the additional face regarding which the smaller value was calculated is added to the set candidate Gc. For example, if the sum 5 is smaller than the sum 10, the additional face A is added to the set candidate Gc, and becomes the fourth face.

Upon an additional face being added to the set candidate Gc in this way, the flow returns to step S382, and the subsequent processing is repeated. By repeating the processing of steps S382 through S387, faces to serve as candidates which can be grouped with the first face being processed at that time are added to the set candidate Gc.

Upon an additional face being added to the set candidate Gc in step S387, the flow returns to step S382. The processing in step S382 has already been described, being the processing wherein judgment is made regarding whether or not the Conditions 1 through 3 are satisfied. One of these Conditions in step S382 is Condition 3, wherein judgment is made regarding whether or not there is an "OK" face unused as a k'th additional face. Also, in step S386 judgment is made regarding whether or not all ungrouped "OK" faces have been processed as an additional face, and the processing of step S387 is reached when the determination results in step S386 is that all ungrouped "OK" faces have been processed.

Accordingly, when step S387 is reached, all "OK" faces have already been processed, so when the flow goes from step S387 to step S382, the basic understanding is that Conditions 1 through 3 will not be satisfied, and the processing is advanced to step S388.

In step S388, judgment is made regarding whether or not the set G is an empty set. In the event that judgment is made in step S388 that the set G is not an empty set, the flow advances to step S389. In step S389, the total number of faces within the set G and the total number of faces within the set candidate Gc are compared, and judgment is made regarding whether or not the total number of faces within the set candidate Gc is greater than the total number of faces within the set G.

In the event that judgment is made in step S389 that the total number of faces within the set candidate Gc is not greater than the total number of faces within the set G, i.e., in the event that judgment is made that the number is the same or less, the flow advances to step S390. In step S390, judgment is made regarding whether or not the total number of faces within the set candidate Gc and the total number of faces within the set G are the same and also the sum of distances between the coordinate average and each face is smaller for the set candidate Gc.

The sum of distances between the coordinate average and each face has already been calculated in the processing in step S387 for example, for both the set G and set candidate Gc, so these values can be used. As described later, the set candidate Gc is set as the set G, meaning that the set G also has gone through the processing in step S387, and accordingly the sum of distances between the coordinate average and the faces has already been calculated.

In the event that judgment is made in step S390 that the total number of faces within the set candidate Gc and the total number of faces within the set G are the same, and the sum of distances between the coordinate average and each face is smaller for the set candidate Gc, the flow advances to step S391. Step S391 is also reached by judgment being made in step S388 that the set G is not empty, or by judgment being made in step S389 that the number of faces within the set candidate Gc is not greater than the number of faces within the set G.

In step S391, the set candidate Gc being processed at that time is set as the set G. That is to say, the set candidate Gc is set not as a candidate but as a group.

In the event that step S391 is reached from step S388, this is because the group G is empty, so there is nothing to compare with the set candidate Gc, and accordingly steps S389 and S390 have been skipped to reach step S391. Also, in the event that group G is empty, this processing is performed to create a new group by setting the set candidate Gc as set G.

In the event that step S391 is reached from step S389, this is because the number of faces within the set candidate Gc has been judged to be greater than the number of faces within the set G, and accordingly the number of faces within the set candidate Gc can be judged to be a number more appropriate for being set as a group. Accordingly, in this case as well, the set candidate Gc is set as the set G in step S391.

In the event that step S391 is reached from step S390, this is because the total number of faces within the set candidate Gc and the total number of faces within the set G have been judged to be the same, and the sum of distances between the coordinate average and each face to be smaller for the set candidate Gc. This means that the faces within the set candidate Gc are within a narrower range that the faces in the set G. In other words, the faces within the set candidate Gc can be judged to be in closer human relation than the faces within the set G, and in such a case, the set candidate Gc is set as the set G in step S391.

Thus, upon the set candidate Gc being set to the group G in step S391, the "processing for grouping candidate determination as to first face" ends, and the flow advances to step S366 (FIG. 17).

On the other hand, also in the event that the total number of faces within the set candidate Gc and the total number of faces within the set G are the same, and the sum of distances between the coordinate average and each face is smaller for the set candidate Gc in step S390, the "processing for grouping candidate determination as to first face" ends, and the flow advances to step S366 (FIG. 17).

Performing the "processing for grouping candidate determination as to first face" sets the set candidate Gc to the set G, so that a new set G is generated, or the set candidate Gc is not set as the set G and there is no newly generated set G.

In step S366, judgment is made regarding whether or not all ungrouped "OK" faces have bee processed as the first face. In the event that judgment is made in step S366 that not all ungrouped "OK" faces have been processed as the first face, the flow returns to step S364, a new "OK face is selected as the first face, and the subsequent processing is repeated.

Upon all ungrouped "OK" faces being taken as the first face as a result of repeating the processing of steps S364 through S366, judgment is made regarding whether or not to generate a set G. For example, in the event that there are three ungrouped "OK" faces, the processing of steps S364 through S366 is repeated thrice.

In the event that judgment is made in step S366 that all ungrouped "OK" faces have been processed as the first face, the flow advances to step S367. The judgment results here differ depending on whether or not the processing in step S391 (FIG. 18) has been performed. That is to say, in the event that the set candidate Gc has been taken as the set G as a result of the processing in step S391 being performed, judgment is made in step S367 that a face has been added to the set G, and the flow advances to step S368.

On the other hand, in the event that the processing of step S391 has not been performed, the set candidate Gc remains without the set candidate Gc having been taken as the set G, so judgment is made in step S367 that a face has not been added to the set G, the flow returns to step S363, the set candidate Gc is made an empty set, and a new set candidate Gc is created.

In step S368, the set G is added as a new group, the flow returns to step S361, and subsequent processing is repeated. In step S361, the set G is made and empty set, and the subsequent steps S362 and on are repeated, thereby executing processing as to the new set G.

Due to the set G being added as a new group in the processing in step S368, the "OK" faces included in the added set G are grouped "OK" faces, and accordingly are not the object of processing of step S362 and subsequent steps. As a result, in the event that judgment is made in step S362 that there are not two or more ungrouped "OK" faces, i.e., in the event that the number of ungrouped "OK" faces is one or zero, the grouping processing using the distance from the coordinate average shown in FIG. 17 ends, and the flow advances to step S86 (FIG. 6).

Let us return to description of the flowchart in FIG. 6. Due to the grouping processing using the distance from the coordinate average having been performed in step S85, the number of ungrouped "OK" faces is one or zero. In the case that the number is one, this means that there is an "OK" face which has not been grouped, so in step S86 the processing for grouping the face remaining alone is performed. This "processing for grouping face remaining alone" is processing for grouping a face remaining alone that is performed on a face not included in a group, and is processing for grouping a face with a size equal to or greater than a certain value as to the average value of face size.

Grouping Processing for Faces Remaining Alone in Grouping Processing

The grouping processing for faces remaining alone executed in step S86 will be described with reference to the flowchart shown in FIG. 19. In step S411, judgment is made regarding whether or not there is an ungrouped "OK" face. This "grouping processing for faces remaining alone" is performed only for "OK" faces with the "OK" tag, and "indeterminate" faces with the "indeterminate" tag are not subjected to this processing. This processing is executed even if the number of ungrouped "OK" faces is one.

Figure 19:
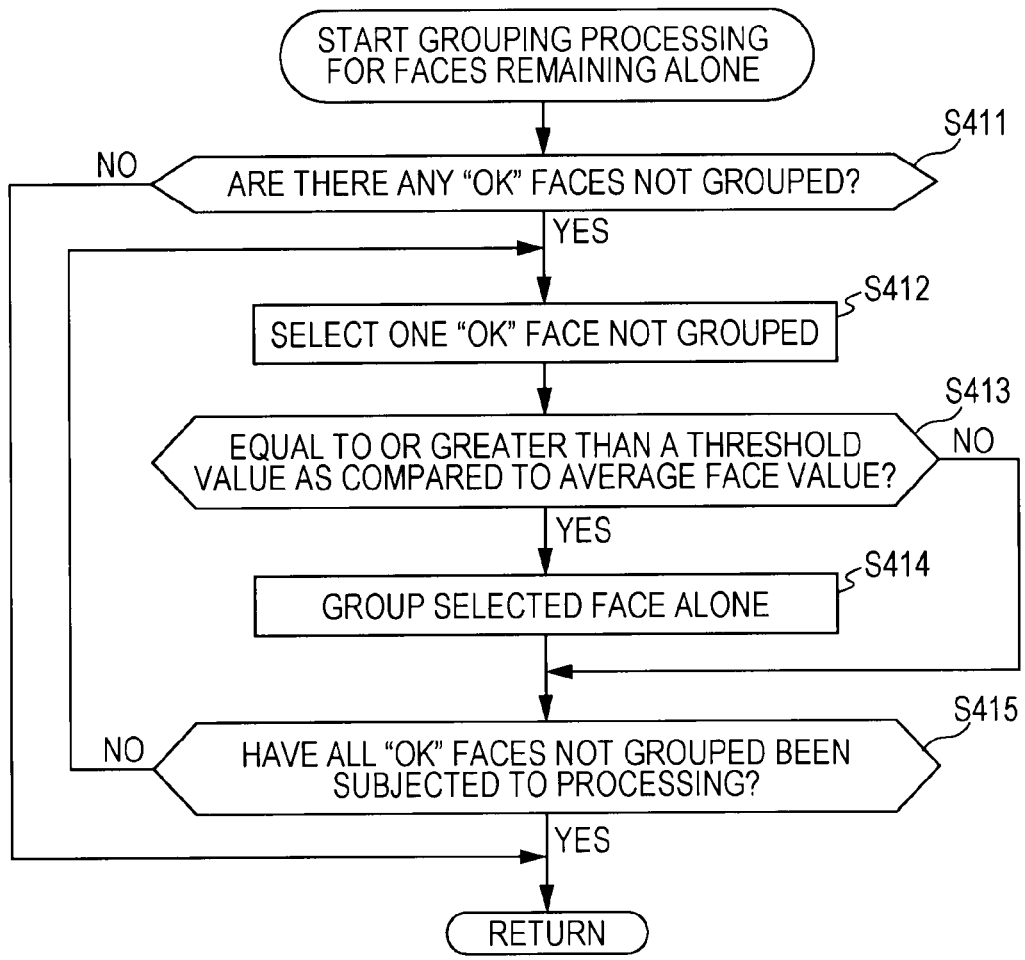
FIG. 19 is a flowchart for describing grouping processing regarding a face remaining alone.

In the event that judgment is made in step S411 that there are no ungrouped "OK" faces, this means that there are not "OK" faces to process, so the processing of the flowchart in FIG. 19 ends.

On the other hand, in the event that judgment is made in step S411 that there is an ungrouped "OK" face, the flow advances to step S412. In step S412, one "OK" face is selected to be processed from ungrouped "OK" faces. In step S413, judgment is made regarding whether or not the size of the selected "OK" face is equal to or greater than the average face size.

The average face size used in step S413 differs depending on whether or not there is a group generated in the processing up to before this processing. That is to say, in the event that at least one group has been generated by having executed the processing of steps S83 through S85, the average value of the size of all grouped faces (all faces included in the group) is used as the average face size in step S413.

On the other hand, in the event that the processing of steps S83 through S85 has been executed but not a single group was generated, the average value of the size of all "OK" faces is taken as the average face size to be used in step S413. In this case, the number of all "OK" faces is one. The reason is that, as described above, in the event that judgment is made that the number of ungrouped "OK" faces is not two or more in step S362 (FIG. 17), the flow advances to step S86, from which the processing of step S413 is executed, so at this point, the number of all "OK" faces is one.

Accordingly, in the event that the processing of step S413 is to be executed in a state where not a single group has been generated, the average face size is the size of the one "OK" face.

In the event that judgment is made in step S413 that the "OK face being processed is of a size equal to or greater than a threshold value as compared to the average face size, the flow advances to step S414. In step S414, the selected "OK" face is grouped alone. That is to say, in this case, the face is an ungrouped "OK" face, but is shot relatively larger than other faces (shot with a size equal to or greater than a threshold value as compared to the average face size), and accordingly it can be judged that the subject is a person which the photographer shot intentionally. This grouping alone is performed so that such a person (face) is prevented from being left out of later processing due to not having been grouped.

In the event that a group has been created alone in step S414 in this way, or in the event that judgment is made in step S413 that the size is not of a size equal to or greater than a threshold value as compared to the average face size, the flow advances to step S415. In step S415, judgment is made regarding whether or not all ungrouped "OK" faces have been subjected to processing.

In the event that judgment is made in step S415 that not all ungrouped "OK" faces have been subjected to processing (i.e., there is still an "OK" face that has not been processed), the flow returns to step S412, the ungrouped "OK" face that has not been processed is subjected to processing, and the subsequent processing is repeated.

On the other hand, in the event that judgment is made in step S415 that all ungrouped "OK" faces have been subjected to processing, the processing of the flowchart shown in FIG. 19 ends, and the flow advances to step S87 in FIG. 6.

Figure 20:
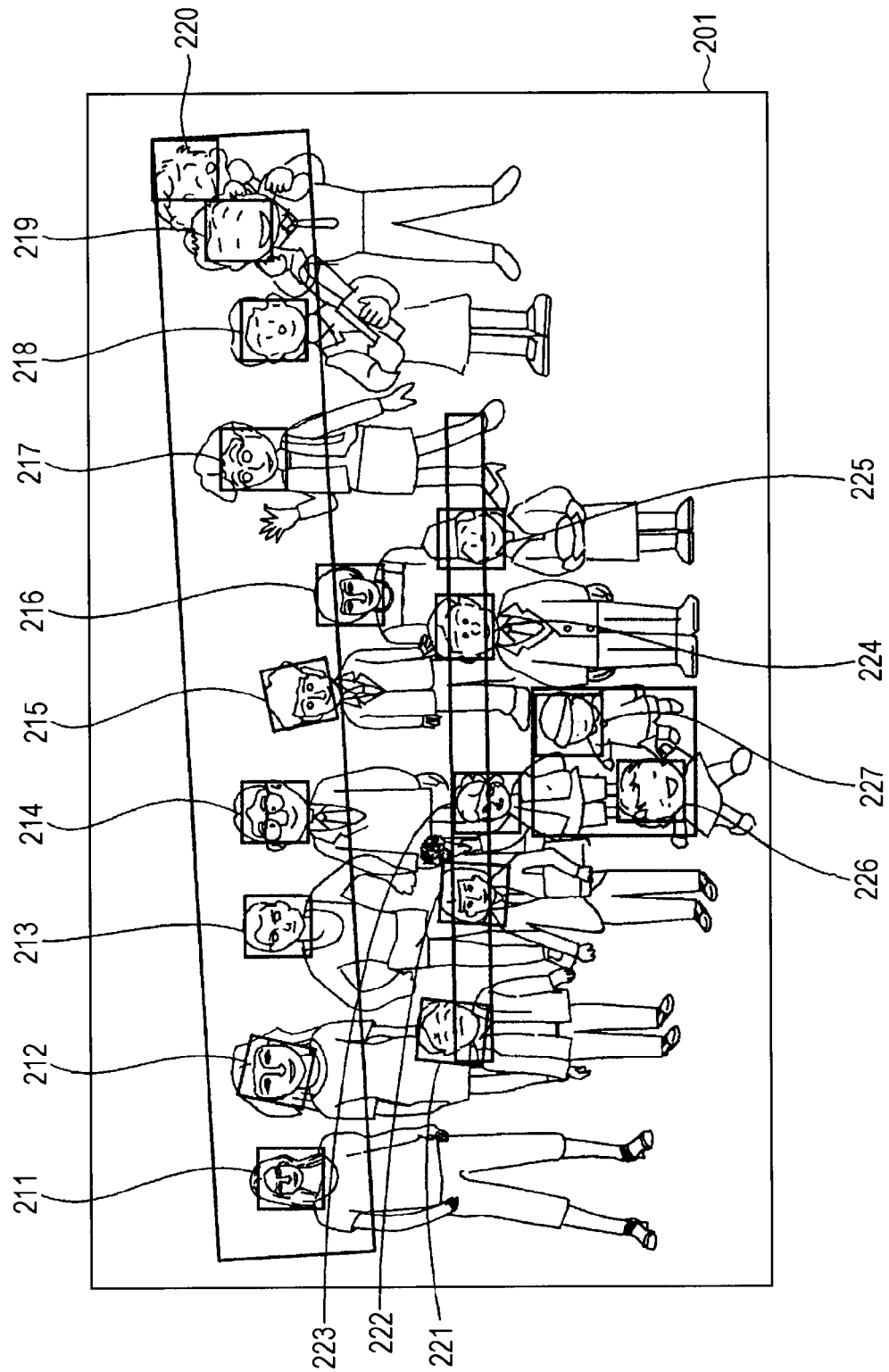
FIG. 20 is a diagram for describing grouping.

Before description relating to the processing in step S87, groups created with the processing so far will be described with reference to FIG. 20. An image 201 to be processed, which is shown in FIG. 20, has therein faces 211 through 227 that have been taken. In FIG. 20, the square shapes around faces indicate the ranges of extracted faces. Faces 211 through 220 are generally in a straight line, and accordingly have been grouped by the "grouping processing using approximation line" (processing according to step S83 in FIG. 6), and will be referred to as group A. However, face 216 is added to group A by the "processing for adding isolated face to approximation line" (processing according to step S84 in FIG. 6). In the same way, faces 221 through 225 are generally in a straight line, and accordingly have been grouped by the "grouping processing using approximation line" (processing according to step S83 in FIG. 6), and will be referred to as group B.

Faces 226 and 227 are away from the approximation line used when the group A was generated and the approximation line used when the group B was generated, and accordingly are not included in either group A or group B. Also, the faces 226 and 227 are also away from the approximation line of the group A and the approximation line of the group B in the "processing for adding isolated face to approximation line" according to step S84 in FIG. 6, so in this processing, are handled as ungrouped "OK" faces.

The faces 226 and 227 are situated relatively close to each other, and accordingly, the faces 226 and 227 are grouped into a single group which we will call group C, by performing the "grouping processing using distance from coordinate average" in step S85.

Accordingly, the groups of group A through group C are generated from the image 201. In this case, executing the processing of step S85 makes a state where there are no ungrouped "OK" faces. Thus, even if the "grouping processing for faces remaining alone" is performed in step S86, judgment will be made in step S411 (FIG. 19) that there are no ungrouped "OK" faces existing, and grouping processing ends.

About Multi-Layering Processing

In the event of having generated multiple groups in this way, the processing of multi-layering in step S87 (FIG. 6) is performed. By performing the processing such as described above, when groups including one or multiple faces are created, processing for further consolidating the created groups is performed. The multi-layering processing executed in step S87 will be described with reference to FIGS. 21A through 21E.

Figure 21A:
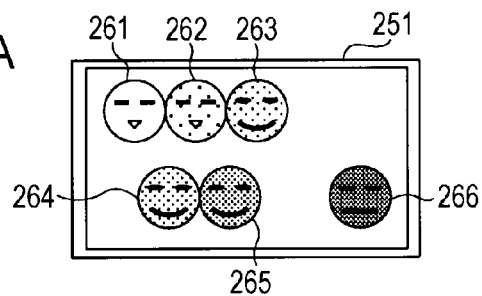
FIGS. 21A through 21E are diagrams for describing multi-layering.

FIG. 21A is a diagram for describing an image to be processed. As shown in FIG. 21A, there are six faces of faces 261 through 266 in an image 251. The faces 261 through 263 are taken in a horizontally arrayed state at the upper left portion of the image 251, and the faces 264 and 265 are taken in a horizontally arrayed state at the lower left portion of the image 251. The face 266 is taken alone and the lower right portion of the image 251 at a position away form the faces 261 through 265.

Figure 21B:
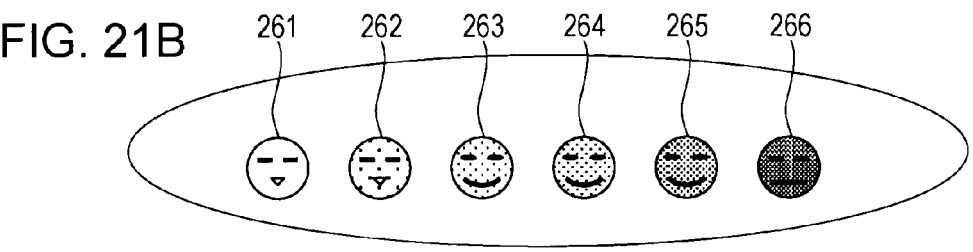

FIG. 21B is a model diagram illustrating the state before grouping with the image 251 to be processed. FIG. 21B shows the faces 261 through 266 in the image 251 in a single row horizontally.

Figure 21C:
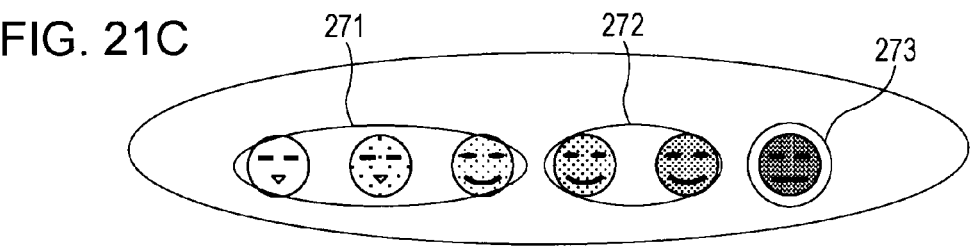

Upon the "group creating processing" in FIG. 6 being performed on such an image 251, groups such as shown in FIG. 21C are generated. The faces 261 through 263 are taken arrayed horizontally in a close range, and accordingly are made into a group 271 by the "grouping processing using approximation line" (step S83), for example.

In the same way, the faces 264 and 265 are taken arrayed horizontally in a close range, and accordingly are made into a group 272 by the "grouping processing using approximation line" (step S83), for example. On the other hand, the face 266 is taken alone at a position away from the faces 261 through 265, and accordingly is not grouped in the "grouping processing using approximation line" (step S83), but rather is grouped as a group 273 in the "grouping processing for faces remaining alone" (step S86).

Figure 21D:
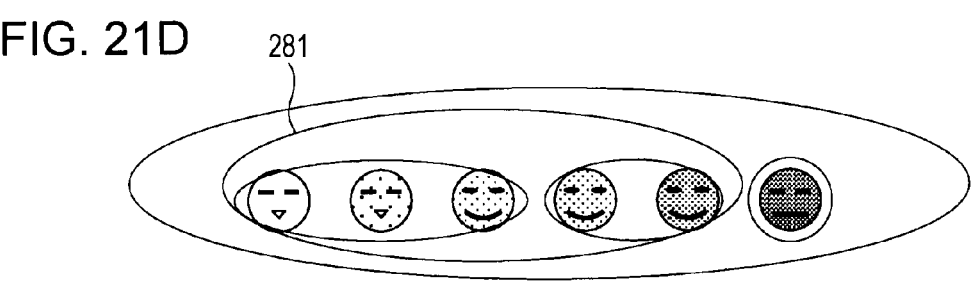

Thus, three groups of group 271, group 272, and group 273, are generated from the image 251, as shown in FIG. 21C. The three groups are further multi-layered. That is to say, as shown in FIG. 21D, the group 271 and group 272 are groups situated at relatively close positions, so a group including the group 271 and group 272 is generated. In other words, in the event that the distance between the group 271 and group 272 is within a predetermined threshold value, the joined group 281 is generated.

Further, the distance of the group 281 and the group 273 is judged to be within a predetermined threshold value, and accordingly a joined group 291 is generated.

Figure 21E:
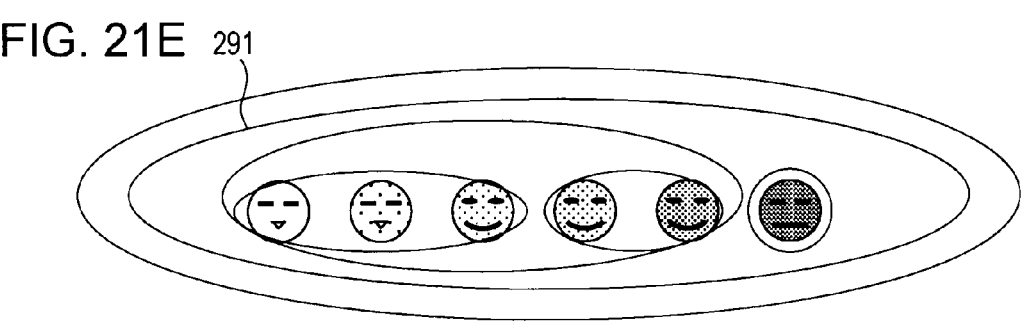

In this way, groups are generated, and groups which are within a predetermined threshold value distance from each other are generated as a larger group, which is repeated. In the example shown in FIGS. 21A through 21E, groups 271, 272, and 273 shown in FIG. 21C are taken as first hierarchical level groups, the group 281 shown in FIG. 21D is taken as a second hierarchical level group, and the group 291 shown in FIG. 21E is taken as a third hierarchical level group.

Thus grouping of multiple hierarchical levels is performed until finally all groups are consolidated as a highest hierarchical level group. Such multi-layering processing is used in the later-described tagging processing, the results of which can be used for classifying such as, for example the first hierarchical level group is a group of children and parents, the second hierarchical level group is a group of families, and so on.

Upon multi-layering processing being performed by such processing, the "group creating processing" in FIG. 6 is ended and the processing advances to step S34 (FIG. 3).

About processing for Adding Configuration Tags

Returning to description of the flowchart in FIG. 3, upon group creating processing being executed in step S33 to create a group, processing of adding tags to the generated group is executed in step S34. The "processing related to adding configuration tags" executed in step S34 will be described with reference to the flowchart in FIG. 22.

In step S441, the number of people in a predetermined group within the image to be processed, the gender thereof, and the age thereof, are checked. For example, in step S12 (FIG. 2), when face recognition processing is performed, the face recognition unit 31 extracts the position, face size, face orientation, face attributes (e.g., gender, age, etc.), face feature amounts, and so forth, of the faces within the image. Also, a unique ID (face ID) is appropriated to each recognized face so as to uniquely discern that face.

Accordingly, with the processing in step S441, the face IDs of faces within the predetermined group are obtained, and face attribute information such as gender and age that are stored correlated with the face IDs are obtained.

In step S441, information such as the total number of persons in the group, the number of faces within the group that are adult men, adult women (and further aged men and aged women), boys, girls, adult, and children, is generated for each group.

This information can be used to analyze what sort of makeup the people of that group are, such as family, friends, or the like, for example. In the event that the group to be processed is a family for example, in many cases, the group would include adults, male and female, and children, and in the event that such information is obtained, the group can be analyzed as being a family.

In step S442, judgment is made regarding whether or not the faces in the group are smiling or not, and the ratio of smiling faces as to the overall number of faces within the group is calculated as a smiling determination face score. Determination of smiling can be performed using techniques according to the related art. Also, while description will be made here as the ratio of smiling faces as to the number of faces within the group being calculated as a smiling face determination score in this case, a smiling face determination score obtained by another method may be used instead.

For example, a score may be calculated relating to the degree of smiling for each face within the group and the score thereof summed, or multiplied, may be taken as a smiling face determination score for that group. Using such a smiling face determination score allows judgment to be made that for example, a photograph with a high smiling face determination score is a photograph which was taken at a happy time, so it is likely that the photograph is of close friends who would be taking photographs of such a happy time together.

In step S443, a zoom determination score is calculated. This zoom determination score is to indicate whether or not there are face sizes equal to or greater than the predetermined threshold size. The information of this zoom determination score can be used to analyze which face is the main person (e.g., the "guest of honor") within the group to be processed in the image.

In step S444, the face size score is calculated. The face size score is an average value of the size of the faces within the group. Obtaining the average value of the face sizes allows analysis such as a great average value of face size of a group in the image indicating that the people in that group are important in that image.

Note that while face sizes are calculated when calculating the zoom determination score in step S443 and the face size score in step S444, the size has already been calculated several times in the above-described processing for creating the group, so using such already-calculated values can be performed, and such a configuration is more desirable from the perspective of efficient processing.

In step S445, judgment is made regarding whether or not the number of people within the group is two people. In the event that the number of people within the group is two, judgment is made that the probability that these two are in an equal relation is high. For example, a couple would often be taken just by themselves, and often would be standing close to each other. Accordingly, if the number of people within the group is two, whether these two are in a close relationship can be judged by measuring the distance therebetween.

That is to say, in the event that judgment is made in step S445 that the number of people within the group is two, the flow advances to step S446, where the distance between the faces is calculated. This distance between the faces can be calculated by using the coordinates at the center of the faces, for example. In the event that the calculated distance is equal to or less than a certain threshold value, judgment is made that the faces are close to each other, and accordingly are an equal relation.

Accordingly, in the event that the distance between the faces is calculated in step S446, or in the event that judgment is made in step S445 that the number of people within the group is not two, the flow advances to step S447. In step S447, attribute candidates are judged from the scores, and tags are applied.

Now, a table referenced to when judging attribute candidates will be described with reference to FIG. 23. Also, a table referenced to when attribute candidates have been judged and tags are to be assigned will be described with reference to FIG. 24.

Note that while these will be described as tables here, and the tables will be described as being stored in the grouping unit 25 (FIG. 1) which executes grouping processing, for example, and thus being referred to, these are not restricted to being held as tables and referred to, and may be realized in the form of processing regarding which judgment is made in sequence, such as a step in a processing flow of a program or the like. Also, while table 321 shown in FIG. 23 and table 322 shown in FIG. 24 are described as being separate tables, these may be compiled as a single table. Further these tables can be updated, and accordingly may be updated as appropriate whenever performing a system upgrade or the like. It should be noted that the numerical values and the like described below are for exemplary purposes only, and should not be interpreted restrictively.

The table 321 shown in FIG. 23 is a table in which tag names and remarks have been correlated. The Remarks column lists the conditions under which the tag names are assigned. The table 322 shown in FIG. 24 is a table in which the tag names, IDs, meaning, and remarks have been correlated.

Referring to table 321 shows that the tag name "ATR_NONE" is assigned to a group with "no label information". Having "no label information" means "no tag information", and referring to table 322 shows that an ID of "0" is assigned to such a group.

Referring to table 321 shows that the tag name "ATR_SOLO" is assigned to a group "with grouping" and which is a "one-person party". This "with grouping" and being a "one-person party" means that the subject is alone, referring to table 322 shows that an ID of "1" is applied to such a group.

Referring to table 321 shows that the tag name "ATR_FAMILY" is assigned to a group "with grouping" where "the number of people>2" holds, "(ATR_MAN+ATR_WOMAN)>0" holds, "ATR_CHILD>0" holds, and "the ratio of number of ATR_MAN as to ATR_CHILD≤Th1" holds.

Here, "the number of people>2" means a condition that the number of persons within the group is greater than two (which we will call Condition 1). "ATR_MAN" means men (not including boys) as described later, and "ATR_WOMAN" means women (not including girls) as described later. Accordingly, "(ATR_MAN+ATR_WOMAN)>0" is a condition meaning that the total of males and females of a certain age or above is more than two (which we will call Condition 2). "ATR_CHILD" means a child (collectively referring to boys and girls). Accordingly, "ATR_CHILD>0" is a condition meaning that the number of children is greater than 0 (which we will call Condition 3).

Further, "the ratio of number of ATR_MAN as to ATR_CHILD≤Th1" is a condition meaning that the ratio of men as to children is the threshold value Th1 or below (which we will call Condition 4). If Condition 1 through Condition 4 are satisfied, this means a "family", and referring to table 322 shows that an ID of "2" is applied to such a group.

Information used when determining whether the Condition 1 through Condition 4 are satisfied is the information obtained in the processing of step S441 (FIG. 22) of number of people in the group, gender, and age. Note that these numerical values and conditions are only one example. For example, the threshold value Th1 is a value settable by the user. Also, while Condition 1 through Condition 4 have been described, these conditions are only one example which can be changed as appropriate, and may be configured so as to be changeable by the user. That is to say, conditions which the user desires to define a "family" may be set by the user, and in such a case, the above-described numerical values will be changed as appropriate.

Referring to table 321 shows that the tag name "ATR_PARENT_CHILD" is assigned to a group "with grouping", satisfying conditions of "ATR_MAN=1" or "ATR_WOMAN=1", and further, "ATR_CHILD=1" holds. That is to say, referring to table 321 shows that the tag name of "ATR_PARENT_CHILD" applied to a group with grouping, where there is one man or one woman, and also one child.

Also, while the conditions described above are "ATR_MAN=1" or "ATR_WOMAN=1", this may be conditions of "ATR_MAN=1" and "ATR_WOMAN=1" instead. Further, various configurations may be conceived for the definition of parent-and-child (PARENT_CHILD), such as a parent having one child or a parent having two children, so the value "1" in "ATR_CHILD=1" may be made to be a default setting which the user can change in accordance with his/her own family, such as changing this value to "2" if there are two children in the family.

Information used when determining these conditions is the information obtained in the processing of step S441 (FIG. 22) of number of people in the group, gender, and age. When these conditions are satisfied, this means "parent-and-child (regardless of whether father or mother)", and referring to table 322 shows that an ID of "20" is assigned to such a group.

Referring to table 321 shows that the tag name "ATR_COUPLE" is assigned to a group "with grouping", satisfying conditions of "ATR_MAN=1" and "ATR_WOMAN=1", and also "face distance≤1.5" or "face distance>1.5" but also "face distance≤2", with "one smiling". When these conditions are satisfied, the tag name of "ATR_COUPLE" is applied, meaning "couple", and referring to table 322 shows that an ID of "21" is assigned to such a group.

Due to being a couple, there is the condition of "ATR_MAN=1" and "ATR_WOMAN=1", which is to say, one man and one woman. When this condition is satisfied, the group is judged to be a couple, so the condition of "face distance≤1.5" is also applied. That is to say, when the distance between a man and a woman is within 1.5, they can be judged to be standing close to each other, so this is a condition included for judging whether or not a couple.

Also, when the condition of one man and one woman is satisfied, the group is judged to be a couple, so the conditions of "face distance>1.5" and "face distance≤2", with "one smiling" is provided. This means that the distance between the two is somewhat greater, but is within 2, so this shows that they are in a close relationship, and further if one of the two is smiling, the probability of the two being a couple can be judged to be high.

Information used when judging whether or not to apply a couple tag is the information obtained in the processing of step S441 of number of people in the group, gender, and age, the smiling face determination score obtained in step S442, and the information relating to the distance between faces obtained in step S446.

Note that while "face distance>1.5" and "face distance≤2" have been described, but the numerical values of "1.5" or "2" are numerical values which change according to how the distance between the faces is calculated, and are dependent on units an the like, so the numerical values are not restricted to "1.5" or "2". Note that these values are only an example, meaning that suitable numerical values will be set at the time of execution. Note that while numerical values will also be described in the following description, these numerical values are not to be interpreted restrictively, but rather exemplarily.

Referring to table 321 shows that the tag name "ATR_FRIENDS_ADULT" is assigned to a group "with grouping", satisfying conditions of "(ATR_MAN+ATR_WOMAN)=2" and "face distance≤2" or "face distance>2" and "face distance≥4" with "one smiling". When these conditions are satisfied, the tag name of "ATR_FRIENDS_ADULT" meaning "two friends (adults)" is applied, and referring to table 322 shows that an ID of "22" is assigned to such a group.

The first condition for judging two adult friends is the condition of "(ATR_MAN+ATR_WOMAN)=2". This condition is satisfied by any of two men, two women, or a man and a woman.

As described later, a tag name of "ATR_FRIENDS_GROUP_ADULT" has also been provided, and the condition of "(ATR_MAN+ATR_WOMAN)=2" has been exemplarily illustrated to distinguish between two friends and a group of three or more friends, but this can be changed as appropriate, such as not making such distinctions, or such as applying a tag name specifically for three friends, and so forth. These numerical values also can be changed as appropriate, and are configured such that the user can change settings regarding the number of people as desirable. Changing the number of people set here also changes the information written in the "meaning" column in FIG. 24. For example, while the meaning of "two friends (adults)" is described in FIG. 24, changing "(ATR_MAN+ATR_WOMAN)=2" to "(ATR_MAN+ATR_WOMAN)=3" would change the meaning to "three friends (adults)". This holds for other places as well.

Also, when the conditions of two adults and "face distance≤2" is satisfied, i.e., the faces are judged to be at a distance equal to or smaller than a certain threshold value, so the two can be judged to be in a close relation, and are tagged as being friends. Also, when the conditions of two adults and "face distance>2" and "face distance≤4", with "one smiling" are satisfied, meaning that the two are standing with somewhat of a distance therebetween but not an excessive distance, and accordingly are not strangers, and further if one of the two is smiling, the two are judged to be friends and accordingly are tagged as being friends.

Information used when judging whether to apply the two friends (adult) tag is the information obtained in the processing of step S441 of number of people in the group, gender, and age, the smiling face determination score obtained in step S442, and the information relating to the distance between faces obtained in step S446.

Referring to table 321 shows that the tag name "ATR_FRIENDS_CHILD" is assigned to a group "with grouping", satisfying conditions of "ATR_CHILD=2" and "face distance≤2" or "face distance>2" but also "face distance≤4" while "one smiling". When these conditions are satisfied, the tag name of "ATR_FRIENDS_CHILD" meaning "two friends (children)" is applied, and referring to table 322 shows that an ID of "23" is assigned to such a group.

The first condition for judging two children friends is the condition of "ATR_CHILD=2". This condition is satisfied by any two children. Also, when the conditions of two children and "face distance≤2" is satisfied, i.e., the faces are judged to be at a distance equal to or smaller than a certain threshold value, so the two can be judged to be in a close relation, and are tagged as being friends.

Also, when the conditions of two children and "face distance>2" and "face distance≤4", with "one smiling" are satisfied, meaning that the two are standing with somewhat of a distance therebetween but not an excessive distance, and accordingly are not strangers, and further if one of the two is smiling, the two are judged to be friends and accordingly are tagged as being friends.

Information used when judging whether or not to applying the tag of "two friends (children)" is the information obtained in the processing of step S441 of number of people in the group, gender, and age, the smiling face determination score obtained in step S442, and the information relating to the distance between faces obtained in step S446.

Referring to table 321 shows that the tag name "ATR_FRIENDS_GROUP_ADULT" is assigned to a group "with grouping", satisfying conditions of "number of people>2 and also "(ATR_MAN+ATR_WOMAN)>Th2*ATR_CHILD". When these conditions are satisfied, the tag name of "ATR_FRIENDS_GROUP_ADULT" meaning "three or more friends (adults)" is applied, and referring to table 322 shows that an ID of "30" is assigned to such a group.

Referring to table 321 shows that the tag name "ATR_FRIENDS_GROUP_CHILD" is assigned to a group "with grouping", satisfying conditions of "number of people>2 and also "ATR_CHILD>Th3*(ATR_MAN+ATR_WOMAN)". When these conditions are satisfied, the tag name of "ATR_FRIENDS_GROUP_ADULT" meaning "three or more friends (children)" is applied, and referring to table 322 shows that an ID of "31" is assigned to such a group.

Referring to table 321 shows that the tag name "ATR_MAN" is for "when adding individual", and is assigned to a group satisfying the conditions of "adult−baby>Th4 adult>Th5 gender≥Th6". When these conditions are satisfied, the tag name of "ATR_MAN" meaning "man" is applied, and referring to table 322 shows that an ID of "51" is assigned to such a group. Note that Th4, Th5, and Th6 are each predetermined threshold values.

Referring to table 321 shows that the tag name "ATR_WOMAN" is for "when adding individual", and is assigned to a group satisfying the conditions of "adult−baby>Th7 adult>Th8 gender≥Th9". When these conditions are satisfied, the tag name of "ATR_WOMAN" meaning "woman" is applied, and referring to table 322 shows that an ID of "52" is assigned to such a group. Note that Th7, Th8, and Th9 are each predetermined threshold values.

Referring to table 321 shows that the tag name "ATR_CHILD" is for "when adding individual", and is assigned to a group satisfying the conditions of "≠adult, unclear". When these conditions are satisfied, the tag name of "ATR_CHILD" meaning "child" is applied, and referring to table 322 shows that an ID of "53" is assigned to such a group.

Referring to table 321 shows that the tag name "ATR_UNCLEAR" is for "when adding individual", and is assigned to a group satisfying the conditions of "adult−baby>Th10 adult≤Th11". When these conditions are satisfied, the tag name of "ATR_UNCLEAR" meaning "identity unclear" is applied, and referring to table 322 shows that an ID of "99" is assigned to such a group. Note that Th10 and Th11 are each predetermined threshold values.

Figure 22:
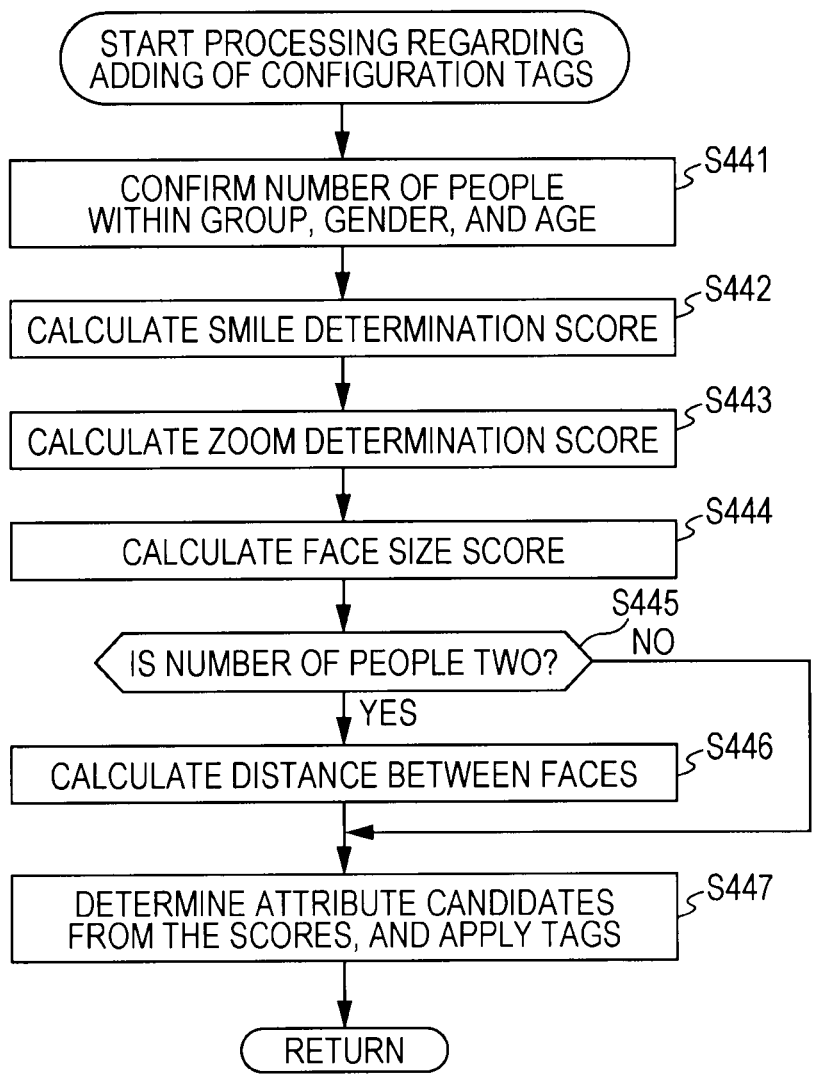
FIG. 22 is a flowchart for describing processing relating to adding configuration tags.

Such tag names (IDs corresponding to tag names) are determined using the scores obtained by executing the processing described with reference to the flowchart in FIG. 22. Note that the tag names described with reference to FIGS. 23 and 24 are only exemplary, and accordingly tag names, and conditions and the like correlated with the tag names, including those not shown in FIGS. 23 and 24, may be added, deleted, and modified. The IDs shown in FIG. 24 are also exemplary illustrations.

Thus, the processing in step S477 is performed, that is to say processing wherein attribute candidates are judged from the scores and tags are applied is executed, thereby applying tags to groups within the image. Upon the processing in step S447 ending, the flow advances to step S35 (FIG. 3).

Output of Group Configuration Data

Returning to the flowchart in FIG. 3, upon the processing relating to adding of a configuration tag being completed in step S34, in step S35 the group configuration data is output. The grouping processing is performed at the grouping unit 25 (FIG. 1), and the processing results are supplied to the person correlation data generating unit 23, and the face clustering unit 26.

Upon the processing in step S35 being completed, the processing proceeds to step S14 (FIG. 2). In step S14, judgment is made whether or not all image data to be processed has been processed. That is to say, the above-mentioned grouping processing is performed for each piece of image data (one image). Therefore, in step S14 judgment is made whether or not all image data to be processed has been processed. "Image data to be processed" means all image data stored in a predetermined folder, and specifically means all image data stored in the image database 42.

In the event that judgment is made in step S14 that all image data to be processed has not been processed, the processing returns to step S11, and the subsequent processing thereof is repeated. According to the processing in steps S11 through S14 being repeated, a face is detected for each image, and a group is generated. Subsequently, in the event that judgment is made in step S14 that all image data to be processed has been processed, the flow advances to processing in step S15.

In step S15, the processing of face clustering is executed. Also, in step S16 a person is generated by taking advantage of the processing of face clustering. As described above, multiple images are processed, whereby multiple faces are extracted from multiple images. Processing for enabling, of the multiple faces, matched faces, i.e., the faces of the same person to be processed by being summarized as the faces of the same person, is executed in steps S15 and S16.

Upon obtaining the face discerning feature amount, face ID, and image ID supplied from the face recognition unit 31, the face clustering unit 26 uses these information to execute the face clustering processing. Specifically, grouping is performed by extracting faces judged to be the same person using similarity between face discerning feature amounts.

A face ID is provided to each face, and accordingly, an ID (hereafter, person ID) for integrating the face IDs of faces judged to be the same person is newly assigned, and one face may be managed by a face ID and a person ID. Also, the face IDs of faces judged to be the same person are rewritten to the same ID, and one face may be managed by the face ID. Note that, even in such a case, this face ID will be referred to as person ID in the following description to distinguish from the above-mentioned face ID. That is to say, description will be continued assuming that a face ID is for discerning the face image, and a person ID is for discerning the person.

Multiple persons are generated by such processing being repeated. Upon the multiple persons being generated, the closeness between these persons is calculated. Specifically, in step S17 the calculation processing of closeness between persons is executed. The calculation processing of closeness between persons will be described with reference to the flowchart in FIG. 25.

In step S481, judgment of the same person is performed by face clustering. The face judged to be the same person in the processing prior to this processing being executed is subjected to grouping, and accordingly, the results thereof may be used.

In step S482, the number of times of appearances in images is calculated for each person. This is calculated by judging how many faces are included in the group subjected to grouping. The number of times of appearances in images is stored for each person.

Upon the number of times of appearances in images being calculated for each person in step S482, the processing proceeds to step S483. In step S483, a person to be processed is selected. For example, this is performed by a person ID to be processed being selected.

In step S484, a distance score for calculating a closeness score as to another person is calculated. In step S484, a score of distance between groups in images (distance score) is calculated. There may be generated multiple groups within an image to be processed. The distance score is calculated based on the following Expression (13).

$$\text{Score}_f = \frac{1}{2^{N_{tree}-1}} \quad (13)$$

In Expression (13), Score$_f$ represents a distance score between groups between face IDs (person IDs), and Ntree represents difference of layers between groups. The layers are layers described at the time of the multi-layering processing, and are layers described with reference to FIGS. 21A through 21E. Now, description will be made assuming that a distance score is calculated based on Expression (13), and accordingly, description will be made by exemplifying a specific numeric value calculated based on Expression (13) as a distance score, for example, in FIG. 26C and others. However, Expression (13) is only an expression of an example of calculating a distance score, so a distance score may be calculated based on another expression. Accordingly, numeric values that will be exemplified below are based on Expression 13, and it goes without saying that different values may be used in the event of being calculated based on another expression. Now, description will further be made regarding calculation of a distance score in the event of employing layers, with reference to FIG. 26.

Let us say that the image 351 illustrated in FIG. 26A is an image to be processed, which is an image at the time of the grouping processing having not been performed yet. Four faces 361 through 364 are extracted from the image 351 illustrated in FIG. 26A. With regard to the position relation of each of the faces, the face 361 and the face 362 are the neighborhood, the face 363 is positioned distant from the face 362, but this face is greater than the other faces, and the face 364 is positioned distant from the faces 361 through 363.

Let us say that as a result of the grouping processing being executed as to such an image, a group is generated as illustrated in FIG. 26B. The face 361 and the face 362 are included in a group 381, which is provided with a tag of "couple". This group 381 is a first layered group. The faces 361 through 363 are included in a group 382, which is provided with a tag "friend". This group 382 is a second layered group. The faces 361 through 364 are included in a group 383, which is provided with a tag of "friend". This group 383 is a third layered group.

In the event that an image in which the groups have been generated and the tags have been provided in this way is taken as to be calculated for a closeness score, a distance score between groups of face IDs is calculated. The face 361 and face 362 belong to the same layer, so the Ntree is "0". Accordingly, upon this Ntree=0 being substituted for Expression (13), the Score$_f$ of "2" is calculated. Accordingly, the distance score between the face 361 and face 362 is 2.

Let us say that such a calculation result is written in a table such as illustrated in FIG. 26C. Now, description will be made assuming that face IDs, distance scores, and tags are managed in a table format for convenience of description, but this does not indicate that management is restricted to a table format. Any kind of format may be employed as long as the face IDs, distance scores, and tags can be managed and processed.

Sideways and vertically in Table 391 illustrated in FIG. 26C, face IDs are described. In FIG. 26C, reference numerals provided to the image 351 illustrated in FIG. 26A are used as face IDs. A numeric value of "2" is written as a distance score in a field where "361" serving as a face ID and "362" serving as a face ID intersect. Also, the face 361 and face 362 have been provided with the tag of "couple", so a tag name of "Couple" is written therein.

Similarly, the face 361 and face 363 belong to the first layer and second layer respectively, so the Ntree is "1". Thus, upon this Ntree=1 being substituted for Expression (13), the Scoref of "1" is calculated. Thus, the distance score between the face 361 and face 363 is 1. With Table 391 illustrated in FIG. 26C, a numeric value of "1" is written as the distance score in a field where "361" serving as a face ID and "363" serving as a face ID intersect. Also, the face 361 and face 363 have been provided with the tag of "friend", so a tag name of "Friend" is written therein.

Similarly, the face 361 and face 364 belong to the first layer and third layer respectively, so the Ntree is "2". Thus, upon this Ntree=2 being substituted for Expression (13), the Scoref of "0.5" is calculated. Thus, the distance score between the face 361 and face 364 is 0.5. With Table 391 illustrated in FIG. 26C, a numeric value of "0.5" is written as the distance score in a field where "361" serving as a face ID and "364" serving as a face ID intersect. Also, the face 361 and face 364 have been provided with the tag of "friend", so a tag name of "Friend" is written therein.

Similarly, the face 362 and face 363 belong to the first layer and second layer respectively, so the Ntree is "1". Thus, upon this Ntree=1 being substituted for Expression (13), the Scoref of "1" is calculated. Thus, the distance score between the face 362 and face 363 is 1. With Table 391 illustrated in FIG. 26C, a numeric value of "1" is written as the distance score in a field where "362" serving as a face ID and "363" serving as a face ID intersect. Also, the face 362 and face 363 have been provided with the tag of "friend", so a tag name of "Friend" is written therein.

Similarly, the face 362 and face 364 belong to the first layer and third layer respectively, so the Ntree is "2". Thus, upon this Ntree=2 being substituted for Expression (13), the Scoref of "0.5" is calculated. Thus, the distance score between the face 362 and face 364 is 0.5. With Table 391 illustrated in FIG. 26C, a numeric value of "0.5" is written as the distance score in a field where "362" serving as a face ID and "364" serving as a face ID intersect. Also, the face 362 and face 364 have been provided with the tag of "friend", so a tag name of "Friend" is written therein.

Similarly, the face 363 and face 364 belong to the second layer and third layer respectively, so the Ntree is "1". Thus, upon this Ntree=1 being substituted for Expression (13), the Scoref of "1" is calculated. Thus, the distance score between the face 363 and face 364 is 1. With Table 391 illustrated in FIG. 26C, a numeric value of "1" is written as the distance score in a field where "363" serving as a face ID and "364" serving as a face ID intersect. Also, the face 363 and face 364 have been provided with the tag of "friend", so a tag name of "Friend" is written therein.

In this way, upon the distance score between groups of face IDs based on Expression (13) being calculated, the processing proceeds to step S485. In step S485, a closeness score is calculated by distance scores being added. The closeness score is calculated by adding a distance score between groups between face IDs within an image for each of the same persons.

Figures 27A, 27B, 27C:
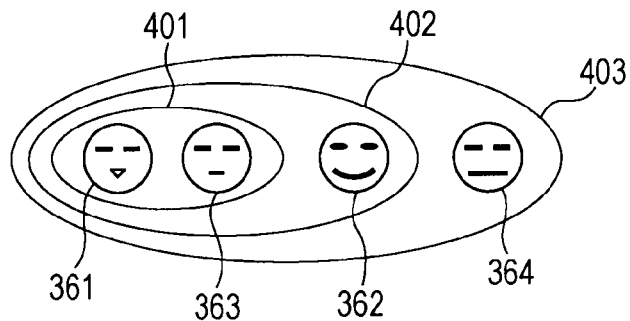
FIGS. 27A through 27C are diagrams for describing calculation of a closeness score.

This will be described with reference to FIGS. 27A through 27C. First, FIG. 27A illustrates the results of processing performed on another image. Let us say that FIG. 27A is also at the time of an image where the faces 361 through 364 being imaged being taken as to be processed in the same way as with FIGS. 26A through 26C. At this time, with the processing results illustrated in FIG. 27A, the face 361 and face 363 are included in a group 401, which has been provided with a tag of "couple". This group 401 is a first layered group. The faces 361 through 363 are included in a group 402, which has been provided with a tag of "friend". This group 402 is a second layered group. The faces 361 through 364 are included in a group 403, which has been provided with a tag of "friend". This group 403 is a third layered group.

In the event that such groups have been generated and such tags have been provided, Table 411 such as illustrated in FIG. 27B is calculated. Calculation of a distance score written in Table 411 has been described at the time of creation of Table 391 in FIG. 26C, and accordingly, description thereof will be omitted.

In Table 411, a numeric value of "1" is written as a distance score in a field where "361" serving as a face ID and "362" serving as a face ID intersect, which has provided with the tag of "friend", so a tag name of "Friend" is written therein. In Table 411, a numeric value of "2" is written as a distance score in a field where "361" serving as a face ID and "363" serving as a face ID intersect, which has been provided with the tag of "couple", so a tag name of "Couple" is written therein.

In Table 411, a numeric value of "0.5" is written as a distance score in a field where "361" serving as a face ID and "364" serving as a face ID intersect, which has been provided with the tag of "friend", so a tag name of "Friend" is written therein. In Table 411, a numeric value of "1" is written as a distance score in a field where "362" serving as a face ID and "363" serving as a face ID intersect, which has been provided with the tag of "friend", so a tag name of "Friend" is written therein.

In Table 411, a numeric value of "1" is written as a distance score in a field where "362" serving as a face ID and "364" serving as a face ID intersect, which has been provided with the tag of "friend", so a tag name of "Friend" is written therein. In Table 411, a numeric value of "0.5" is written as a distance score in a field where "363" serving as a face ID and "364" serving as a face ID intersect, which has been provided with the tag of "friend", so a tag name of "Friend" is written therein.

In this way, a distance score between face IDs is calculated for each image, and accordingly, Table 391 (411) such as illustrated in FIG. 26C and FIG. 27B is generated. In the event that the table has been generated in this way, in step S485 a closeness score is calculated by a distance score between face IDs within an image being added for each of the same persons.

Description will be made with reference to Table 391 and Table 411. A distance score between face IDs within an image has already been written in Table 391 and Table 411. "A distance score being added for each of the same persons" means that the distance score between the face 361 and face 362 is added, for example. The distance score between the face 361 and face 362 is "2" in Table 391, and "1" in Table 411. Thus, a result of the distance score between the face 361 and face 362 being added becomes "3" (=2+1). This "3" is taken as a closeness score between the face 361 and face 362.

Also, the tags of the face 361 and face 362 are "Couple" in Table 391, and "Friend" in Table 411. Accordingly, in this case, two different tags of "Couple" and "Friend" are to be added to the tags of the face 361 and face 362. Let us say that Table 421 is to be generated by such processing being repeated. Now, description will be continued assuming that Table 421 is to be generated, but may not be in a table format.

In Table 421, a numeric value of "3" is written as a closeness score in a field where "361" serving as a face ID and "363" serving as a face ID intersect, which has been provided with the tag of "Couple", and the tag of "Friend". This is because the distance score between the face 361 and face 363 is "1" in Table 391, and "2" in Table 411, so "3" obtained by adding these values is to be written in Table 421 as a closeness score. Also, this is because the tags of the face 361 and face 363 are "Friend" in Table 391, and "Couple" in Table 411, so these two tags are written in Table 421.

In Table 421, a numeric value of "1" is written as a closeness score in a field where "361" serving as a face ID and "364" serving as a face ID intersect, which has been provided with the tag of "Friend". This is because the distance score between the face 361 and face 364 is "0.5" in Table 391, and "0.5" in Table 411, so "1" obtained by adding these values is to be written in Table 421 as a closeness score. Also, this is because the tags of the face 361 and face 364 are both "Friend" in Table 391 and in Table 411, so this single tag is written in Table 421.

In Table 421, a numeric value of "1" is written as a closeness score in a field where "361" serving as a face ID and "364" serving as a face ID intersect, which has been provided with the tag of "Friend". This is because the distance score between the face 361 and face 364 is "0.5" in Table 391, and "0.5" in Table 411, so "1" obtained by adding these values is to be written in Table 421 as a closeness score. Also, this is because the tags of the face 361 and face 364 are both "Friend" in Table 391 and in Table 411, so this single tag is written in Table 421.

In Table 421, a numeric value of "2" is written as a closeness score in a field where "362" serving as a face ID and "363" serving as a face ID intersect, which has been provided with the tag of "Friend". This is because the distance score between the face 362 and face 363 is "1" in Table 391, and "1" in Table 411, so "2" obtained by adding these values is to be written in Table 421 as a closeness score. Also, this is because the tags of the face 362 and face 363 are both "Friend" in Table 391 and in Table 411, so this single tag is written in Table 421.

In Table 421, a numeric value of "1.5" is written as a closeness score in a field where "362" serving as a face ID and "364" serving as a face ID intersect, which has been provided with the tag of "Friend". This is because the distance score between the face 362 and face 364 is "0.5" in Table 391, and "1" in Table 411, so "1.5" obtained by adding these values is to be written in Table 421 as a closeness score. Also, this is because the tags of the face 362 and face 364 are both "Friend" in Table 391 and in Table 411, so this single tag is written in Table 421.

In Table 421, a numeric value of "1.5" is written as a closeness score in a field where "363" serving as a face ID and "364" serving as a face ID intersect, which has been provided with the tag of "Friend". This is because the distance score between the face 363 and face 364 is "1" in Table 391, and "0.5" in Table 411, so "1.5" obtained by adding these values is to be written in Table 421 as a closeness score. Also, this is because the tags of the face 363 and face 364 are both "Friend" in Table 391 and in Table 411, so this single tag is written in Table 421.

In this way, a distance score is calculated, whereby a closeness score thereof is calculated. Returning to the flowchart in FIG. 25, upon a closeness score thereof being calculated by a distance score being calculated in step S485, i.e., upon Table 421 such as illustrated in FIG. 27C being created, the processing proceeds to step S486.

In step S486, judgment is made that multiple tags have been provided to a person to be processed. For example, let us say that a person to be processed is the person of the face 361. In the event of referencing Table 421 illustrated in FIG. 27C, two tags of the tag of "Couple", and the tag of "Friend", i.e., the multiple tags have been provided to the face 361. Accordingly, in the event that the face 361 has been set to a person to be processed, judgment is made in step S486 that the multiple tags have been provided, and the processing proceeds to step S487.

In step S487, a score is obtained according to a tag. In this case, the multiple tags have been provided, so a value obtained by adding distance scores is obtained for each tag thereof. That is to say, as described above, a closeness score is a value obtained by adding distance scores, and the distance scores thereof have been calculated based on tags (see Expression (13)).

For example, in the event of referencing Table 421 in FIG. 27C, the closeness score between the face 361 and face 362 is "3", where the tag of "Couple" and the tag of "Friend" are provided. It is when Table 391 (FIG. 26C) was referenced that the tag of "Couple" was provided, and the distance score thereof is "2". Also, it is when Table 411 (FIG. 27B) was referenced that the tag of "Friend" was provided, and the distance score thereof is "1".

Here, when the two images were processed are exemplified, the processing is in this way, but in reality, multiple images are processed, and accordingly, the number of tables to be referenced is two or more, so multiple distance scores are totaled for each tag.

According to the processing in step S487 being executed, for example, in the event that the face 361 and face 362 have been set to be processed, the score corresponding to the tag of "Couple" is obtained as "2", and the score corresponding to the tag of "Friend" is obtained as "1".

In step S488, a coefficient corresponding to a tag is obtained. This coefficient corresponding to a tag is, for example, held in the face clustering unit 26 (FIG. 1) as a table. Now, a table in which coefficients are written will be described. FIG. 28 is a diagram illustrating an example of Table 451 in which a coefficient corresponding to a tag is written.

Table 451 is a table in which a tag name, and a coefficient to be multiplied as to a tag to which the tag name thereof has been provided are correlated and managed. In the event of referencing Table 451 in FIG. 28, the tag name of "Couple" is correlated with a coefficient of "1.5". The tag name of "Family" is correlated with a coefficient of "1.2". The tag name of "Friend" is correlated with a coefficient of "1.0".

In this way, a coefficient as to a tag that can be conceived as close relationship such as "Couple" or "Parent-Child" is arranged to be preferentially employed with a weighted value greater than a coefficient as to another tag. Being employed means that with processing on the subsequent stage, a tag having a greater score value is consequently employed as a tag between persons thereof. Such a coefficient is desirable, but the coefficient is not restricted to the numeric values illustrated in FIG. 28. Alternatively, this coefficient may be set by a user. Specifically, for example, in the event that the user intends to give priority to the tag name of "Friend" over other tag names, an arrangement may be made wherein the numeric value of a coefficient as to the tag name of "Friend" can be changed.

Also, in the event that inconsistent relationship has been estimated such that although persons to be processed are siblings, they are a couple, an arrangement may be made wherein priority is assigned for each tag, and processing is performed based on the priority thereof. This can be realized, since the priority can be raised by increasing the value of the above coefficient for example, by adjusting the coefficient.

Figure 25:
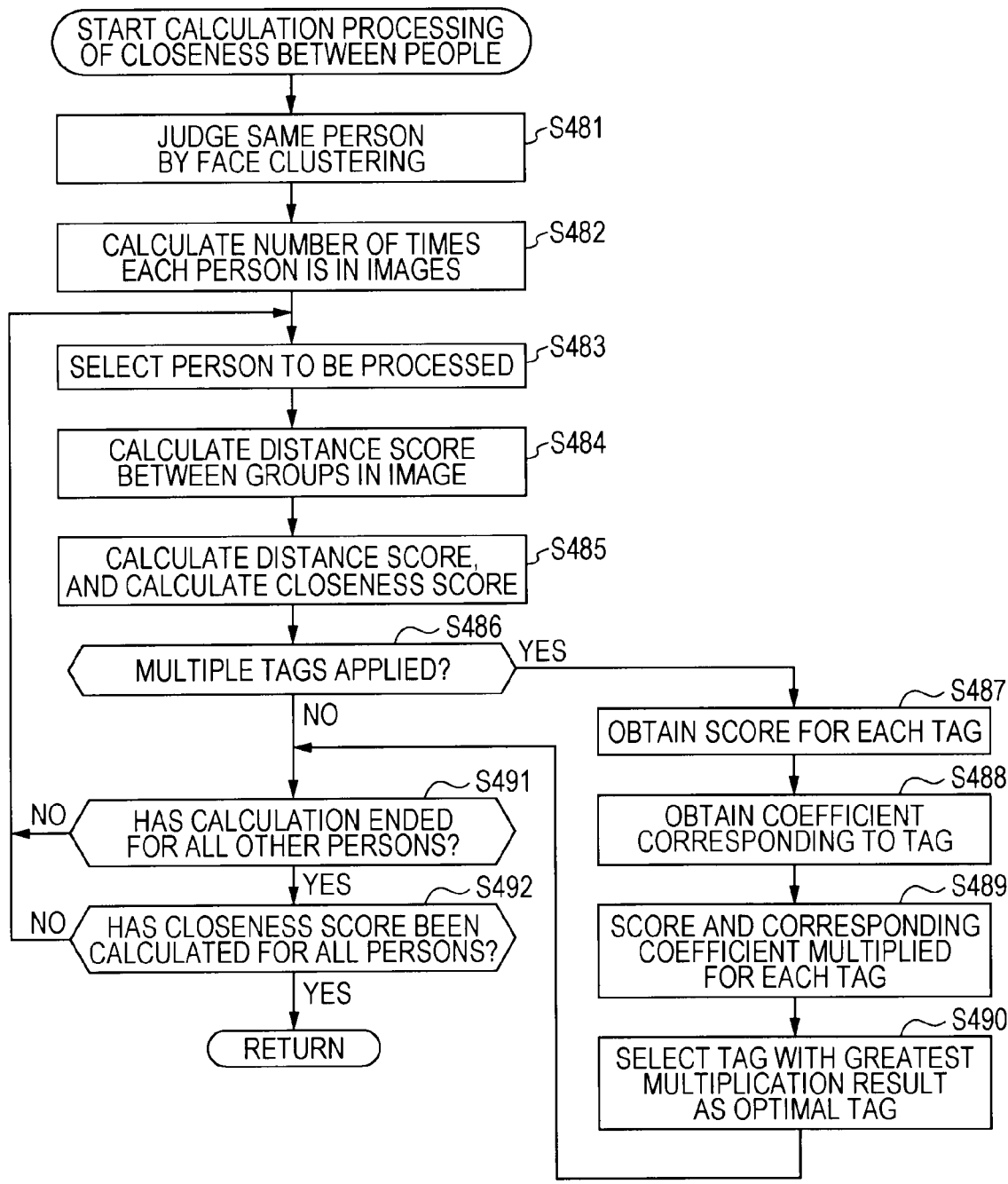
FIG. 25 is a flowchart for describing processing for calculating closeness between people.

Returning to the flowchart in FIG. 25, in step S488, the tag corresponding to the coefficient is obtained. For example, in the event that the face 361 and face 362 have been set to be processed, the coefficient corresponding to the tag of "Couple" is read out with "1.5" by referencing Table 451, and the coefficient corresponding to the tag of "Friend" is read out with "1.0".

In step S489, the score and the corresponding coefficient are multiplied for each tag. For example, in the event that the face 361 and face 362 have been set to be processed, the score corresponding to the tag of "Couple" is "2", and the coefficient is "1.5", so these values are multiplied, and a value of "3.0" is calculated. According to the same processing, the score corresponding to the tag of "Friend" is "1", and the coefficient is "1.0", so these values are multiplied, and a value of "1.0" is calculated.

In this way, upon multiplication being performed, and the multiplication result being obtained, the processing proceeds to step S490. In step S490, the tag of which the multiplication result is the maximum value is employed as an optimal tag, as a tag between persons to be processed thereof.

For example, in the event that the face 361 and face 362 have been set to be processed, the multiplication result corresponding to the tag of "Couple" is "3.0", and the multiplication result corresponding to the tag of "Friend" is "1.0", so the tag of "Couple" of which the numeric value of the multiplication result is great is provided as an optimal tag between the persons of the face 361 and face 362.

In this way, in the event that the multiple tags are applied, a single tag is selected as an optimal tag, and is applied.

Note that, in the event that the multiple tags have been applied, processing such as described above has been executed, and a single tag has been selected, a plurality of image data is processed, so occurrence possibility can be conceived to be low, but there is a possibility that the same tag may be provided to the same person regarding relationship with multiple persons. For example, a case can also be conceived where the relationship with the face 362 is "Couple" as to the face 361, and the relationship with the face 363 is also "Couple".

In such a case, the face 361 and face 362 are a couple, and the face 361 and face 363 are also a couple. Though there may be such a case, this can be conceived to be an undesirable result. In such a case, processing may be performed such that only one of the tags remains, and the other is changed to another tag.

In this way, in the event that the optimal tag has been provided in step S490, or in the event that judgment is made in step S486 that multiple tags have not been applied to a person (face) to be processed, the processing proceeds to step S491. In step s491, judgment is made whether or not calculation with all of the other persons has been completed.

In the event that judgment is made in step S491 that calculation with all of the other persons has not been completed, the processing returns to step S483, and the subsequent processing thereof is repeated. On the other hand, in the event that judgment is made in step S491 that calculation with all of the other persons has been completed, the processing proceeds to step S492.

In step S492, judgment is made whether or not calculation of a closeness score has been performed regarding all of the persons. In the event that judgment is made in step S492 that calculation of a closeness score has not been performed regarding all of the persons, the processing returns to step S483, and the subsequent processing thereof is repeated. On the other hand, in the event that judgment is made in step S492 that calculation of a closeness score has been performed regarding all of the persons, the closeness calculation processing between persons illustrated in FIG. 25 is ended, and the processing proceeds to step S18 (FIG. 2).

Generation of Person Correlation Data

Returning to the flowchart in FIG. 2. In step S17, in the event that calculation of closeness between persons has been performed, the optimal tag has been provided, and also the number of times of appearances of each person has been counted, in step S18 these pieces of information is used, the data of person correlation is generated, and is saved in the person correlation database 41.

The person correlation data is generated from a person having a having a number-of-times-of-appearances score, closeness with multiple persons having high closeness with the person thereof, and a tag. The person correlation data is generated in this way, so we can say that this data is data representing linkage with a closely related person, person correlation as a tag, with a person having a great number of times of appearances in images as the center.

"With a person having a great number of times of appearances in images as the center" means that a person having a great number of times of appearances in images is a person consciously shot by a photographer, and it can be assumed that such a person is put in the center, whereby a correlation map with the person intended by the photographer as the center can be created.

In other words, it can be determined that a person having a small number of times of appearance in images is a person not shot consciously by the photographer, not intended to be put in the center by the photographer. Accordingly, a person having a small number of times of appearance in images may not be set to be processed at the time of creation of the person correlation data, for example, such as a person of which the number of times of appearances is equal to or smaller than a predetermined threshold, a person of which the number of times of appearances is equal to or smaller than a predetermined rate as to the summation of the number of times of appearances of all of the persons, or the like.

Person correlation data 501 is made up of the two data illustrated in FIG. 29. Data 502 serving as one of the data is data relating to a person individual, and data 503 serving as the other data is data for identifying relationship between persons. Numeric values and so forth within the data illustrated in FIG. 29 are an example.

The data 502 is data for managing a person ID, a number-of-times-of-appearances score, a face icon image, and attributes in a manner correlated with each other. With the data 502 illustrated in FIG. 29, the number-of-times-of-appearances score of the person ID that is "001" is "34", the face icon image is "User001.jpg", and the attribute is "MAN/Age: 24" are correlated with each other.

Similarly, the number-of-times-of-appearances score of the person ID that is "002" is "13", the face icon image is "User002.jpg", and the attribute is "WOMAN/Age:23" are correlated with each other. The number-of-times-of-appearances score of the person ID that is "003" is "21", the face icon image is "User003.jpg", and the attribute is "MAN/Age: 65" are correlated with each other.

With a screen to be created based on the data of the person correlation data 501, which is a screen to be described with reference to FIG. 30, the image of the face of a person is displayed. The image of the face of the person thereof is a face icon image, and for example, the file name of the data of an image of just a face portion cut away from a predetermined image is described in the field of the face icon image.

Also, of data relating to the "Attributes" making up the data 502, data relating to gender such as "MAN" or "WOMAN" has been obtained in the grouping processing, whereby information thereof can be written in.

Also, information relating to "Age" has also been obtained in the grouping processing, so information thereof can be used, but as illustrated in FIG. 29, a specific numeric value (age) such as "24" is not determined. It goes without saying that if the specific age can be identified, the identified age may be described in the attribute field of the data 502. In the event of the specific age failing to be identified, as a result of judgment, with the above example, information such as Adult or Child is arranged to be written in.

Also, information to be written in the attribute field may be written in at the time of being written by the user. In the event of the information to be written in by the user, accurate values such as age can be obtained, which is conceived to be a desirable mode.

With the present embodiment, the data within this person correlation data 501 is configured so as to be corrected by the user, which will be described later. Accordingly, tentatively, even if erroneous judgment has been performed in the above grouping processing or the like, and an erroneous tag has been provided, the error thereof is correctable, so suitability of data within the person correlation data 501 can be realized.

The data 503 illustrated in FIG. 29 will be described. With the data 503, a person ID1, a person ID2, a closeness score, a tag, and a photo image are managed in a manner correlated with each other. With the data 503 illustrated in FIG. 29, the closeness score between the person ID1 of "001" and the person ID2 of "002" is "5.5", the tag is "Couple", and the photo image is "DSC00001.jpg", which are correlated with each other.

Similarly, the closeness score between the person ID1 of "002" and the person ID1 of "003" is "2.25", the tag is "Family", and the photo image is "DSC00002.jpg", which are correlated with each other. The closeness score between the person ID1 of "003" and the person ID1 of "001" is "0.25", the tag is "Friend", and the photo image is "DSC00003.jpg", which are correlated with each other.

The closeness score and tag obtained in the processing to calculate the closeness between persons executed as the processing in step S17 are data to be generated by referencing Table 421 illustrated in FIG. 27C, for example. Also, for example, with a photo where a person (face) has been imaged by the person ID1 of "001" and the person ID1 of "002" being assigned, the file name of the photo serving as a representative is to be described in the photo image field.

Upon the person correlation data 501 made up of such data being generated in step S18, and being held in the person correlation database 41 (FIG. 1), the database creation processing described with reference to the flowchart in FIG. 2 is ended.

In this way, upon the person correlation data 501 being held in the person correlation database 41, the screen based on the person correlation data 501 thereof is displayed on the display unit 11 under the control of the display control unit 21. FIG. 30 illustrates an example of the screen to be displayed on this display unit 11.

Screen

Figure 30:
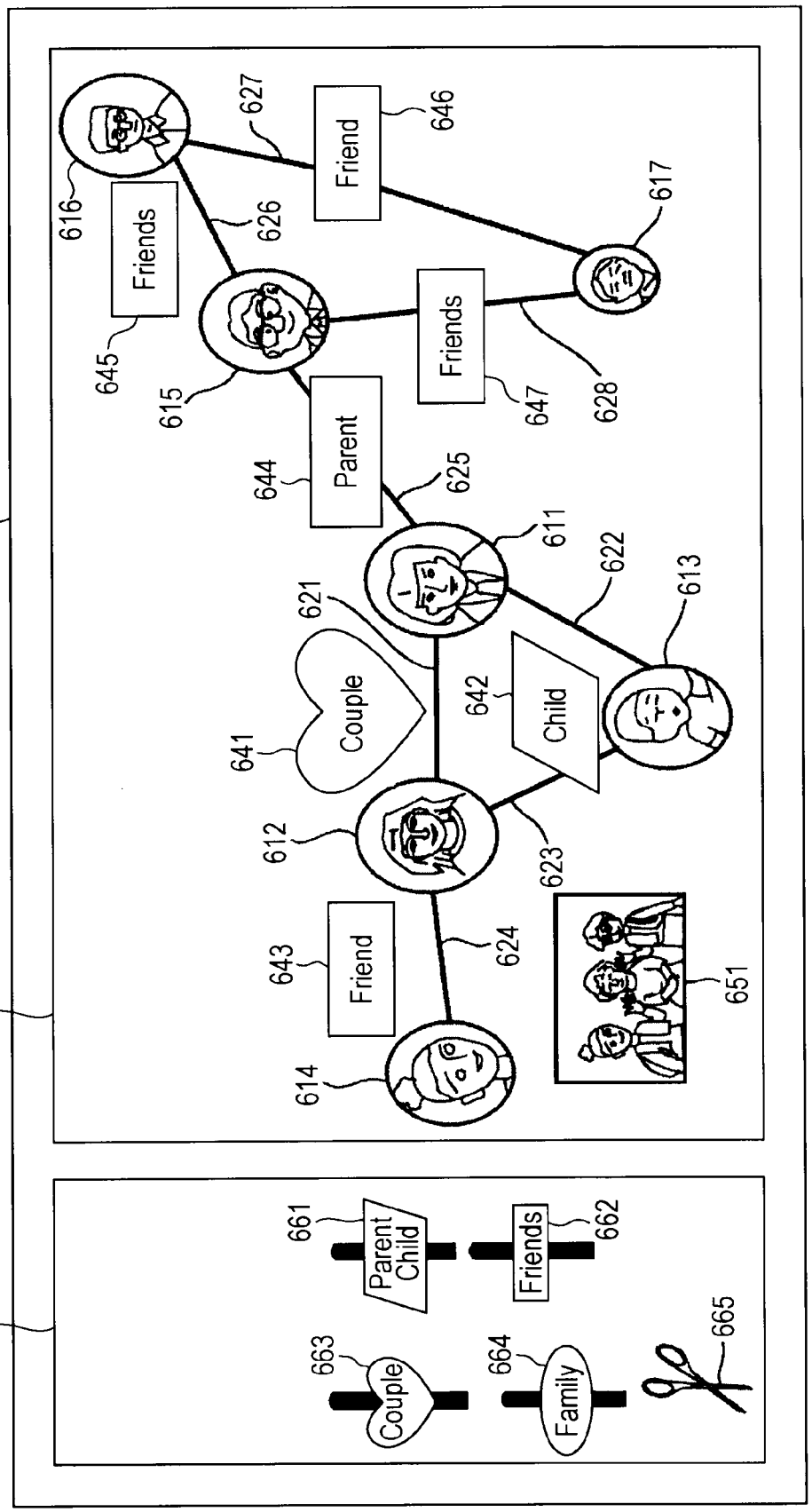
FIG. 30 is a diagram illustrating an example of a screen for a person correlation diagram.

FIG. 30 is a diagram illustrating an example of the screen to be displayed on the display unit 11. The screen to be displayed on the display unit 11 is configured of a correlation image display portion 601 for displaying an image relating to person correlation, and a tool display portion 602 where tools to be used for performing editing of an image within the correlation image display portion 601, and so forth are displayed.

With the correlation image display portion 601, multiple face images 611 through 617, strings 621 through 628 indicating that these face images are linked, tags 641 through 647 indicating relationship between the persons of the face images, and a representative image 651 including the displayed face images are displayed.

A face image 611 is displayed in the center portion of the correlation image display portion 601. This face image 611 is the image of the person of a face having a great number of times of appearances in images and serving as the center. The image data of this face image 611 is data based on the file name described in the face icon image field of the data 502 (FIG. 29) making up the person correlation data 501. Also, with regard to the data of the number of time of appearances as well, the data 502 is referenced. Also, a face image having a great number of times of appearances in images is configured so as to be displayed greater than a face image having a small number of times of appearances in images.

A string 621 and a string 622 are stretched from the face image 611. The strings indicate that face images (persons) have certain relationship. Also, an arrangement may be made wherein a string between face images having high closeness is displayed short, and a string between face images having low closeness is displayed long. The string 621 is stretched between the face image 611 and face image 612, and a tag 641 is displayed in the neighborhood of the string 621 as a tag displaying the relationship thereof. The information of this tag 644 is information extracted from the data 503. Specifically, in the event that the person ID of the face image 611 is "001", and the person ID of the face image 612 is "002", it can be found by referencing the data 503 that the tag is "Couple". The image of the tag 641 is generated from the information of this tag, and is displayed in the neighborhood of the string 621 stretched between the face image 611 and face image 612.

In this way, images within the correlation image display portion 601 are generated based on the person correlation data 501. When continuing description regarding the screen illustrated in FIG. 30, a string 622 is stretched between the face image 611 and face image 613, and a tag 642 of "Child" is displayed in the neighborhood of the string 622 as a tag representing the relationship thereof.

A string 623 is stretched between the face image 612 and face image 613, and the tag 642 of "Child" is displayed in the neighborhood of the string 622 as a tag representing the relationship thereof. According to such a tag and so forth, a viewer can be recognized that the person of the face image 611, and the person of the face image 612 are a couple (married couple), and the child thereof is the person of the face image 613. With regard to the display position of a face image, the display position in the vertical and horizontal directions is determined according to the age, relationship, and so forth.

A string 624 is stretched between the face image 612 and face image 614, and a tag 643 of "Friend" is displayed in the neighborhood of the string 624 as a tag representing the relationship thereof. In this case, it can be recognized that the person of the face image 612, and the person of the face image 614 are friends. Note that, in this case, the person of the face image 612, and the person of the face image 614 are friends, but the person of the face image 611, and the person of the face image 614 are not friends. Tentatively, if the person of the face image 611, and the person of the face image 614 are friends, a string is stretched between the face image 611 and face image 614, and a tag is displayed, in the event that the person of the face image 611, and the person of the face image 614 are friends.

A string 625 is stretched between the face image 611 and a face image 615, and a tag 644 of "Parent" is displayed in the neighborhood of the string 625 as a tag representing the relationship thereof. In this case, it can be recognized that the person of the face image 611, and the person of the face image 615 have parent relationship, and also with the parent relationship thereof, the person of the face image 615 is equivalent to a parent thereof in the event of conceiving this relationship with the person of the face image 611 as the center. That is to say, the center person is the person of the face image 611, so as to the person of the face image 611, the person of the face image 613 is a child, and the person of the face image 615 is a parent.

In this way, the screen indicating what kind of relationship a person has as to the center person is the correlation image display portion 601. For example, in the event that the viewer has moved the face image 613 to the center portion of the correlation image display portion 601 by executing predetermined operations, the screen is updated to a screen where the person of the face image 613 is set to the center person. In the event that the face image 613 has been set to the center person, since the person of the face image 611 is equivalent to a person as to the person of the face image 613, the tag between the face image 613 and face image 611 is changed to the tag of "Parent".

In order to realize such change, the person ID1 and person ID2 are provided to the data 502 (FIG. 29) making up the person correlation data 501. Specifically, for the data 502, information indicating whether to have what kind of relationship when viewing the person of the person ID2 from the person of the person ID1 is described in the tag field. Accordingly, even if the set between the person ID1 and the person ID2 is the same, tag information differs.

Returning to the screen example illustrated in FIG. 30, a string 626 is stretched between the face image 615 and a face image 616, and a tag 645 of "Friend" is displayed in the neighborhood of the string 626 as a tag representing the relationship thereof. A string 627 is stretched between the face image 616 and a face image 617, and a tag 646 of "Friend" is displayed in the neighborhood of the string 627 as a tag representing the relationship thereof. A string 628 is stretched between the face image 617 and the face image 615, and a tag 647 of "Friend" is displayed in the neighborhood of the string 628 as a tag representing the relationship thereof.

It can be recognized from such display that the person of the face image 615, the person of the face image 616, and the person of the face image 617 have friend relationship. At the time of such relationship, in FIG. 30, drawing and description have been made assuming that the tag of "Friend" is to be displayed, but "Friends" (plural) may be employed.

Such an image representing correlation between persons with a predetermined person as the center can be generated by the grouping processing such as described above or the like being executed, and the person correlation data 501 being generated. Further, an arrangement may be made wherein the viewer can change information within the correlation image display portion 601 using a tool displayed on the tool display portion 602.

With the tool display portion 602, four strings are prepared as tools. First, a string 661 is a tool to be used in the event that a string to be stretched between two face images is added, and the tag of "Parent" is added. Similarly, a string 662 is a tool to be used in the event that a string to be stretched between two face images is added, and the tag of "Friend" is added. Similarly, a string 663 is a tool to be used in the event that a string to be stretched between two face images is added, and the tag of "Couple" is added. Similarly, a string 664 is a tool to be used in the event that a string to be stretched between two face images is added, and the tag of "Family" is added.

Also, scissors 665 to be used at the time of deleting the link of an already stretched string are also displayed in the tool display portion 602. How to use these tools will be described with reference to FIGS. 31 through 33.

Processing Relating to Change or Addition of Tag

Figure 31C:
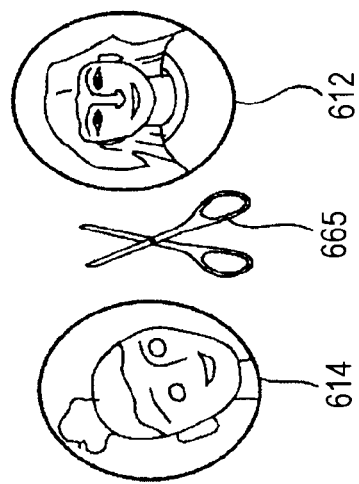
FIGS. 31A through 31C are diagrams for describing editing of tags.
Figure 31B:
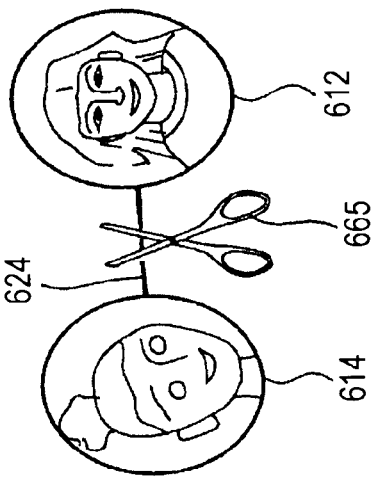
Figure 31A:
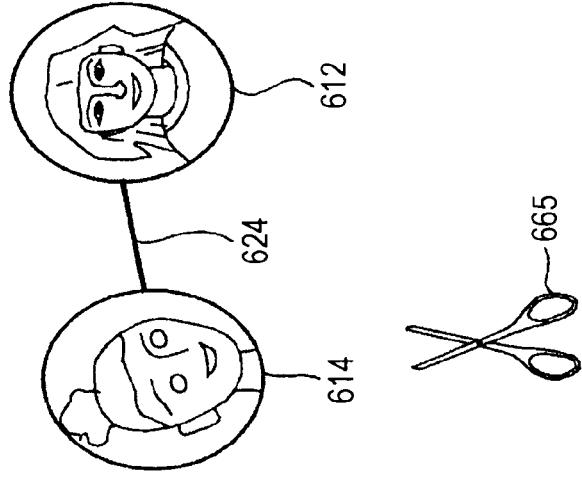

FIGS. 31A through 31C are diagrams for describing processing to be performed at the time of deleting a link using the scissors 665. As illustrated in FIG. 31A, in a state in which a string 624 is stretched between the face image 612 and face image 614, and the tag 643 is displayed, let us say that the viewer desires to cut this string 624 by the scissors 665.

In such a case, the viewer drags the scissors 665 displayed on the tool display portion 602 to move these above the string 624 while keeping the state thereof. By being moved, the scissors 665 become a state such as illustrated in FIG. 31B. In FIG. 31B, the scissors 665 are positioned above the string 624. In this way, when the scissors 665 are positioned above the string 624, upon a predetermined operation such as clicking being executed, the string 624 is deleted.

That is to say, as illustrated in FIG. 31C, the string 624 displayed between the face image 612 and face image 614 is deleted, and is not displayed. Further, upon the string 624 being deleted, the tag 643 indicating the relationship thereof also becomes an invisible state. Further, though not illustrated in the drawing, the face image 614 itself may not be displayed. That is to say, in this case, when referencing FIG. 30, a person close to the person of the face image 611 serving as the center person is the person of the face image 612, and is not the person of the face image 614, so a face image having a lower closeness degree as to the center person may be deleted (may not be displayed).

The processing at the time of a display tag being changed will be described with reference to FIGS. 32A through 32C. This processing is performed, for example, when a referencing person desires to perform change since a displayed tag has an inappropriate tag name.

Figure 32A:
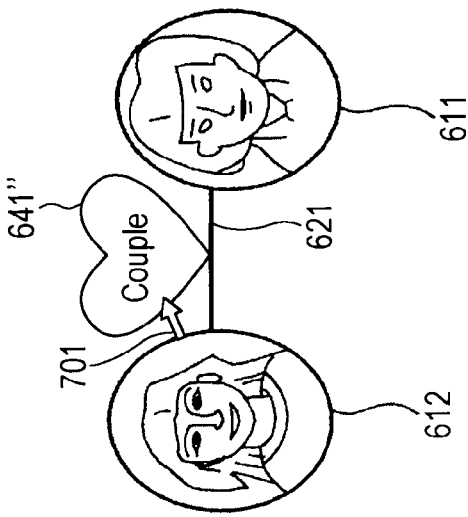
FIGS. 32A through 32C are diagrams for describing editing of tags.
Figure 32B:
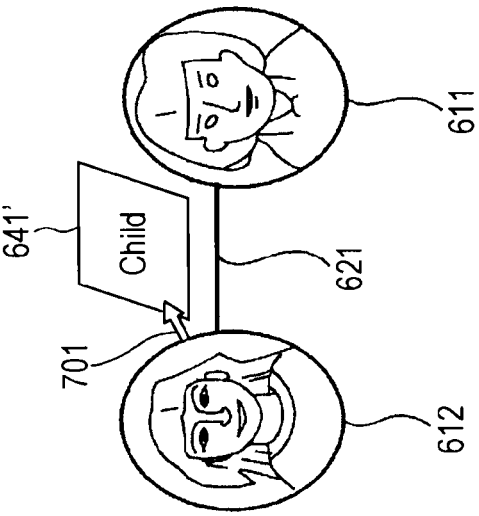
Figure 32C:
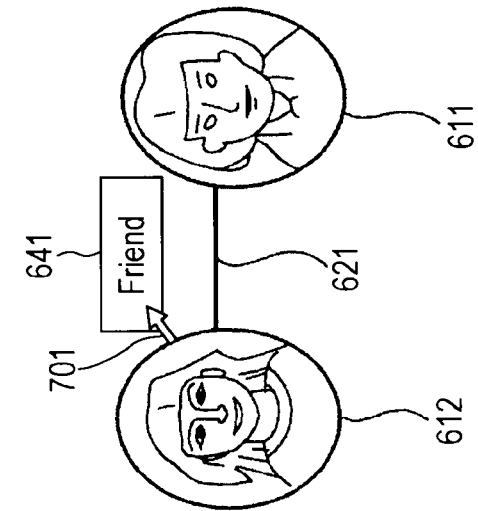

As illustrated in FIG. 32A, in a state in which the string 621 is stretched between the face image 611 and face image 612, and the tag 641 of "Friend" is displayed, let us say that the tag 641 of "Friend" is desired to be changed to the tag of "Couple". In such a case, the viewer moves a cursor 701 above the tag 641 by operating a mouse or the like. FIG. 32A illustrates a state in which the cursor 701 is moved to the tag 641.

Upon a predetermined operation such as clicking being performed when the cursor 701 is positioned above a predetermined tag, the tag thereof is changed. That is to say, as illustrated in FIG. 32B, upon clicking being performed once, the display is changed from the tag 641 of "Friend" to a tag 641' of "Child". The viewer should end the operations when satisfying the tag 641' of "Child". However, in this case, the viewer further executes a predetermined operation such as clicking when the cursor 701 is positioned above the tag 641' to change to the tag of "Couple".

The name of the tag is further changed by clicking being performed again, and becomes a tag 641" of "Couple". This state is illustrated in FIG. 32C. That is to say, an arrangement is made wherein the viewer performs operations in a state in which the cursor 701 is positioned above a tag where the tag name thereof is intended to be changed until a desired tag name is displayed, the tag name can be changed to the desired tag name.

Next, processing at the time of stretching a new string (providing a new link) between face images will be described with reference to FIGS. 33A through 33C. The state illustrated in FIG. 33A is a state in which the face image 612 and face image 614 are displayed, but no string is stretched between the face images thereof, and no tag is displayed. At the time of such a state, let us say that the viewer desires to stretch a string (provide a link) between the face image 612 and face image 614.

When a photographer desires to stretch a string, the photographer selects a string having a desired tag name out of the strings 661 through 664 displayed on the tool display portion 602. Now, let us say that the string 662 of the tag name "Friend" has been selected. The photographer moves the string 662 by executing predetermined processing such as dragging or the like above one face image of the two face images where the string is desired to be stretched. The state illustrated in FIG. 33B indicates a state in which the string 662 is moved above the face image 614.

From such as state, upon the photographer further executing a predetermined operation such as dragging or the like from the face image 614 toward the face image 612, the string 624 is displayed between the face image 612 and face image 614, and further the tag 643 of "Friend" is displayed, as shown in FIG. 33. Thus, when providing to a link between face images, an arrangement is made wherein the photographer selects desired strings 661 through 664 from the tool display portion 602, and executes a predetermined operation such as connecting face images, whereby a link can be provided.

In the event that such an operation has been performed by the photographer, processing has to be performed wherein the corresponding data within the person correlation data 501 is changed. This processing will be described with reference to the flowcharts illustrated in FIGS. 34 through 35.

Figure 34:
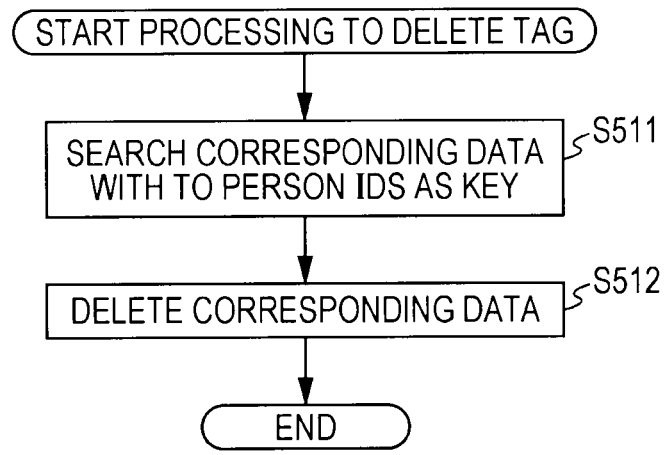
FIG. 34 is a flowchart for describing editing of tags.

The flowchart illustrated in FIG. 34 is a flowchart for describing processing to be executed at the time of deletion of a string (deletion of a link) described with reference to FIGS. 31A through 31C. In the event that judgment is made that an operation for deleting a string has been executed, in step S511 the corresponding data is searched with the two person IDs as keys. For example, the example illustrated in FIGS. 31A through 31C is at the time of an operation for deleting the string 624 (tag 643) between the face image 612 and face image 614 being executed, so the person ID corresponding to the face image 612, and the person ID corresponding to the face image 614 are set to keys.

With the example illustrated in FIGS. 31A through 31C, as described above, the person of the face image 612 has a closer relation as to the center person than the person of the face image 614, so data with the person ID corresponding to the face image 612 as the person ID1, and with the person ID corresponding to the face image 614 as the person ID2 is searched and extracted from the data 502 (FIG. 29).

Upon such data being searched and extracted, the data thereof is deleted as processing in step S512. For example, in the event that the person ID corresponding to the face image 612 is "003", and the person ID corresponding to the face image 614 is "001", the data on the third row is extracted and deleted by searching the data 503 (FIG. 29).

Next, description will be made regarding processing to be executed at the time of an operation relating to change of the tag name of a tag described with reference to FIGS. 32A through 32C, with reference to the flowchart in FIG. 35. In the event that judgment is made that an operation for changing a tag has been executed by the viewer, in step S531 the corresponding data is searched with the two person IDs as keys. For example, the example illustrated in FIGS. 32A through 32C is at the time of an operation for changing the tag name of the tag 641 between the face image 611 and face image 612 being executed, so the person ID corresponding to the face image 611, and the person ID corresponding to the face image 612 are set to keys.

For example, data with the person ID corresponding to the face image 611 as the person ID1 or person ID2, with the person ID corresponding to the face image 612 as the person ID2 or person ID1, and with the tag name of "Friend" being written in the tag field, is searched and extracted from the data 503 (FIG. 29).

Upon such data being searched and extracted, the data thereof is changed as the processing in step S532. For example, with the example illustrated in FIGS. 32A through 32C, the tag name in the tag field is changed from the tag name of "Friend" to the tag name of "Couple".

Next, description will be made regarding processing to be executed at the time of an operation relating to addition of a tag described with reference to FIGS. 33A through 33C being executed, with reference to the flowchart in FIG. 36. In the event that judgment is made by the operation judging unit 22 (FIG. 1) that an operation for adding of a string has been executed by the viewer, in step S551 the person correlation data updating unit 24 searches the data within the person correlation database 41 with the two person IDs as keys. For example, the example illustrated in FIGS. 33A through 33C is at the time of an operation for adding a string between the face image 612 and face image 614 being executed, so the person ID corresponding to the face image 612, and the person ID corresponding to the face image 614 are set to keys.

In such a state in which there is no string between the face image 612 and face image 614, there is a possibility that the tag field of the data 502 may be empty, or there may be no data 502 itself. Therefore, in step S552 judgment is made whether or not there is data. With this judgment, for example, in the event that data with the person ID corresponding to the face image 612 as the person ID1 or person ID2, with the person ID corresponding to the face image 614 as the person ID2 or person ID1, and with the tag field being empty, is searched and extracted from the data 503 (FIG. 29), judgment is made that there is data, and the processing proceeds to step S553.

In step S553, the processing proceeds to changing processing. This changing processing is processing for changing a tag described with reference to the flowchart illustrated in FIG. 35. That is to say, in this case, there is data in the data 502, so the changing processing is processing for rewriting the data thereof, whereby the changing processing can be performed in the same way as with the processing for rewriting a tag.

On the other hand, in the event that judgment is made in step S552 that there is no data, the processing proceeds to step S554. In this case, there is no data in the data 503, but there is data in the data 502 (in the event that there is no data in the data 502, there is no face icon image itself, so no face image is displayed). In step S554, a record of the two person IDs and a tag is added to the data 503.

Figure 33C:
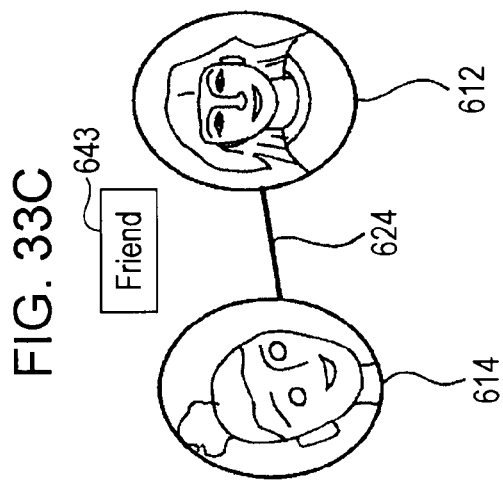
FIGS. 33A through 33C are diagrams for describing editing of tags.
Figure 33B:
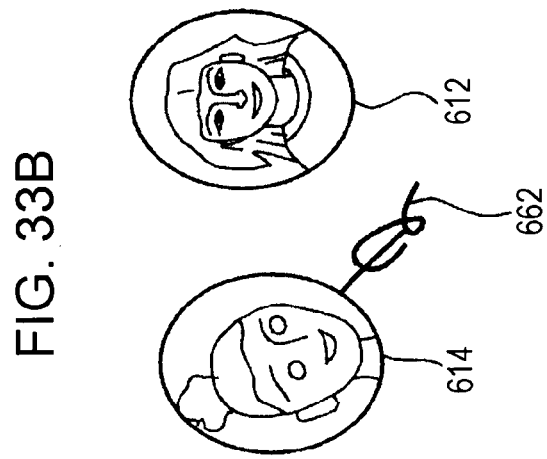
Figure 33A:
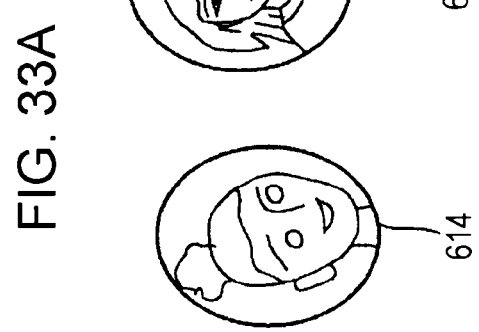

For example, in the event of the state illustrated in FIGS. 33A through 33C, the person ID corresponding to the face image 612, and the person ID corresponding to the face image 614 are written in the data 503, and further the tag name of "Friend" is written in the tag field. Other information making up the data 503, for example, a closeness score and a photo image are also filled in by calculation being performed, or a file name being written in as appropriate.

Further, an arrangement is provided so that the person correlation data 501 stored in the person correlation database 41 can be corrected or changed by the user. Processing relating to such correction or change will be described with reference to FIGS. 37 through 39.

Figure 37:
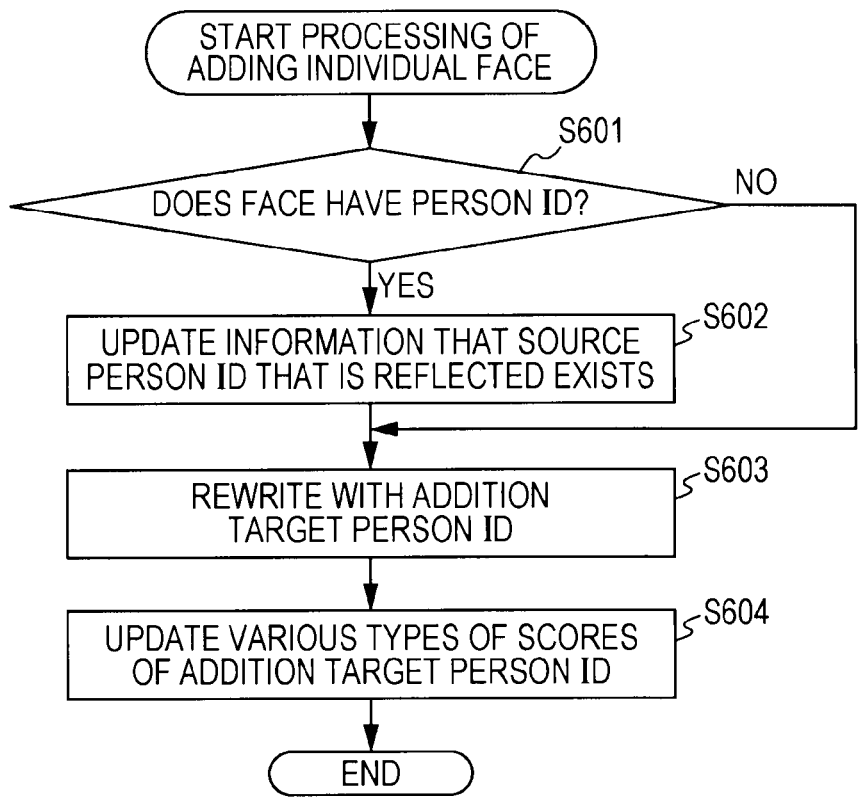
FIG. 37 is a flowchart for describing editing of data.

First, individual face adding processing will be described with reference to the flowchart in FIG. 37. The individual face adding processing is processing at the time of correction being performed by the user so as to handle as the same person, for example, in the event that the number of face images displayed within the correlation image display portion 601 of the same person is equal to or greater than 2, in other words, in the event that the same person is processed as a different person by erroneous judgment. Also, this processing is processing wherein when there is a face (face image) that the user intends to display though this face is not displayed on the correlation image display portion 601, the face thereof is added.

In step S601, judgment is made whether or not the face (face image) specified by the user has a person ID. In the event that judgment is made in step S601 that the face specified by the user has a person ID, the processing proceeds to step S602. In step S602, information where the source person ID that is reflected exists is updated. That is to say, information relating to the person ID corresponding to the face specified by the user is updated.

In the event that the updating processing in step S602 has been completed, or in the event that judgment is made in step S601 that the face has no person ID, the processing proceeds to step S603. In step S603, rewriting is performed with an addition target person ID. This case is a case where the same person is judged to be a different person, so this is a state in which a different person ID is assigned thereto, or in a state in which a person ID is assigned to only one of the faces. In such a state, processing is performed wherein the person IDs are integrated into any one of the person IDs, or the assigned person ID is also assigned to the other.

In step S604, various types of scores relating to the rewritten person ID are updated. For example, there is a high possibility that the number of times of appearances, or the closeness score may become a different score by the person ID being rewritten, so updating processing of these scores is executed as the processing in step S604 again.

Figure 38:
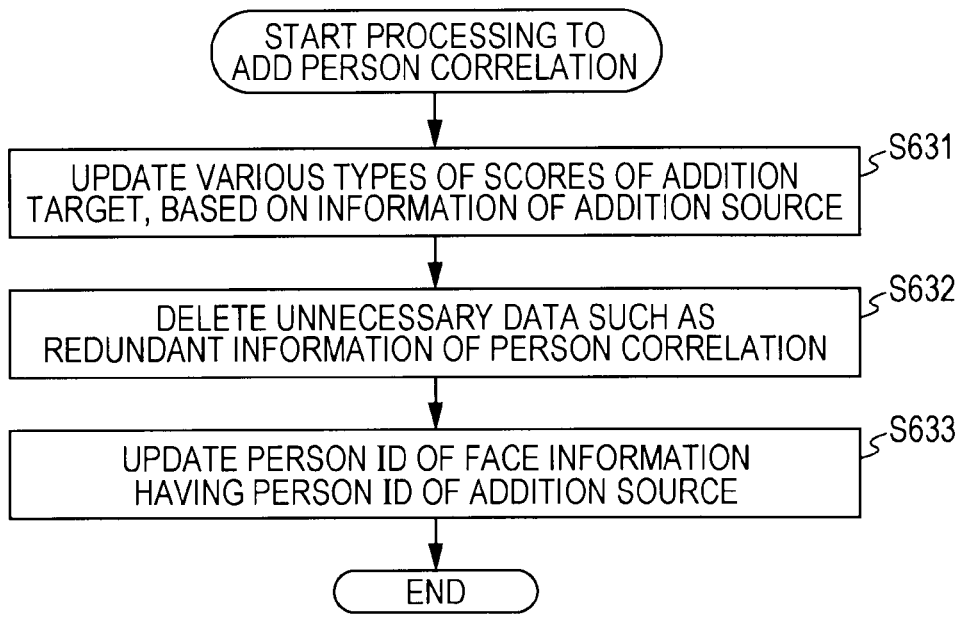
FIG. 38 is a flowchart for describing editing of data.

Next, person correlation adding processing will be described with reference to the flowchart in FIG. 38. The person correlation adding processing is processing wherein there is a possibility that relationship between persons may not be judged with precision of 100%, so data relating to person correlation is first generated as described above, and subsequently, the user is allowed to perform adding of relationship, or deletion of erroneous judgment.

In step S631, the addition targets of various types of scores are updated based on information of the addition source. For example, in the event that addition of new relationship (addition of a string or tag) has been performed, in the event that deletion of relationship (deletion of a string or tag) has been performed, information corresponding to the addition or deletion thereof is updated. Subsequently, in step S632 unnecessary data such as redundant information of person correlation and so forth is deleted. Subsequently, in step S633 the person ID of face information having the person ID of the addition source is also updated.

Figure 35:
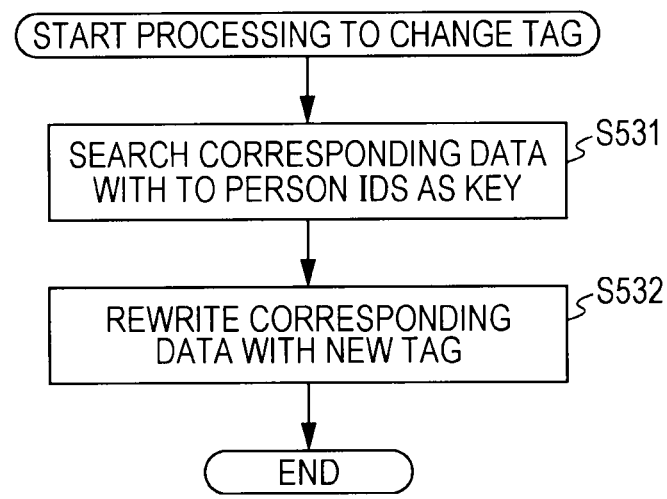
FIG. 35 is a flowchart for describing editing of tags.
Figure 36:
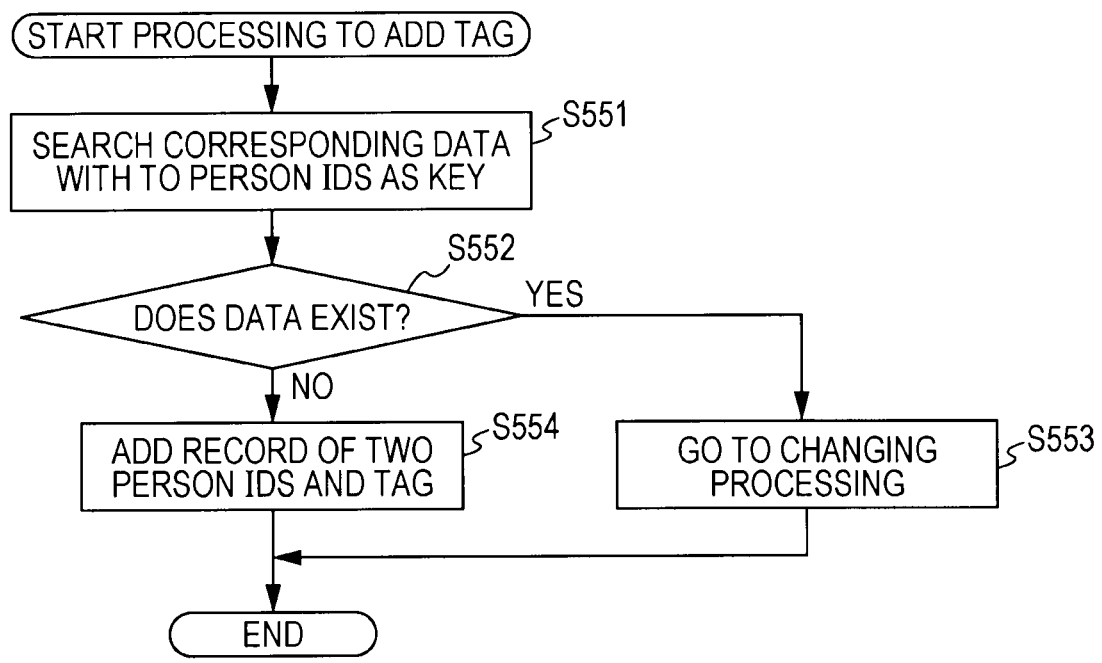
FIG. 36 is a flowchart for describing editing of tags.

Such processing is processing including the processing for deleting a tag in FIG. 34, the processing for changing a tag in FIG. 35, and the processing for adding a tag in FIG. 36, and the processing corresponding to each processing is performed.

Figure 39:
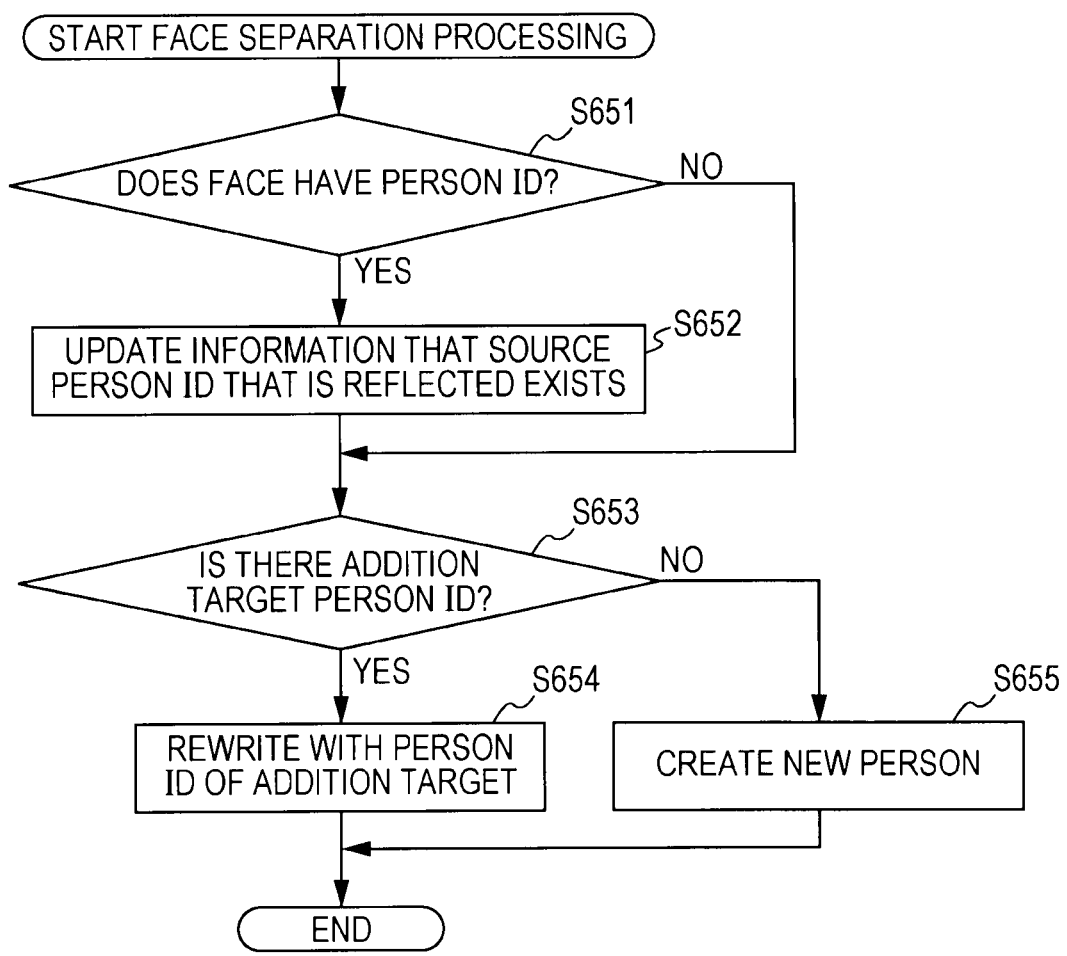
FIG. 39 is a flowchart for describing editing of data.

Next, face separation processing will be described with reference to the flowchart in FIG. 39. The face separation processing is processing opposite to the individual face adding processing described in FIG. 37. Specifically, the face separation processing is processing to be performed at the time of correction being performed so that in the event that different persons are processed as the same person by erroneous judgment, these persons can be handled as different persons by the user.

In step S551 judgment is made whether or not the face of which the separation has been instructed has a person ID. In the event that judgment is made in step S651 that the face has a person ID, the processing proceeds to step S652. In step S652, information where the source person ID that is reflected exists is corrected. That is to say, information relating to the person ID corresponding to the face specified by the user is corrected.

In the event that the correction processing in step S652 has been completed, or in the event that judgment is made in step S651 that the face has no person ID, the processing proceeds to step S653. In step S653, judgment is made whether or not there is an addition target person ID. In the event that judgment is made in step S653 that there is an addition target person ID, the processing proceeds to step S654.

In step S654, rewriting is performed with the addition target person ID. That is to say, this case is a case where the separated face is an already registered face, and the person ID thereof has been assigned, so rewriting is executed with the person ID thereof. Processing such as updating of a score or the like is executed as appropriate.

On the other hand, in the event that judgment is made in step S653 that there is no addition target person ID, the processing proceeds to step S655. In this case, in order to mean that a state is provided wherein no person ID is assigned to the face by separation being performed, a person is newly created as the processing in step S655. That is to say, a person ID is newly assigned, or a score is calculated.

In this way, it is common that the discerning precision of faces is not 100%, so there is a possibility that an error may occur. Such an error can be corrected by the user, whereby information relating to high-precision person correlation can be generated.

In this way, according to the present embodiment, data for drawing a correlation map with a person who shows up in an image imaged by a photographer can be generated, and the correlation map based on the data thereof can be drawn. According to such drawing, the memory or surrounding environment of the photographer at the time of shooting can be remembered from person correlation, and viewing of a photo based on the real-life experience of the photographer can be realized.

Also, with the present embodiment, a sorting method which deals primarily with persons is employed, unlike photo sorting methods according to the related art which are restricted to time or place, so search personalized for each user can be executed. For example, search can be performed, such as "a person couple with a person A", "a person friend with a person B", or the like.

Second Embodiment

Next, the second embodiment will be described. The second embodiment includes redundant portions of the first embodiment in description, and accordingly description regarding the redundant portions will be omitted as appropriate.

Figure 40:
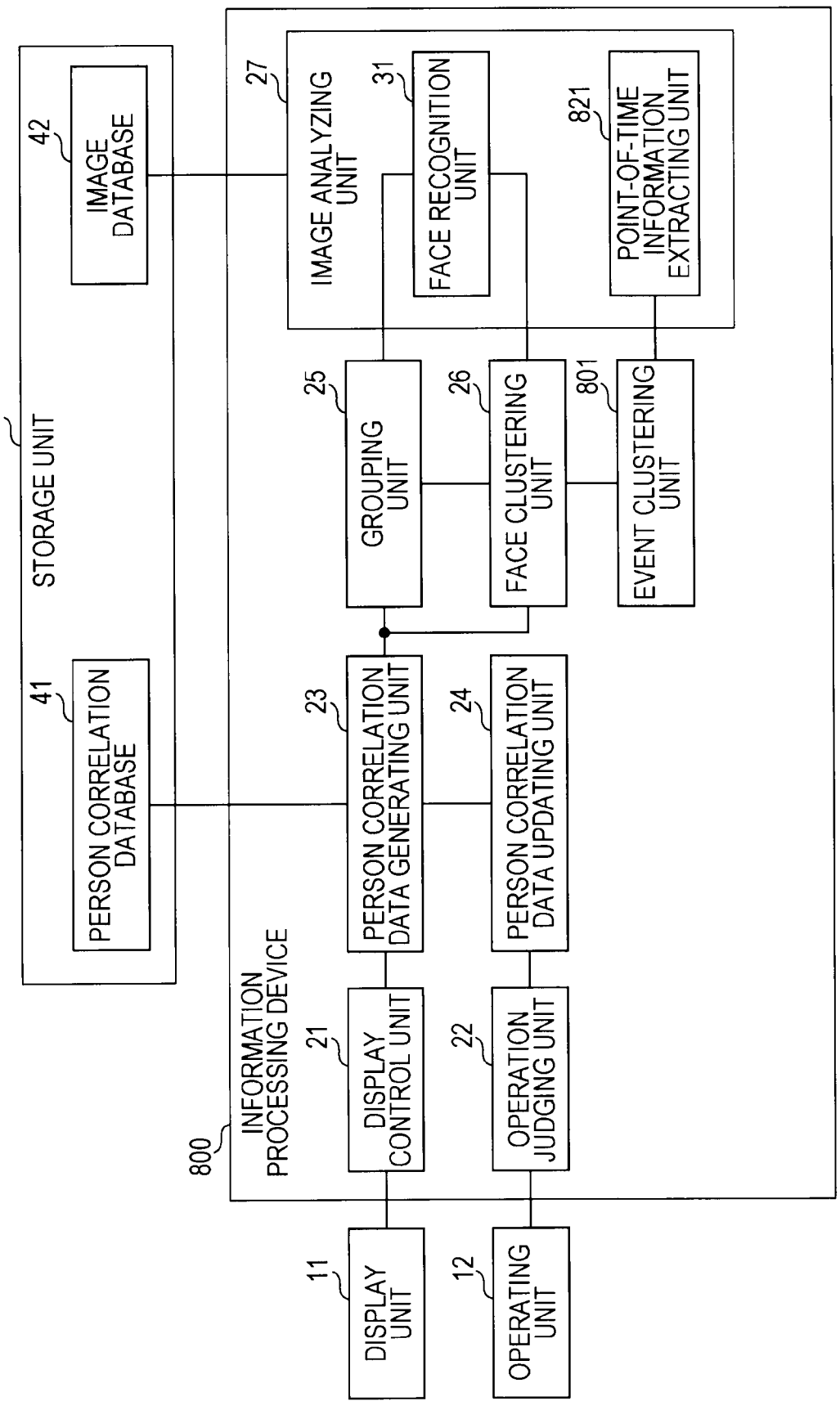
FIG. 40 is a diagram illustrating the configuration of another information processing device to which an embodiment of the present invention has been applied.

FIG. 40 is a diagram illustrating the configuration of an embodiment of a system including an information processing device according to the second embodiment. The information processing device 800 illustrated in FIG. 40 is configured by adding an event clustering unit 801, and a point-in-time information extracting unit 821 to the configuration of the information processing device 13 illustrated in FIG. 1.

The point-in-time extracting unit 821, which is included in the image analyzing unit 27, has a function for extracting date and time when as a result of image analysis the image thereof was imaged. The event clustering unit 801 has a function for classifying an image based on information relating to the extracted date and time. Specifically, the event clustering unit 801 executes processing for grouping events for each event such as a marriage ceremony, an athletic meet, or a party for each image imaged at the time of event thereof.

The person correlation database 41 stores person correlation data which includes an ID for discerning which event it is, and so forth, and is a database whereby an image belonging to an event can uniquely be identified for each event.

Functions relating to the other portions are the same as with the information processing device 13 illustrated in FIG. 1, so description thereof will be omitted here.

Figure 41:
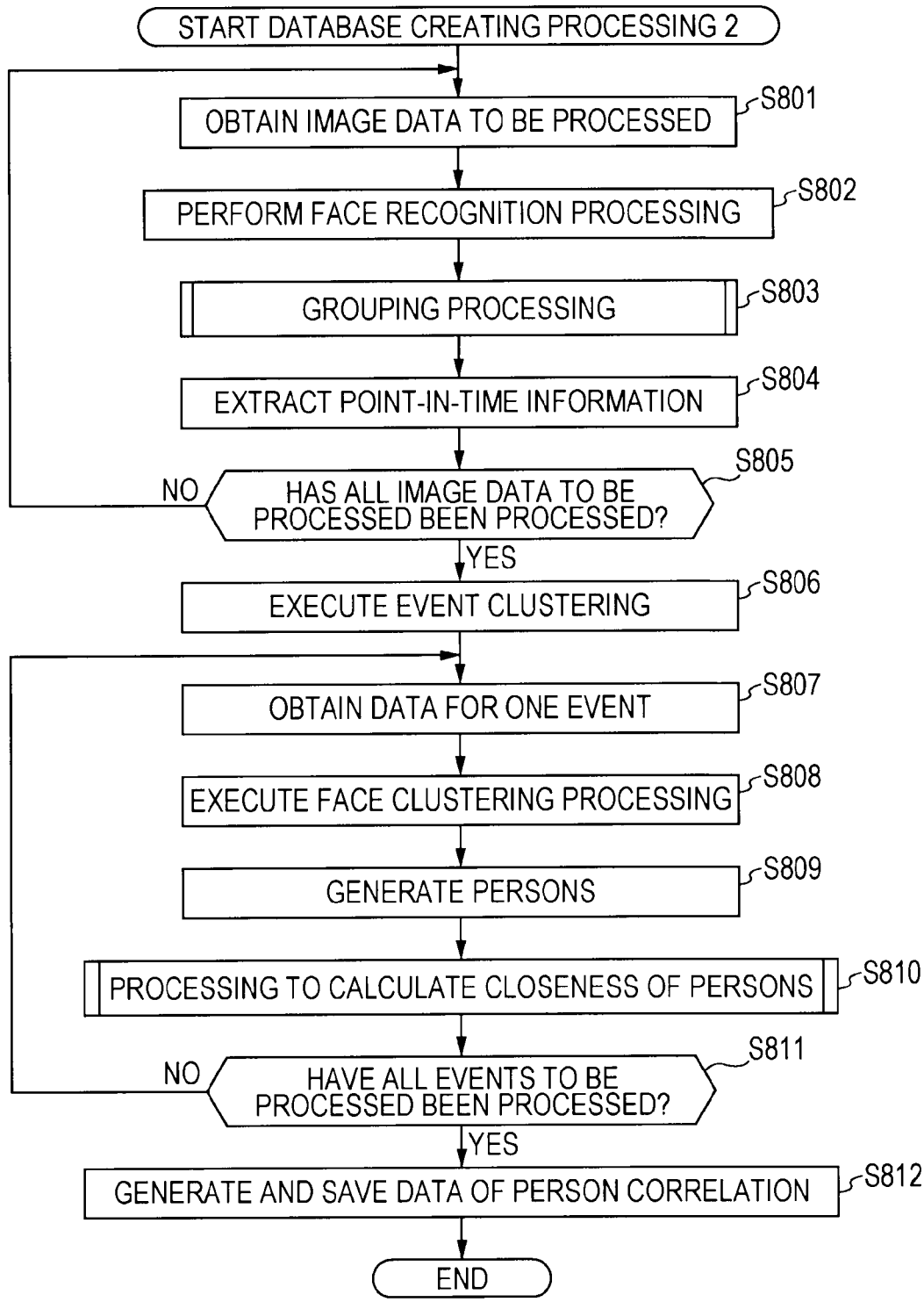
FIG. 41 is another flowchart for describing creating of a database.

The operation of the information processing device 800 illustrated in FIG. 40 will be described with reference to the flowchart illustrated in FIG. 41. In step S801, image data to be processed is obtained. Face recognition processing is executed as to the image based on the obtained image data thereof as processing in step S802, whereby a face (face region) is extracted from the image to be processed.

In step S803, grouping processing for grouping extracted faces into a predetermined group is executed. As a result state thereof, one or more groups are generated within the image to be processed, and at least one face is included in one group. The processing in steps S801 through S803 is performed in the same way as the processing in steps S11 through S13 of the flowchart illustrated in FIG. 2 respectively, and detailed description thereof has already been made, so description thereof will be omitted here.

While the grouping processing is executed in step S803, extraction processing of point-in-time information is executed in step S804 as to a similar image. The point-in-time information can be obtained by obtaining information of a "DateTimeOriginal" tag of a photo image saved in an EXIF format. With the processing in step S804, date and time when the image to be processed was shot is extracted by the point-in-time information extracting unit 821. In step S805, judgment is made whether or not all image data to be processed has been processed.

In the event that judgment is made in step S805 that all image data to be processed has not been processed, the processing returns to step S801, and the subsequent processing thereof is repeated. On the other hand, in the event that judgment is made in step S805 that all image data to be processed has been processed, the processing proceeds to step S806.

In step S806, event clustering is executed. This event clustering is performed by the event clustering unit 801 using the point-in-time information extracted in step S804. Detailed description relating to event clustering is described, for example, in Japanese Unexamined Patent Application Publication No. 2007-94762 previously filed by the present assignee, and according to the processing based on the description thereof the processing in step S806 can be executed.

The event clustering processing is executed, whereby all of the image IDs and shot point-in-time information within the image database 42 are processed at the event clustering unit 801, and are grouped for each shot event. Upon the event clustering processing being completed, the processing proceeds to step S807. In step S807, one event worth of data is obtained. In step S808, the face clustering unit 26 which has obtained one event worth of data executes the face clustering processing, and in step S809 generates a person.

Specifically, first, the face clustering unit 26 obtains the image IDs of images of the same event from the processing results of the event clustering unit 801. Subsequently, the face clustering unit 26 obtains the face discerning feature amount of the corresponding image ID and the face ID in increments of events from the face recognition processing results, and performs grouping for each same person who shows up in a photo within the same event using similarity of face discerning feature amounts.

Such processing is executed, which results in a state in which a person is generated for each event for each image, and the same persons are handled as the same person. In such a state, in step S810 calculation processing of closeness of persons is executed. The processing in steps S808 through S810 is performed in the same way as the processing in steps S15 through S17 of the flowchart illustrated in FIG. 2 respectively, and detailed description thereof has already been made, so description thereof will be omitted here.

In step S811, judgment is made whether or not all of the events to be processed have been processed. In the event that multiple events have been generated by the event clustering processing having been executed in the processing in step S806, judgment is made in step S811 whether or not the processing has been executed as to all of these events. In the event that judgment is made in step S811 that all of the events to be processed have not been processed, the processing returns to step S807, and the processing in step S807 and thereafter is repeated as to a new event.

On the other hand, in the event that judgment is made in step S811 that all of the events to be processed have been processed, the processing proceeds to step S812. In step S812, person correlation data is generated, and is saved in the person correlation database 41. The processing in this step S812 is performed in the same way as the processing in step S18 in FIG. 2, so description thereof will be omitted.

In this way, the person correlation data 501 including information of events is generated. For example, the person correlation data 501 such as illustrated in FIG. 42 is generated. The person correlation data 501 illustrated in FIG. 42 differs in that the data 503 is changed to data 503' (described with an apostrophe to be distinguished from the data 503 in FIG. 2) for correlating an event ID as compared to the person correlation data 501 illustrated in FIG. 29.

Figure 43:
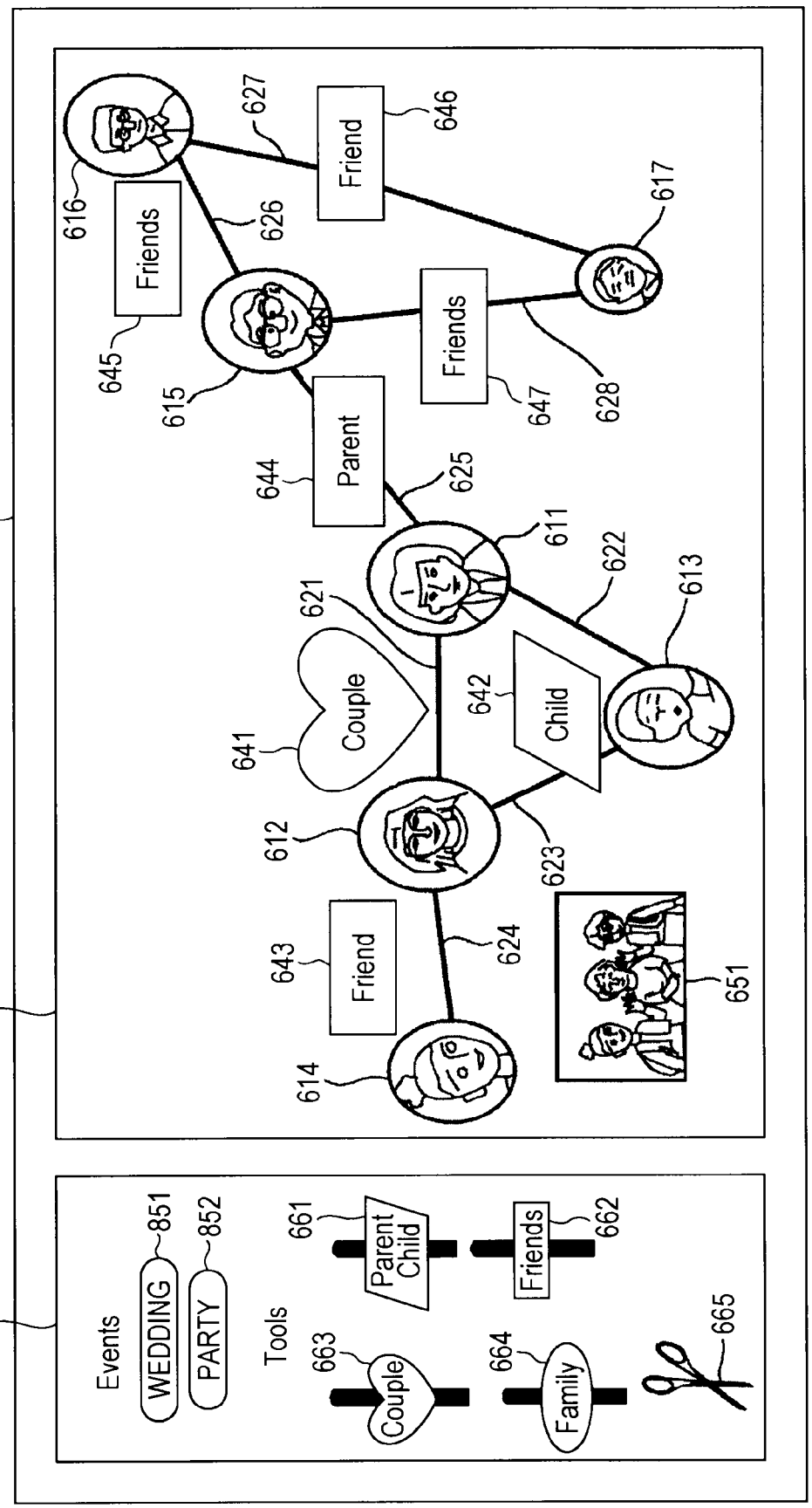
FIG. 43 is a diagram illustrating an example of a screen for a person correlation diagram.

The data 503' is data in which an event ID, a person ID1, a person ID2, a closeness score, a tag, and a photo image are correlated. The event ID is an ID to be assigned for each event to uniquely distinguish a predetermined event. The data managed by the same event ID indicates to belong to the same event. FIG. 43 illustrates an example of a screen to be displayed on the display unit 11, created based on the person correlation data 501 including such data 503.

The basic configuration of the screen illustrated in FIG. 43 is the same as the screen illustrated in FIG. 30. In the event of comparing the screen illustrated in FIG. 43 and the screen illustrated in FIG. 30, the screen illustrated in FIG. 43 differs from the screen illustrated in FIG. 30 in that buttons 851 and 852 for selecting an event are displayed on the tool display portion 602 of the screen illustrated in FIG. 43.

The button 851 is a button to be selected and operated at the time of an event name of "WEDDING" being displayed, and a photo at the time of a marriage ceremony being displayed on the correlation image display portion 601. The button 852 is a button to be selected and operated at the time of an event name of "PARTY" being displayed, and a photo at the time of a party being displayed on the correlation image display portion 601. With the screen illustrated in FIG. 43, only the two buttons are illustrated, but the number of buttons displayed corresponds to the number of generated events.

For example, when viewing a photo at the time of a marriage ceremony, the user can display the photos at the time of the marriage ceremony on the correlation image display portion 601 by operating the button 851 on which an event name of "WEDDING" is written. The button selected by the user can be displayed with a different color or an arrow so as to be distinguished from an unselected button.

In this way, an image is processed for each event, and also data including event information is created, whereby the screen of which an example is illustrated in FIG. 43 can be provided to the user. Accordingly, the user (viewer) can view an image shot at the time of a predetermined event simply by operating a button. Further, the image thereof is displayed as a correlation map between a person serving as the center at the time of the event thereof, and other persons, the memory and surrounding environment of a photographer at the time of shooting can be remembered from the person correlation, and viewing of a photo based on the real-life experience of the photographer can be realized.

Also, with the present embodiment, a sorting method which primarily deals with persons is employed, unlike photo sorting methods according to the related art which are restricted to time or place, so search personalized for each user can be executed. For example, search can be performed, such as "a photo at a marriage ceremony", "a person couple with a person A", "a person friend with a person B", or the like.

Recording Medium

The above series of processing can be executed not only by hardware but also by software. In the event of executing the series of processing by software, a program making up the software thereof is installed into a computer. Here, the computer includes a computer built into dedicated hardware, a general-purpose personal computer capable executing various types of functions by installing various types of programs for example, and so forth.

Figure 44:
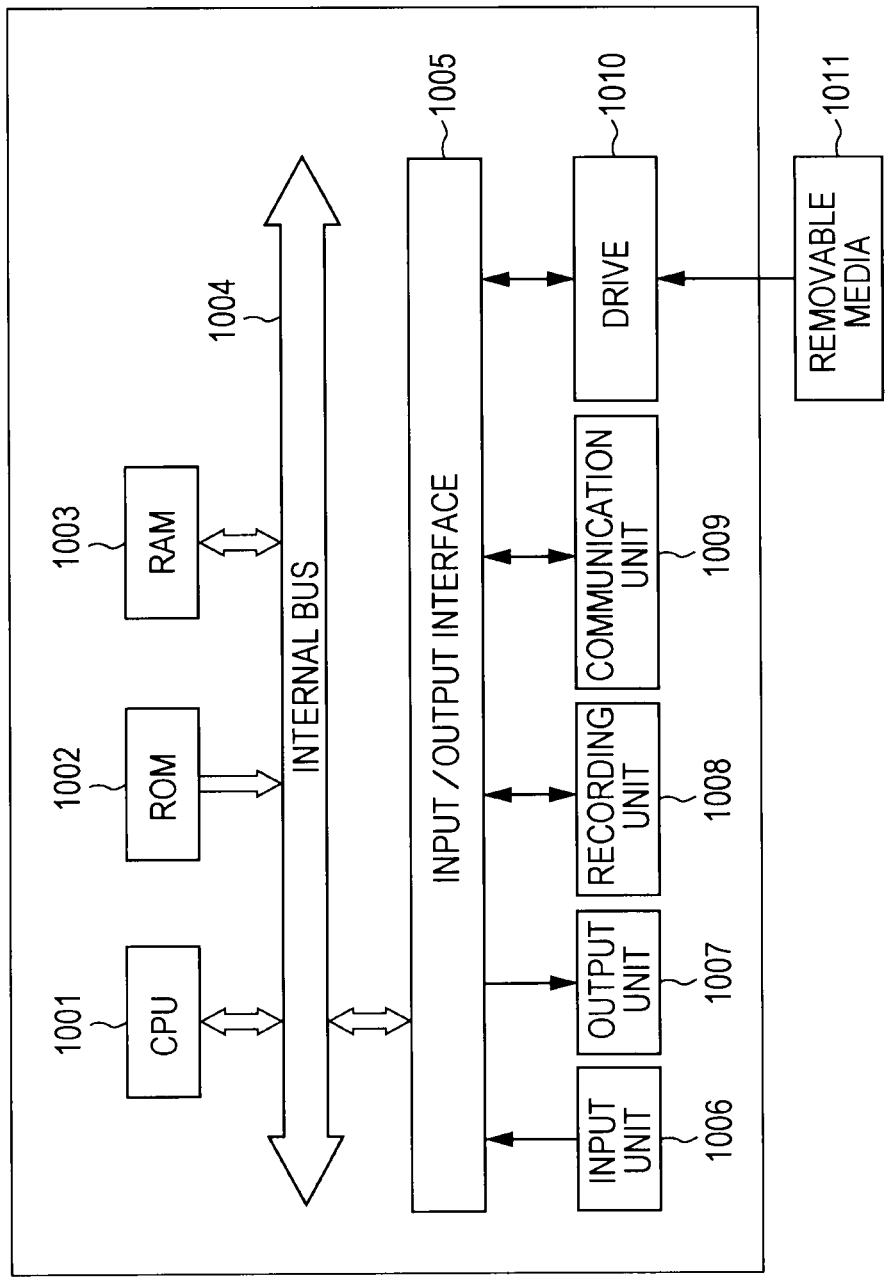
FIG. 44 is a diagram for describing a recording medium.

FIG. 44 is a block diagram illustrating a configuration example of the hardware of a computer which executes the above series of processing by the program. With the computer, a CPU (Central Processing Unit) 1001, ROM (Read Only Memory) 1002, RAM (Random Access Memory) 1003, and a bus 1004 are mutually connected. The bus 1004 is further connected with an input/output interface 1005. The input/output interface 1005 is connected with an input unit 1006, an output unit 1007, a storage unit 1008, a communication unit 1009, and a drive 1010.

The input unit 1006 is made up of a keyboard, a mouse, a microphone, and so forth. The output unit 1007 is made up of a display, a speaker, and so forth. The storage unit 1008 is made up of a hard disk, semiconductor memory, and so forth. The communication unit 1009 is made up of a network interface and so forth. The drive 1010 drives a removable medium 1011 such as a magnetic disk, an optical disc, a magneto optical disk, semiconductor memory, or the like.

With the computer configured as described above, the above series of processing is performed, for example, by the CPU 1001 loading a program stored in the storage unit 1008 to the RAM 1003 via the input/output interface 1005, and the bus 1004, and executing the program.

The program that the computer (CPU 1001) executes can be provided, for example, by being recorded in the removable medium 1011 serving as packaged media or the like. Also, the program can be provided via a cable or wireless transmission medium such as a local area network, the Internet, or digital satellite broadcasting.

With the computer, the program can be installed in the storage unit 1008 via the input/output interface 1005 by the removable medium 1011 being mounted on the drive 1010. Also, the program can be installed into the storage unit 1008 by being received via a cable or wireless transmission medium. In addition, the program can be installed into the ROM 1002 or storage unit 1008 beforehand.

Note that the program that the computer executes may be a program of which the processing is performed in time sequence along the order described in the Specification, or may be a program of which the processing is performed in parallel or at appropriate timing such as a call-up being performed, or the like.

Also, with the present Specification, the term "system" represents the entirety of equipment made up of multiple devices.

Note that embodiments of the present invention are not restricted to the above embodiments, and various modifications can be made without departing from the essence of the present invention.

The present application contains subject matter related to that disclosed in Japanese Priority Patent Application JP 2009-291129 filed in the Japan Patent Office on Dec. 22, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    extracting means for extracting a face from an image;
    grouping means for classifying, based on a position of the face within the image, said face extracted by the extracting means into a group, said grouping means further including filtering means for performing filtering to compare an average value of a size of the extracted face and for excluding a face having a size equal to or greater than a first threshold or a face having a size equal to or smaller than a second threshold from being processed;
    first adding means for adding to a group generated by the grouping means a tag indicating relationship between persons within the group;
    closeness calculating means for calculating the closeness of the person of said face from distance between groups generated by the grouping means; and
    person correlation data generating means for generating person correlation data including at least said tag and said closeness.

2. The information processing device according to claim 1, said grouping means comprising:
    first generating means for generating a group by the position of each face from the center of gravity of the positions of all faces to be extracted and processed;
    second generating means for generating an approximation line from the position of each face to be processed to generate a group by distance from the approximation line thereof;
    second adding means for adding to a group generated by said second generating means a face not belonging to the group;
    third generating means for generating a group by obtaining distance from a coordinate average of a face to be processed with a face not included in a group as to be processed; and fourth generating means for taking faces remaining alone as a group with a face not included in a group as to be processed.

3. The information processing device according to claim 2, wherein said second generating means selects a first face serving as a reference from said face to be processed, generates an approximation line from the first face and a second face, generates a group based on a distance of said face to be processed from the approximation line and a ratio as to the average value of the size of said face to be processed being a certain value or less.

4. The information processing device according to claim 2, wherein said second adding means adds a face to said group, which has a certain size as to the average value of the size of a face included in the group and is within a certain distance to said approximation.

5. The information processing device according to claim 2, wherein said third generating means selects a first face from faces not included in a group, to extract a combination of faces with distance as to the coordinate average as to the other faces including the first face thereof being equal to or less than a certain value, and, of the extracted combinations, select a combination with distance between the average coordinates within said group and each face of the group being the least.

6. The information processing device according to claim 2, wherein said fourth generating means takes a face not being grouped, and groups the face as a single group based on the face size being equal to or greater than the average value of face sizes in the image.

7. The information processing device according to claim 1, further comprising:
   date-and-time extracting means for extracting date and time when said image was imaged; and
   event clustering means for generating an event using information relating to the date and time extracted by said date-and-time extracting means to classify said image for each event;
   wherein said person correlation data, which includes information relating to said event, is data whereby at least said tag and said closeness are managed for each event.

8. The information processing device according to claim 1, wherein an image based on said person correlation data is an image that is generated based on at least said tag representing relationship between the face image of said person and persons in a face image and an appearance score of said face image.

9. The information processing device according to claim 8, wherein in the event in which said tag is changed, deleted, or added, said correlation data corresponding thereto is updated.

10. The information processing device according to claim 7, wherein an image based on said person correlation data is generated for each event.

11. An information processing method comprising the steps of:
   extracting a face from an image;
   classifying, based on a position of said extracted face within the image, said extracted face into a group;
   comparing an average value of a size of the extracted face and excluding a face having a size equal to or greater than a first threshold or a face having a size equal to or smaller than a second threshold from being processed;
   adding a tag indicating relationship between persons within a group;
   calculating the closeness of the person of said face from distance between groups; and
   generating person correlation data including at least said tag and said closeness.

12. A non-transitory computer readable medium having stored thereon a program that when executed by a computer causes the computer to execute a method comprising:
   extracting a face from an image;
   classifying, based on a position of said extracted face within the image, said extracted face into a group;
   comparing an average value of a size of the extracted face and excluding a face having a size equal to or greater than a first threshold or a face having a size equal to or smaller than a second threshold from being processed;
   adding a tag indicating relationship between persons within a group;
   calculating the closeness of the person of said face from distance between groups; and
   generating person correlation data including at least said tag and said closeness.

13. An information processing device comprising:
   a processing circuit configured to
      extract a face from an image,
      classify said extracted face into a group based on a position of the extracted face within the image,
      compare an average value of a size of the extracted face and exclude a face having a size equal to or greater than a first threshold or a face having a size equal to or smaller than a second threshold from being processed,
      add to a group generated a tag indicating relationship between persons within the group,
      calculate the closeness of the person of said face from distance between groups generated, and
      generate person correlation data including at least said tag and said closeness.

14. The information processing device of claim 1, wherein the grouping means classifies the extracted face into the group based on the position of the extracted face within the image and a reference position, wherein the reference position is calculated based on the position of the extracted face and other extracted faces to be processed.

* * * * *